United States Patent [19]
Takai et al.

[11] Patent Number: 5,485,580
[45] Date of Patent: Jan. 16, 1996

[54] CIRCUIT FOR DETECTING TRANSMISSION BUS'S ABNORMALITY AND FOR CONTROLLING OUTPUT DRIVERS IN A COMPLEMENTARY SIGNAL TRANSMISSION DEVICE

[75] Inventors: Kazuyoshi Takai; Hironori Kawahara; Masaaki Saji; Yukio Ono, all of Itami, Japan

[73] Assignee: Mitsubishi Denki Kabushiki Kaisha, Tokyo, Japan

[21] Appl. No.: 143,104

[22] Filed: Oct. 29, 1993

[30] Foreign Application Priority Data

Dec. 25, 1992 [JP] Japan .................................. 4-346447
Apr. 2, 1993 [JP] Japan .................................. 5-076842

[51] Int. Cl.$^6$ ................. H03K 19/00; H03K 19/003; H03K 19/0175
[52] U.S. Cl. ................ 395/220.2; 371/20.1; 326/21; 364/238.5; 364/242.94; 364/265; 364/265.1; 364/266; 364/DIG. 1; 364/DIG. 2; 364/919; 364/927.96; 364/935.42
[58] Field of Search ................................. 395/200, 275, 395/575; 371/20.1; 326/21, 62

[56] References Cited

U.S. PATENT DOCUMENTS

| | | | |
|---|---|---|---|
| 4,833,600 | 5/1989 | Brodsky | 395/200 |
| 5,043,938 | 8/1991 | Ebersole | 395/200 |
| 5,075,569 | 12/1991 | Branson | 327/108 |
| 5,126,601 | 6/1992 | Murphy | 326/75 |
| 5,264,744 | 11/1993 | Mizukami et al. | 326/26 |

FOREIGN PATENT DOCUMENTS

| | | |
|---|---|---|
| 3826774 | 2/1990 | Germany. |
| WO91/17615 | 11/1991 | WIPO. |
| WO92/17017 | 10/1992 | WIPO. |

OTHER PUBLICATIONS

Nagao et al. "Bus Driver IC for Use in Vehicle Multiplexing Communications", ASIC Confer. & Exhibit, 1992, pp. 79–82.

Furukawa Review, No. 88, Jun. 1991, Furukawa Electric Technologies Inc., "High Reliability Physical Layer for In-Vehicle High Speed Local Area Network", Tanaka et al., pp. 43–50.

Primary Examiner—Thomas C. Lee
Assistant Examiner—D. Dinh
Attorney, Agent, or Firm—Oblon, Spivak, McClelland, Maier & Neustadt

[57] ABSTRACT

There is disclosed a two-wire input/output device with an object of avoiding that communication becomes impossible when an abnormality occurs on one of two-wire LAN transmission lines. A pair of buses are separately controlled by driver circuits. An abnormality on a transmission line is detected by an abnormality detecting circuit with data supplied to terminals, and driving of only one of the driver circuits which corresponds to the bus having the abnormality is stopped by an output control circuit. When an abnormality occurs on one of the transmission lines, communication is enabled with a driver circuit corresponding to the transmission line having the abnormality being protected.

29 Claims, 41 Drawing Sheets

FIG. 14  RECOVERY FROM FAILURE

CIRCUIT FOR DETECTING TRANSMISSION BUS'S ABNORMALITY AND FOR CONTROLLING OUTPUT DRIVERS IN A COMPLEMENTARY SIGNAL TRANSMISSION DEVICE

BACKGROUND OF THE INVENTION

1. Field of the Invention

The present invention relates to two-wire input/output devices and specifically to a LAN transceiver for transmitting/receiving on LAN transmission lines.

2. Description of the Background Art

FIG. 40 is a block diagram of a conventional transceiver device 1. A bus BUS− which is pulled-up to potential VD and a bus BUS+ which is pulled-down to potential VS, which form a LAN transmission line 300 as a pair, are connected to the transceiver device 1 through terminals 14 and 13, respectively. The transceiver device 1 also has a terminal 9 to which input data TX to be provided to the buses BUS+ and BUS−, a terminal 10 for transmitting abnormalities in the buses BUS+ and BUS−, and a terminal 11 for transmitting data which have been provided to the buses BUS+ and BUS−.

A driver circuit 2 is connected to the terminals 13 and 14 to give input data to the LAN transmission line 300 (the BUS+ and the BUS−). An output control circuit 3 is connected to the terminal 9 and controls driving of the driver circuit 2 according to the input data TX. A bus input circuit 4 is connected to the terminals 13 and 14, which transmits the data provided to the buses BUS+ and BUS− to the terminal 11 through an input select circuit 6.

The data provided to the buses BUS+ and BUS− are converted into signals VO, VM, VP in the bus input circuit 4, and provided to an abnormality detecting circuit 5 connected to the terminal 10 and also to a reset circuit 8. If an abnormality occurs on the buses BUS+ and BUS−, the abnormality detecting circuit 5 transmits the abnormality to the terminal 10. However, in normal cases, a signal indicating abnormality is not given to the terminal 10 because the reset circuit 8 continues resetting the abnormality detecting circuit 5.

If an abnormality takes place on one of the LAN transmission line, i.e., one of the buses BUS+ and BUS−, the input select circuit 6 selects and outputs output data given to a bus which is operating normally. For this purpose, the input select circuit 6 is also connected to the abnormality detecting circuit 5.

FIG. 41 is a circuit diagram showing a specific circuit configuration of a part of the transceiver device 1 shown in FIG. 40, that is, the driver circuit 2, the output control circuit 3, the bus input circuit 4, the abnormality detecting circuit 5 and the reset circuit 8.

The output control circuit 3 includes a flip-flop F1 and gates G1 and G3. The gate G1, being controlled by a stand-by signal $\overline{STB}$ outputted from a stand-by control circuit 7, receives input data TX provided to the terminal 9. Receiving the input data TX, the output control circuit 3 drives the driver circuit 2, and a signal corresponding to the input data TX is transmitted to the buses BUS+ and BUS− through the terminals 13 and 14.

The driver circuit 2 includes a PMOS transistor P1, an NMOS transistor N1, and an inverter I1. Potential VD is applied to a source of the PMOS transistor P1, of which drain is connected to the terminal 13. Also, potential VS is applied to a source of the NMOS transistor N1, of which drain is connected to the terminal 14. Accordingly, the PMOS transistor P1 drives the bus BUS+ so that it is in the same phase as the input data TX and the NMOS transistor N1 drives the bus BUS− with the opposite phase to the input data TX.

The bus input circuit 4 includes a comparator CP for comparing the data provided to the bus BUS+ and a reference potential VR to obtain a signal VP, a comparator CM for comparing the data given to the bus BUS− and the reference potential VR to obtain a signal VM, and a comparator CO for obtaining a differential signal VO of the data given to the buses BUS+ and BUS−.

The reference potential VR is normally set to potential (VD+VS)/2. The signal VP attains "H" if the potential of the data given to the bus BUS+ is larger than the reference potential VR, and attains "L" if it is smaller than that. The signal VM attains "H" if the potential of the data given to the bus BUS− is smaller than the reference potential VR, and attains "L" if it is larger than that. Also, the signal VO attains "H" if the potential of the data given to the bus BUS+ is larger than the potential of the data given to the bus BUS−, and attains "L" if it is smaller. Accordingly, if the buses BUS+ and BUS− are normal, these three signals VP, VO and VM are in-phase to each other.

The abnormality detecting circuit 5 includes T flip-flops TP1 and TP2 for counting the signal VP, a D flip-flop DP for latching output of the flip-flop TP2, T flip-flops TM1 and TM2 for counting the signal VM, a D flip-flop DM for latching output of the flop-flop TM2, and an NAND gate G0 for taking a logical sum of outputs of the D flip-flops DP and DM.

Outputs of the D flip-flops DP and DM are signals $\overline{DPQ}$ and $\overline{DMQ}$ obtained by latching and inverting outputs of the flip-flops TP2 and TM2, respectively, which are transmitted to the input select circuit 6.

The input select circuit 6, although it is not shown in detail, transmits the signal VO to the terminal 11 when the LAN transmission lines operate normally, or when normal data are given to the LAN transmission lines. If an abnormality takes place, for example, if one of the buses BUS+ and BUS− is shorted to the potential VS or VD, the input select circuit 6 receives the signal $\overline{DPQ}$, $\overline{DMQ}$ outputted by the abnormality detecting circuit 5 and selects a signal applied to a normal bus and transmits it to the terminal 11.

Now, the operation of the abnormality detecting circuit 5 at the time when the bus BUS+ is shorted to the potential VS is considered as an example. The signal VP falls to "L" and fixed at the state. Since the bus BUS− is operating normally, normal potential is given to the terminal 14. In the potential given to the terminal 14, however, a voltage decrease is normally caused by on-resistance of the transistor N1, so that it does not decreases to the potential VS. Accordingly, if the bus BUS+ is shorted to the potential VS, even when the bus BUS− becomes the "L" level, the potential appearing at the terminal 13 is lower. Therefore, the differential output VO is also fixed at "L".

Accordingly, as will be described later, the reset circuit 8 does not provide the reset signal $\overline{RST}$ to the abnormality detecting circuit 5. As a result, reset is not performed for the flip-flops TP1, TP2, DP, TM1, TM2 and DM which are to be reset with the reset signal RST in normal operation, and counting by these flip-flops is started.

On the other hand, since the signal VP is fixed at "L", the flip-flops TP1, TP2 and DP do not operate. The signal VM transfers potential corresponding to data given to the bus BUS− and its fall is counted by TM1 and TM2 which started counting. Then at the fourth fall of the signal VM, the flip-flop DM operates and the signal $\overline{\text{DMQ}}$ attains "L". This is transmitted to the input select circuit 6 to transmit an abnormality on the bus BUS+.

In the same way, the signal $\overline{\text{DPQ}}$ attains "L" if an abnormality takes place on the bus BUS−, and the abnormality is transmitted to the input select circuit 6. Inversion of the logical sum of the signals $\overline{\text{DPQ}}$ and $\overline{\text{DMQ}}$ is outputted from the gate G0 as a signal ERR, and the signal ERR is transmitted to the terminal 10 and the output control circuit 3. In the output control circuit 3, when the error signal ERR attains "L", the flip-flop F1 is reset. The output of the gate G3 attains "H" accordingly, and the driver circuit 2 is turned off.

The reset circuit 8 includes inverters I2–I4 for generating a reset signal $\overline{\text{RST}}$ which is negative pulse with a fall of the signal VO, a NAND gate G4 and capacitor C. The reset signal $\overline{\text{RST}}$ is supplied to reset terminals $\overline{\text{R}}$ of the flip-flops TP1, TP2, DP, TM1, TM2, and DM included in the abnormal detecting circuit 5 through the AND gate G2, and these flip-flops are continuously reset as long as the signal VO provides normal potential changes. If the potential given by the signal VO is fixed, however, the reset signal $\overline{\text{RST}}$ does not reset these flip-flops as described above. A power-supply reset circuit ROP is connected with the AND gate G2 to generate a reset signal $\overline{\text{RST}}$ also at turn-on of power-supply.

After the error signal ERR is once outputted as "L", if the buses BUS+, BUS− are recovered from the abnormality and normal data is applied to the same, the differential output VO gets out of the fixed state. Thus, the reset signal $\overline{\text{RST}}$ is supplied to the reset terminals $\overline{\text{R}}$ of the flip-flops TP1, TP2, DP, TM1, TM2 and DM in the abnormality detecting circuit 5. That is, the reset signal $\overline{\text{RST}}$ is outputted at the first rise of the signal VO, and all the flip-flops in the abnormality detecting circuit 5 are reset. Accordingly, the error signal ERR also attains "H".

When the error signal ERR attains "H", the flip-flop F1 of the output control circuit 3 moves from the reset state to the operable state, and the gate G3 opens with a rise of input data applied to the terminal 9 and the like. Subsequently, the driver circuit 2 operates corresponding to the input data.

In the conventional art, if an abnormality takes place only on one of a pair of transmission lines, the data applied to the other normal transmission line is inputted to the transceiver device, but input data can not be applied even to the other transmission line because the driver circuit is turned off. Accordingly, when constituting a network with a plurality of units through the pair of transmission lines, there was the first problem that all the units turn off if an abnormality occurs on one of the pair of transmission lines, with the result that the mutual communications become impossible.

Furthermore, when the mutual communications once became impossible, since no unit supplies data to the transmission lines, processings for the error provided to the output control circuit is not canceled even if the transmission line has recovered from the abnormality. Accordingly, there was the second problem that the power-supply must be turned on again to recover the driver circuit.

Also, in the conventional abnormality detecting circuit constituted as described above, when an abnormality takes place on one of the pair of transmission lines, the abnormality is not recognized until pulse comes to the other normal one four times or more. Therefore, there was the third problem that the first part of the data is not normally transferred even after the transmission line has recovered to the normal condition. It may cause a problem in some specifications of system.

SUMMARY OF THE INVENTION

A first aspect of the present invention is directed to a two-wire input/output device connected to a first and a second transmission lines on which a first and a second signals with phases opposite to each other are transmitted, respectively, comprising: (a) a first and a second driver circuits for supplying the first and second signals to the first and the second transmission lines, respectively; (b) an input circuit receiving the first and the second signals for generating a first comparison signal obtained by comparing the first signal and a predetermined potential, a second comparison signal obtained by comparing the second signal and the predetermined potential and a third comparison signal obtained by comparing the first signal and the second signal; (c) a reset circuit receiving the third comparison signal for generating a reset signal which is activated when the first and the second transmission lines are normal; (d) an abnormality detecting circuit receiving the first and the second comparison signals and the reset signal for generating a first and a second error signals which are activated when an abnormality occurs on one of the first and the second transmission lines, respectively; and (c) an output control circuit receiving input data on which the first and the second signals are based and the first and the second error signals for stopping driving of the first and the second driver circuits respectively when one of the first and the second error signals are active and driving the first and the second driver circuits according to the input data when the first and the second error signals are inactive.

Preferably, the reset circuit further produces (c-1) an auxiliary reset signal which is not related to the third comparison signal, and the abnormality detecting circuit includes (d-1) a first counter which counts the first comparison signal and is reset by the reset signal, (d-2) a first D flip-flop which receives an output of the first counter as trigger and is reset by the auxiliary reset signal, (d-3) a second counter which counts the second comparison signal and is reset by the reset signal, and (d-4) a second D flip-flop which receives an output of the second counter as trigger and is reset by the auxiliary reset signal.

Preferably, the reset circuit includes (c-2) a power-supply reset circuit which operates with reset of a power-supply and produces the auxiliary reset signal.

Preferably, the reset circuit further includes a gate for reset for producing the auxiliary reset signal by taking AND of an external reset signal supplied from outside of the reset circuit and an output of the power-supply reset circuit.

Preferably, the abnormality detecting circuit includes (d-5) a gate for error signal for producing a third error signal by taking OR of the first and the second error signals, and (d-6) a latch circuit for latching the third error signal and producing a fourth error signal.

In a second aspect of the present invention, a two-wire input/output device connected to a first and a second transmission lines on which a first and a second signals with phases opposite to each other are transmitted, respectively, comprises: (a) a driver circuit for supplying the first and the second signals to the first and the second transmission lines, respectively, (b) an input circuit receiving the first and the second signals for producing a first comparison signal obtained by comparing the first signal and a predetermined potential, a second comparison signal obtained by comparing the second signal and the predetermined potential and a third comparison signal obtained by comparing the first signal and the second signal; (c) a reset circuit receiving the third comparison signal for producing a reset signal which is activated when the first and the second transmission lines are normal; (d) an abnormality detecting circuit receiving the first and the second comparison signals and the reset signal for producing an error signal which is activated when an abnormality occurs on one of the first and the second transmission lines, respectively; (e) an output control circuit receiving input data on which the first and the second signals are based and the error signal for stopping driving of the driver circuit in principle when the error signal is active and for driving the driver circuit according to the input data when the error signal is inactive; and (f) a timer receiving the error signal to be started with its activation for supplying a special driving signal after a certain period from the activation of the error signal to the output control circuit to make the output control circuit drive the driver circuit as an exception even if the error signal is active.

Preferably, the error signal is single, the timer is single and the special driving signal is single.

Preferably, the error signal forms a pair, the timer forms a pair and supplies a pair of the special driving signals to the output control circuit and the reset circuit further receives a first and a second comparison signals and, on the basis of each of the same, respectively, outputs a first and a second auxiliary reset signals for resetting the pair of timers together with the pair of error signals.

Preferably, the error signal forms a pair, the timer forms a trio and supplies a trio of the special driving signals to the output control circuit, and the reset circuit further receives the first and the second comparison signals and, on the basis of the same, respectively, outputs a first and a second auxiliary reset signals for resetting the trio of timers together with the pair of error signals.

In a third aspect of the present invention, a two-wire input/output device connected to a first and a second transmission lines on which a first and a second signals with phases opposite to each other are transmitted, respectively comprises: (a) a first and a second driver circuits for supplying the first and the second signals to the first and the second transmission lines, respectively, (b) an input circuit receiving the first and the second signals for producing a first comparison signal obtained by comparing the first signal and a predetermined potential and a second comparison signal obtained by comparing the second signal and the predetermined potential and a third comparison signal resulting from comparison between the first signal and the second signal; (c) a reset circuit receiving the third comparison signal for producing a reset signal which is activated when the first and the second transmission lines are normal; (d) an abnormality detecting circuit having, (d-1) a first counter which is reset by the reset signal and counts the second comparison signal to output a first count output, (d-2) a first D flip-flop which receives the first count output as trigger and is reset by the reset signal for producing a first error signal which is activated when an abnormality occurs on the first transmission line, (d-3) a second counter which is reset by the reset signal for counting the first comparison signal to output a second count output, (d-4) a second D flip-flop which receives the second count output as trigger and is reset by the reset signal for producing a second error signal which is activated when an abnormality occurs on the second transmission line; and (e) an output control circuit (e-1) receiving input data on which the first and the second signals are based and the first and the second error signals, (e-2) for driving the driver circuit according to the input data when the first and the second error signals are inactive, and (e-3) for stopping drivings of the first and the second driver circuits in principle, when one of the first and the second error signals is active, respectively, and driving the first and the second driver circuits as an exception when the first count output and the second count output attain predetermined values, respectively.

Preferably, the abnormality detecting circuit further comprises (d-5) a gate for an error signal for producing a third error signal by taking OR of the first and the second error signals, and the reset circuit further receives the third error signal, and has a counter for reset which counts the third comparison signal as trigger and is reset by the third error signal.

In a fourth aspect of the present invention, a two-wire input/output device connected to a first and a second transmission lines on which a first and a second signals with phases opposite to each other are transmitted, respectively, comprises: (a) a driver circuit for supplying the first and the second signals to the first and the second transmission lines, respectively; (b) an input circuit receiving the first and the second signals for producing a first and a second reference signals respectively indicating whether the first and the second signals are normal or not; (c) an abnormality detecting circuit receiving the first and the second reference signals for producing an error signal which is activated when an abnormality occurs on one of the first and the second transmission lines; (d) an output control circuit receiving input data on which the first and the second signals are based and the error signal for stopping driving of the driver circuit when the error signal is active and driving the driver circuit according to the input data when the error signal is inactive; and the abnormality detecting circuit having (c-1) a coincidence detecting circuit for producing a coincidence detection signal which is activated when the first and the second reference signals coincide with each other, and (c-2) a coincidence detection holding circuit for holding the coincidence detection signal and producing the error signal.

In a fifth aspect of the present invention, a two-wire input/output device connected to a first and a second transmission lines on which a first and a second signals with phases opposite to each other are transmitted, respectively, comprises: (a) a driver circuit for supplying the first and the second signals to the first and the second transmission lines, respectively; (b) an input circuit receiving the first and the second signals for producing a first and a second reference signals respectively indicating whether the first and the second signals are normal or not; (c) an abnormality detecting circuit receiving the first and the second reference signals for producing an error signal which is activated when an abnormality occurs on one of the first and the second transmission lines; and (d) an output control circuit receiving input data which the first and the second signals are based on and the error signal for stopping driving of the driver circuit when the error signal is active and driving the driver circuit according to the input data when the error signal is inactive; and the abnormality detecting circuit having, (c-1) a first one-shot multivibrator receiving the first reference signal as trigger and outputting a signal in the form of pulse, (c-2) a second one-shot multivibrator receiving a signal obtained by inverting the first reference signal as trigger and outputting a signal in the form of pulse, (c-3) a third one-shot multivibrator receiving the second reference signal as trigger and outputting a signal in the form of pulse, (c-4) a fourth one-shot multivibrator receiving a signal obtained by inverting the second reference signal as trigger and outputting a signal in the form of pulse, and (c-5) a gate for abnormality detection for taking OR of outputs of the first through fourth one-shot multivibrators to produce the error signal.

In the first aspect of the present invention, when an abnormality occurs on the first transmission line, driving of the first driver circuit corresponding to the same is stopped and the destruction of the first driver circuit is avoided. On the other hand, driving of the second driver circuit corresponding to the normal second transmission line is not stopped and data is given to the second transmission line.

In the second aspect of the present invention, if an abnormality occurs on a transmission line, driving of the driver circuit is once stopped. After the driving of the driver circuit is stopped, driving of the driver circuit is temporarily re-started after a predetermined period of time by a timer. Thus, if the transmission line has recovered from the abnormality, data is given to the transmission line.

In the third aspect of the present invention if an abnormality occurs on a transmission line, driving of the driver circuit is once stopped. After the driving of the driver circuit is stopped, when input data is counted predetermined times, driving of the driver circuit is temporarily re-started. Thus, if the transmission line has been recovered from the abnormality, data is given to the transmission line.

In the fourth aspect of the present invention, a coincidence detecting circuit detects a case in which the first and the second reference signals do no coincide with each other and the coincidence detection holding circuit holds the result.

In the fifth aspect of the present invention, the OR of outputs of the first and the second one-shot multivibrators gives two different logical values when the first signal is normal and when it is not normal. Also, the OR of outputs of the third and the fourth one-shot multivibrators gives two different logical values when the second signal is normal and when it is not normal.

Accordingly, in the first aspect of the present invention, it is avoided that data do not exist on the normal second transmission line, and when the first transmission line on which an abnormality was occurring is recovered, it can be detected. Then, the driving of the first driver circuit can be re-started.

In the second and the third aspects of the present invention, it is avoided that there exist no data on a recovered transmission line, and it is detected that the transmission line has recovered from the abnormality. Thus driving of the driver circuit can be started again.

In the fourth and the fifth aspects of the present invention, the reliability can be enhanced because an abnormality on a transmission line can be detected in the early stage.

Accordingly, it is the first object of the present invention to provide a two-wire input/output device capable of preventing communication from becoming impossible even when an abnormality occurs on one of a pair of transmission lines by giving input data to the other normal transmission line.

It is the second object of the present invention to provide a two-wire input/output device enabling enhancement of reliability by recovering a driver circuit automatically without need of turning on a power-supply again when an abnormality once occurs on a transmission line and it recovers.

It is the third object of the present invention to provide a two-wire input/output device capable of detecting an abnormality if an abnormality occurs on one of a pair of transmission lines when a pulse of the other normal transmission line comes only once.

These and other objects, features, aspects and advantages of the present invention will become more apparent from the following detailed description of the present invention when taken in conjunction with the accompanying drawings.

Figure 1:
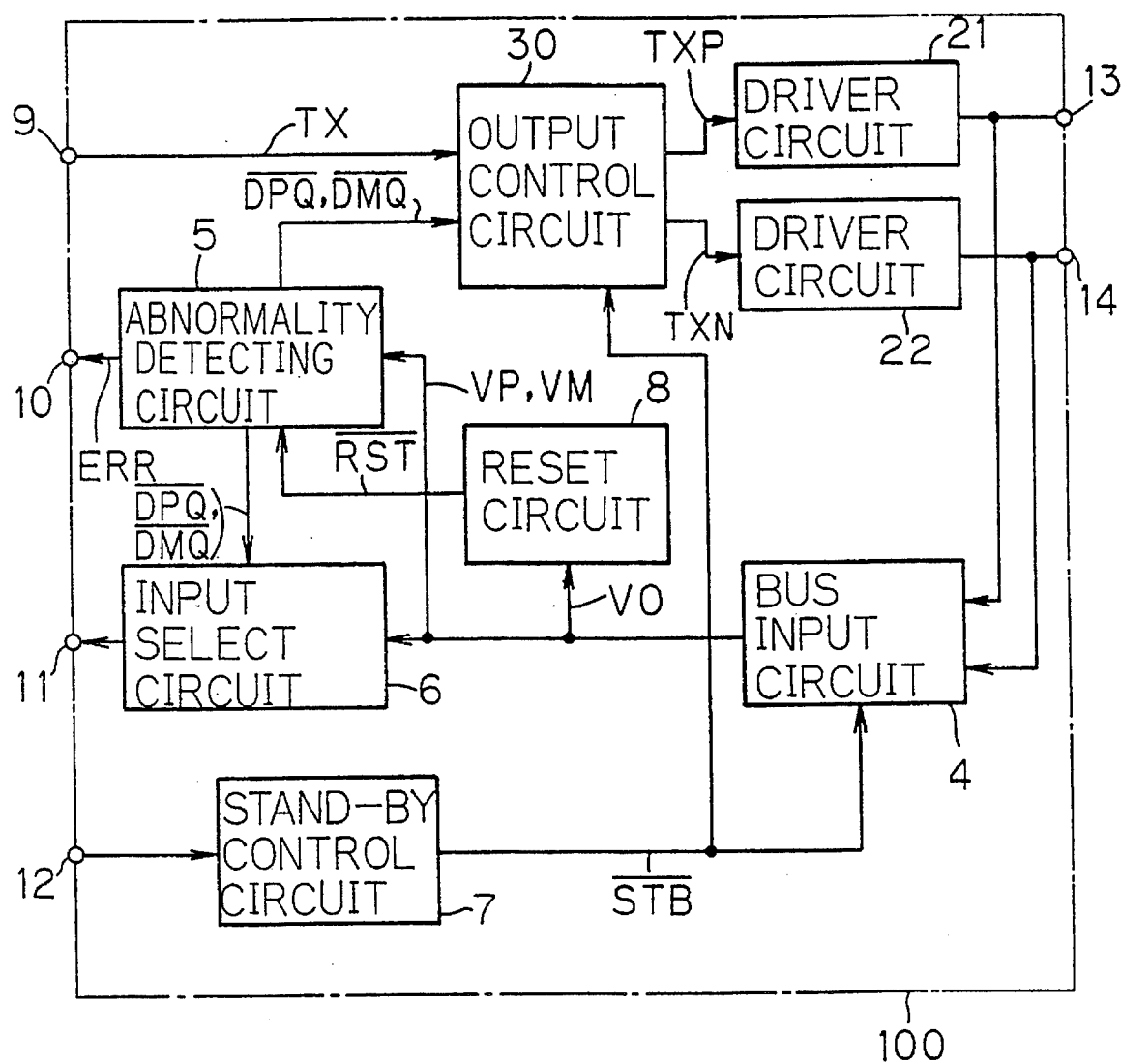
FIGS. 1 and 2 are block diagrams for describing the first preferred embodiment of the present invention.

DESCRIPTION OF THE PREFERRED EMBODIMENTS (A) First Preferred Embodiment:
(A-1) Basic Structure:

FIG. 1 is a block diagram showing configuration of a transceiver device 100 in accordance with the first preferred embodiment of the present invention. The transceiver device 100 serves as a constituent element of a unit connected to a pair of transmission lines, e.g., LAN transmission lines to be installed in a car, which has terminals 13 and 14 to be connected to the transmission lines. As measures to avoid noises, signals with phases opposite to each other are generally transmitted on the pair of transmission lines.

Figure 2:
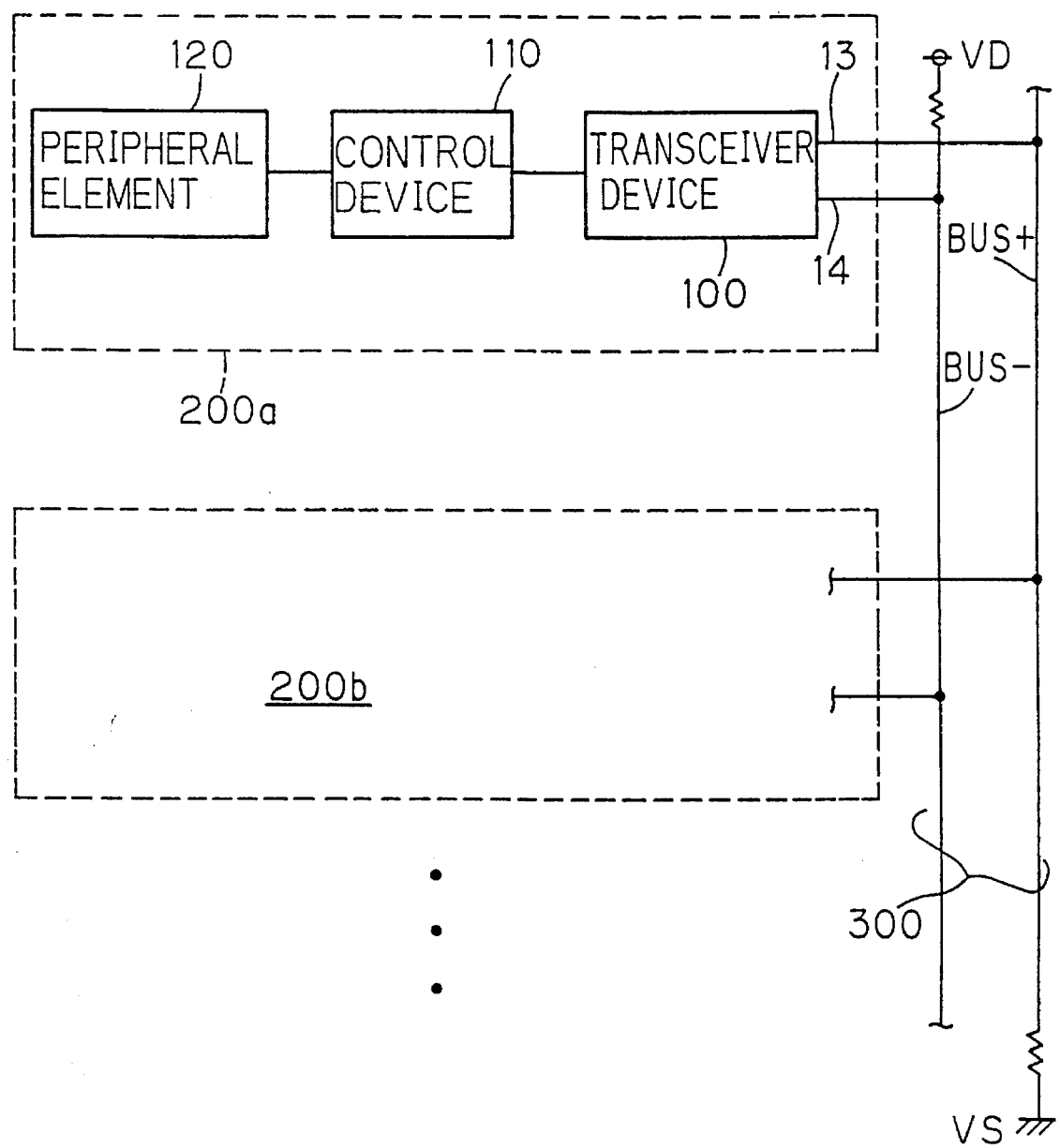

FIG. 2 is a block diagram where units 200a, 200b, ... each having the transceiver device 100 are connected to buses BUS+, BUS− constituting the LAN transmission line 300. The terminal 13 is connected to the bus BUS+ which is pulled down to potential VS. The terminal 14 is connected to the bus BUS− which is pulled up to potential VD. In each unit 200a, 200b, ..., the transceiver device 100 is connected to a control device 110 and operates under control thereof. A peripheral element 120 is also connected to the control device 110. The peripheral element 120 represents lamps, sensors and the like of the car.

Figure 3:
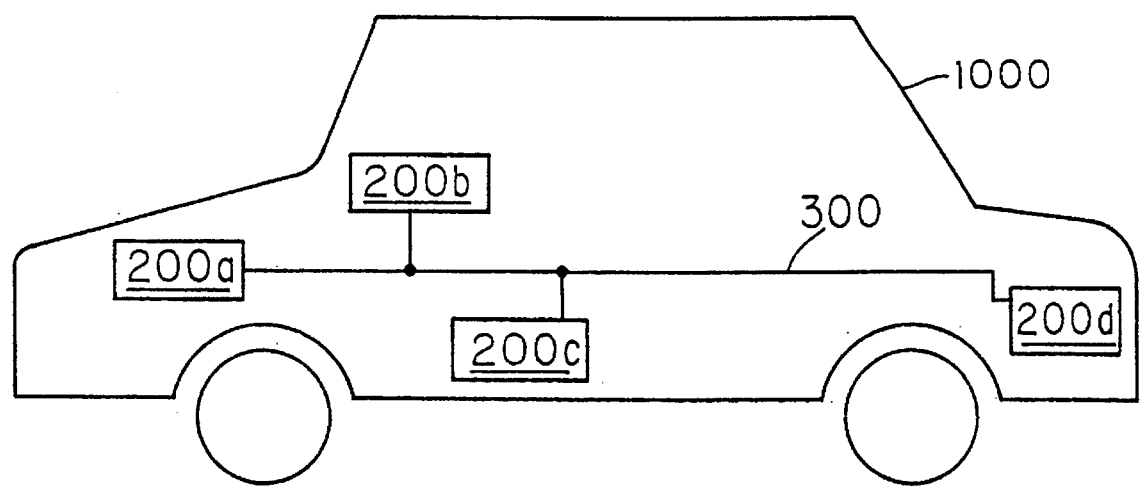
FIG. 3 is a conceptional view for describing the first preferred embodiment of the present invention.

FIG. 3 is a conceptional view showing the units 200a, 200b, ... connected to the LAN transmission line 300 in a car 100. The units 200a, 200b, ... connected to each other through the LAN transmission line 300 as shown in the figure send/receive data among each other through the transceiver device 100 provided in each of them.

Returning to FIG. 1, the structure of the transceiver device 100 will be described. As compared with the conventional transceiver device 1, the transceiver device 100 has an output control circuit 30 in place of the output control circuit 3, and driver circuits 21 and 22 in place of the driver circuit 2.

Input data TX to be supplied to the buses BUS+, BUS− is inputted to a terminal 9. An error signal ERR indicating an abnormality in the buses BUS+, BUS− is applied to a terminal 10 from an abnormality detecting circuit 5. The data supplied to the buses BUS+, BUS− are supplied to a terminal 11.

To the terminals 13 and 14, outputs of the driver circuits 21 and 22 for driving each of the buses BUS+, BUS− are provided. The output control circuit 30 connected to the terminal 9 controls drivings of the driver circuits 21 and 22 according to the input data TX. A bus input circuit 4 is connected to the terminals 13 and 14 and transmits data given to the buses BUS+, BUS− to the terminal 11 through an input select circuit 6.

A stand-by control circuit 7 receives indication as to whether a stand-by mode is to be implemented or not through the terminal 12, and outputs a stand-by signal $\overline{STB}$ for controlling as to whether a low consumption current mode is to be implemented or not leaving required and minimum functions for the driver circuits 21, 22 and the bus input circuit 4.

The data given to the buses BUS+, BUS− are converted to signals VP, VM, VO in the bus input circuit 4. These signals are signals with the same phase as the data given to the bus BUS+ when no abnormality occurs on the buses BUS+, BUS−. The signals VP and VM are applied to the abnormality detecting circuit 5, and the signal VO is applied to a reset circuit 8, respectively. The reset circuit 8 produces a reset signal $\overline{RST}$ from the signal VO.

If an abnormality occurs on the buses BUS+, BUS−, the abnormality detecting circuit 5 activates an error signal ERR produced from the signals VP, VM and the reset signal RST. When the buses BUS+, BUS− are normal, the reset circuit 8 continuously provides a reset signal $\overline{RST}$ to the abnormality detecting circuit 5, so that the ERR signal becomes inactive.

The abnormality detecting circuit 5 produces signals $\overline{DPQ}$, $\overline{DMQ}$ from the signals VP, VM and the reset signal $\overline{RST}$, and transmits them to the input select circuit 6. The signal $\overline{DPQ}$ is activated when an abnormality occurs on the bus BUS−, and the signal $\overline{DMQ}$ is activated when an abnormality occurs on the bus BUS+, respectively. When an abnormality occurs on one of the buses BUS+, BUS−, the input select circuit 6 selects and outputs one of the signals VM, VP which corresponds to data given to a bus operating normally under control by the signals $\overline{DPQ}$, $\overline{DMQ}$.

It differs from the conventional art in that the output control circuit 30 does not receive the error signal ERR from the abnormality detecting circuit 5. Instead, not only the input select circuit 6 but also the output control circuit 30 receive the signals $\overline{DPQ}$, $\overline{DMQ}$. Drivings of the driver circuits 21 and 22 are controlled on the basis of these signals.

Figure 4:
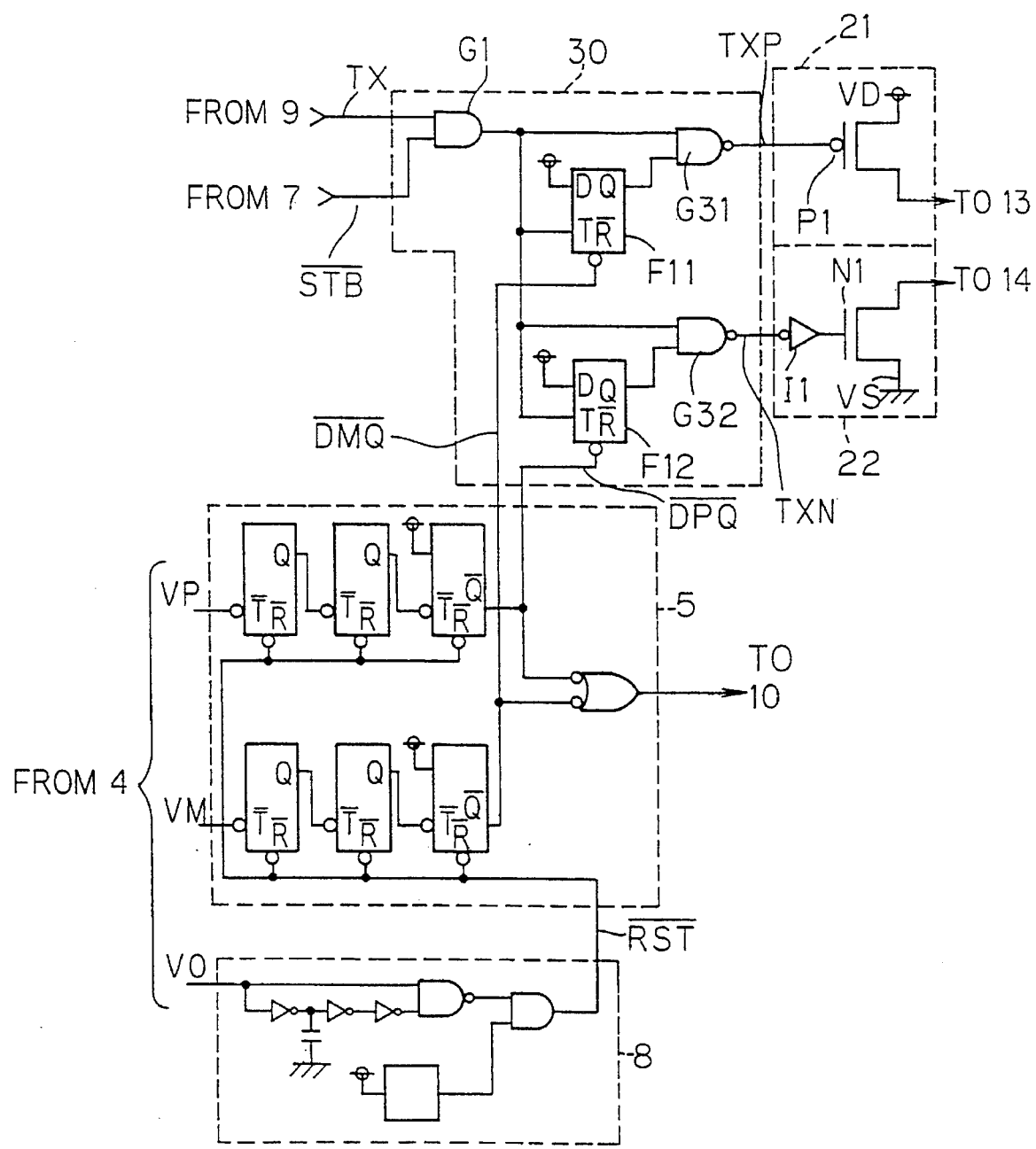
FIG. 4 is a circuit diagram for describing the first preferred embodiment of the present invention.

(A-2) Specific Structure:

FIG. 4 is a circuit diagram showing the specific structures of the output control circuit 30 and the driver circuits 21 and 22 in the preferred embodiment described above. The output control circuit 30 includes an AND gate G1 for taking logical product of the input data provided from the terminal 9 and the stand-by signal $\overline{STB}$ supplied from the stand-by control circuit 7 and outputs. Accordingly, it is also possible to turn off the driver circuits 21 and 22 with the stand-by signal $\overline{STB}$.

The output control circuit 30 also has D flip-flops F11 and F12. An output of the gate G1 is supplied to clock input ends T thereof. The flip-flop F11 is reset by the signal $\overline{DMQ}$ and the flip-flop F12 is reset by the signal $\overline{DPQ}$, respectively.

The output control circuit 30 has NAND gates G31 and G32, too. The gate G31 inverts logical product of the output of the gate G1 and a signal applied at the output end Q of the D flip-flop F11 to output a signal TXP. The gate G32 inverts logical product of the output of the gate G1 and a signal applied at the output end Q of the D flip-flop F12 and outputs a signal TXN.

The driver circuit 21 includes a PMOS transistor P1 in which potential VD is applied at its source and the signal TXP is applied at its gate, respectively, and its drain is connected to the terminal 13. The driver circuit 22 includes an NMOS transistor N1 having its source supplied with potential VS and its drain connected to the terminal 14. The driver circuit 22 further includes an inverter I1, which inverts the signal TXN and applies the same to the gate of the NMOS transistor N1.

When both of the buses BUS+ and BUS− are operating normally, the output control circuit 30 drives the driver circuits 21 and 22 respectively according to the input data TX inputted from the terminal 9. Accordingly, potentials corresponding to the input data TX are applied at the terminals 13 and 14. The bus BUS+ is pulled down to the potential VS and the bus BUS− is pulled up to the potential VD when used, so that a signal with phase the same as the input data TX is outputted to the bus BUS+ and a signal with opposite phase is outputted to the bus BUS−, respectively.

Now, assume that an abnormality such as short of the bus BUS+ to the potential VS occurs. In such a case, the signals $\overline{DMQ}$, $\overline{DPQ}$ which the output control circuit 30 receives from the abnormality detecting circuit 5 attain "L" and "H", respectively. The flip-flop F11 is thus reset, the signal TXP attains "H", and the PMOS transistor P1 in the driver circuit 21 turns off. As a result, even if the bus BUS+ is shorted to the potential VS, it is prevented that excessively great current flows to the PMOS transistor P1.

On the other hand, since the signal DPQ is at "H", the flip-flop F12 is not reset, and the input data TX is converted into a signal TXN and transmitted to the driver circuit 22 to turn on/off the NMOS transistor N1. That is, the input data TX can be transmitted to the bus BUS−.

The same can be applied in the case where an abnormality occurs on the bus BUS−. The signal $\overline{DPQ}$ which the output control circuit 30 receives from the abnormality detecting circuit 5 attains "L", and the flip-flop F12 is reset. The NMOS transistor N1 in the driver circuit 22 thus turns off to prevent flow of excessively great current.

On the other hand, since the signal $\overline{DMQ}$ is at "H", the flip-flop F11 is not reset, and the input data TX is converted into a signal TXP and transmitted to the driver circuit 21 to turn on/off the PMOS transistor P1. That is, the input data TX can be transmitted to the bus BUS+.

As described above, when an abnormality occurs on one of the LAN transmission lines 300, the driver circuit for the bus having the abnormality is turned off and data is transmitted on the other normal bus, so that communication does not become impossible if an abnormality occurs.

Next, suppose that the LAN transmission line 300 is recovered from the abnormality. The bus input circuit 4 operates regardless of presence/absence of the abnormality to detect data on the LAN transmission lines 300. Accordingly, the signals $\overline{DPQ}$ and $\overline{DMQ}$ outputted by the abnormality detecting circuit 5 are both at "H" in this case. Therefore, the flip-flops F11 and F12 of the output control circuit 30 are operable. If input data comes in in this situation, the input data TX is converted into the signals TXP, TXN and transmitted to the driver circuits 21 and 22 respectively, and it returns operation of the two-wire system.

As described above, according to the first preferred embodiment, even if an abnormality takes place on one of a pair of transmission lines, the communication stays possible because data is transmitted using the other normal transmission line. Furthermore, when the transmission line is recovered from the abnormality, the signals $\overline{DPQ}$ and $\overline{DMQ}$ attain "H" and the driver circuit of which driving has been stopped is recovered accordingly, and it automatically returns to operation of the two-wire system.

(B) Second Preferred Embodiment

In both of the conventional case and the first preferred embodiment, control of stopping drivings of the buses BUS+, BUS− is based on the signals $\overline{DMQ}$ and $\overline{DPQ}$ outputted by the abnormality detecting circuit 5. Now, the logical values of the signals $\overline{DMQ}$ and $\overline{DPQ}$ are influenced by the signal VO outputted by the bus input circuit 4. However, occurrence of noises on the buses BUS+, BUS− may cause noises in output of the signal VO. In such a case, the reset signal $\overline{RST}$ may be activated even if an abnormality is taking place on a transmission line to drive the buses BUS+, BUS− (error cancel), which is not desirable.

In order to avoid such a problem, cancel of error due to malfunction of the signal VO is prevented by resetting the resets of the flip-flops DP and DM with the stand-by signal $\overline{STB}$.

Figure 5:
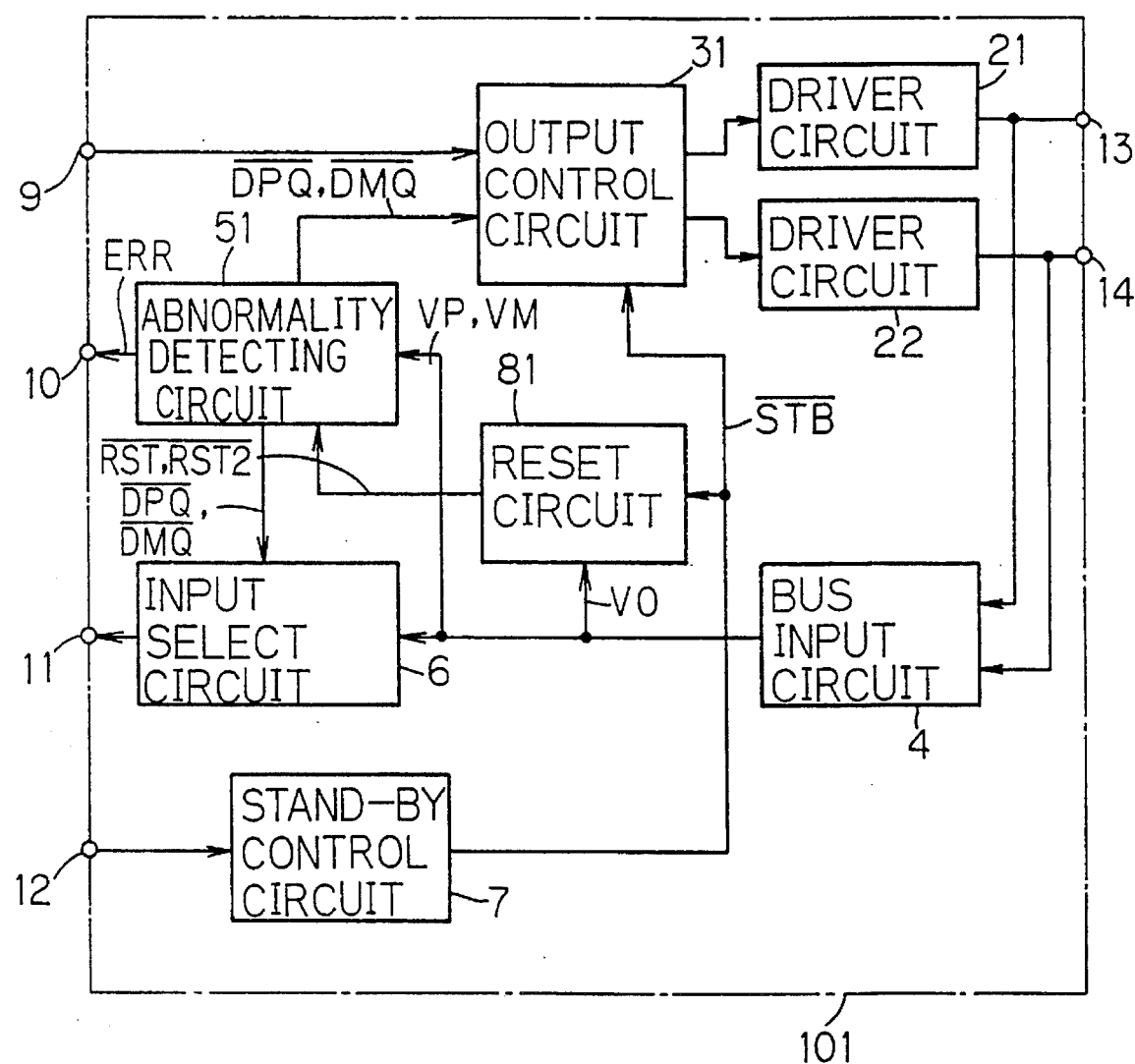
FIG. 5 is a block diagram for describing the first specific configuration of the second preferred embodiment of the present invention.

(B-1) First Specific Structure:

FIG. 5 is a block diagram showing structure of a transceiver device 101 according to the second preferred embodiment. As compared with the first preferred embodiment, there are provided an output control circuit 31 in place of the output control circuit 30, an abnormality detecting circuit 51 in place of the abnormality detecting circuit 5, and a reset circuit 81 in place of the reset circuit 8, respectively.

Figure 6:
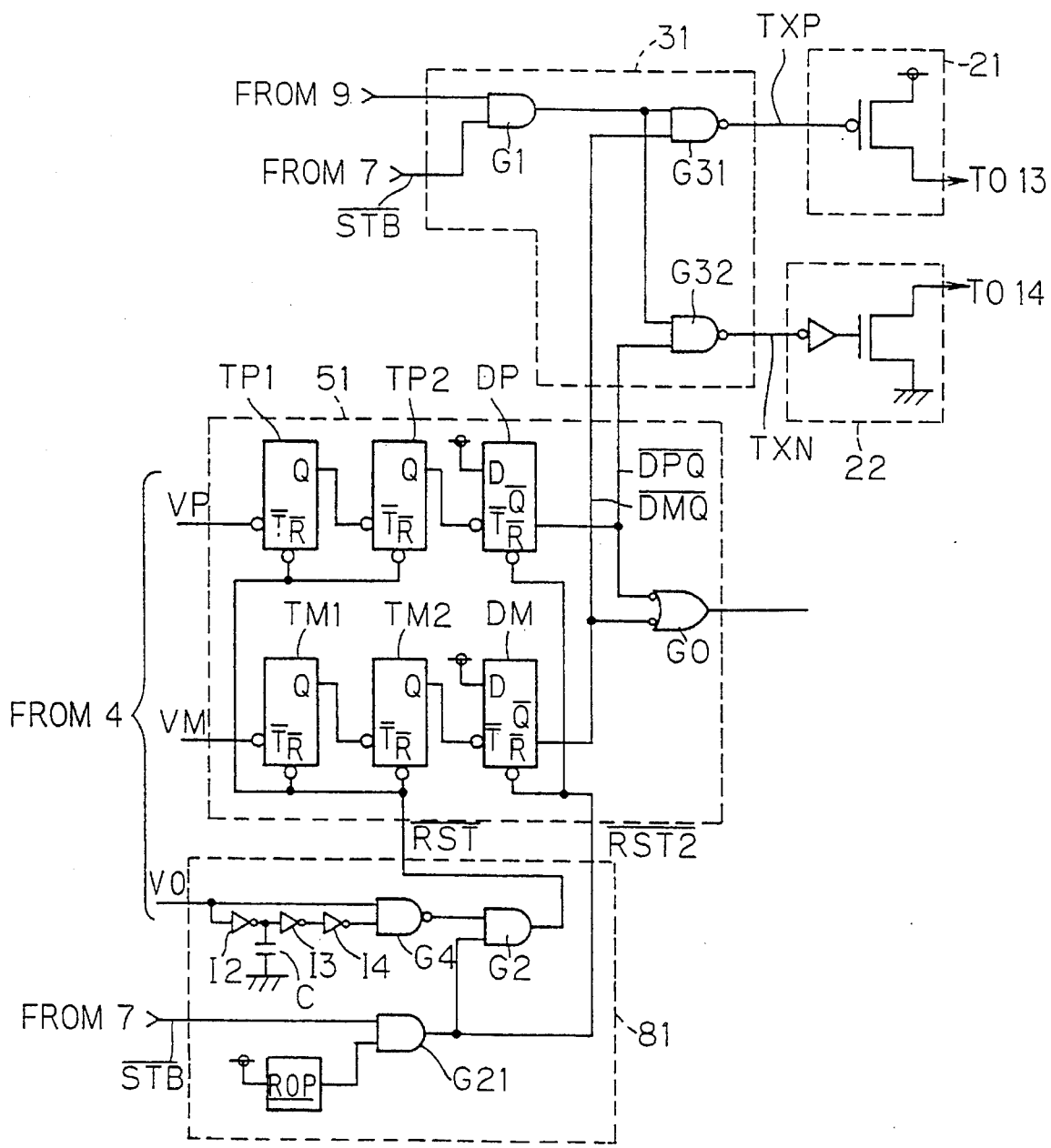
FIG. 6 is a circuit diagram for describing the first specific structure of the second preferred embodiment of the present invention.

FIG. 6 is a circuit diagram showing specific structure of a part of the transceiver device 101 which differs from the conventional art, i.e., the driver circuits 21 and 22, the output control circuit 31, the abnormality detecting circuit 51, and the reset circuit 81.

In the output control circuit 31, flip-flops F11 and F12 are not provided, which is different from the output control circuit 30 in the first preferred embodiment. Gates G31 and G32 now directly receive the signals $\overline{DPQ}$ and $\overline{DMQ}$.

The reset circuit 81 includes a gate G21 in addition to the conventional reset circuit 8. The gate G21 takes logical product of a power-supply reset circuit ROP which operates with reset of power-supply and a stand-by signal $\overline{STB}$ to produce a reset signal $\overline{RST2}$ and transmits it to the gate G2. The reset circuit 81 provides both the reset signals $\overline{RST}$ and $\overline{RST2}$ to the abnormality detecting circuit 51.

In the abnormality detecting circuit 51, reset of the flip-flops DP and DM is not accomplished by the reset signal $\overline{RST}$, but made by the reset signal $\overline{RST2}$, which is different from the conventional abnormality detecting circuit 5. Accordingly, by bringing the stand-by signal $\overline{STB}$ to "L", the signals $\overline{DPQ}$, $\overline{DMQ}$ are made inactive.

As described above, even if the signal VO malfunctions due to influence of noises on bus, operation of the abnormality detecting circuit 51 is not influenced by the malfunction of the signal VO and stays stable because production of the signals $\overline{DPQ}$, $\overline{DMQ}$ is controlled by the reset signal $\overline{RST2}$ which is not subjected to the influence thereof.

Figure 7:
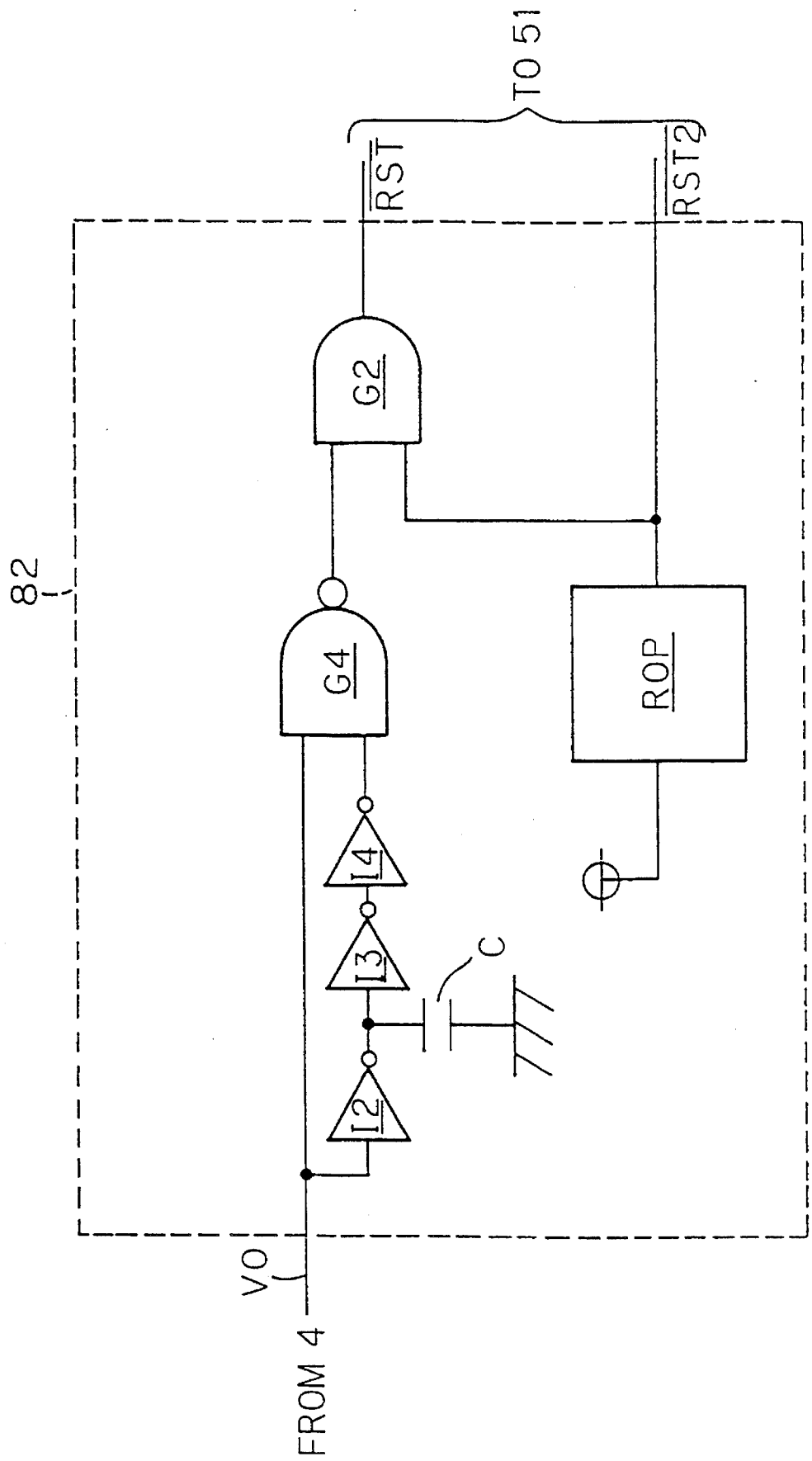
FIG. 7 is a circuit diagram for describing the second specific structure of the second preferred embodiment of the present invention.

(B-2) Second Specific Structure:

If the reset signal $\overline{RST2}$ is produced by reset of power-supply to reset the D flip-flops DP, DM of the abnormality detecting circuit 51, it also has the similar effects. FIG. 7 is a circuit diagram showing specific configuration of a reset circuit 82. An output of the power-supply reset circuit ROP in the conventional reset circuit 8 is directly outputted as a reset signal $\overline{RST2}$. By substituting the reset circuit 82 for the reset circuit 81 shown in FIGS. 5 and 6, the effect described above can be accomplished.

(B-3) Third Specific Structure

Figure 8:
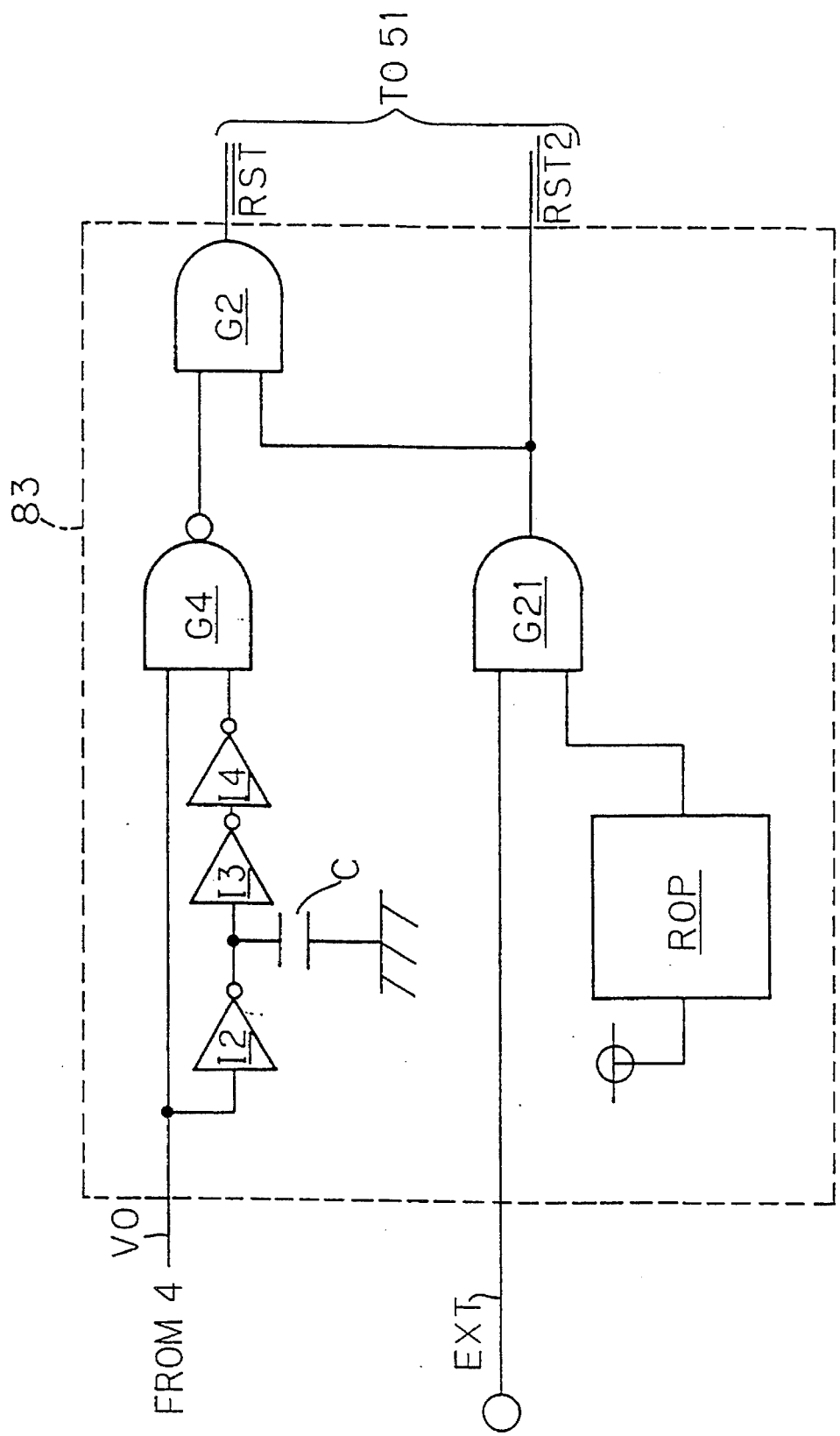
FIG. 8 is a circuit diagram for describing the third specific structure of the second preferred embodiment of the present invention.
Figure 9:
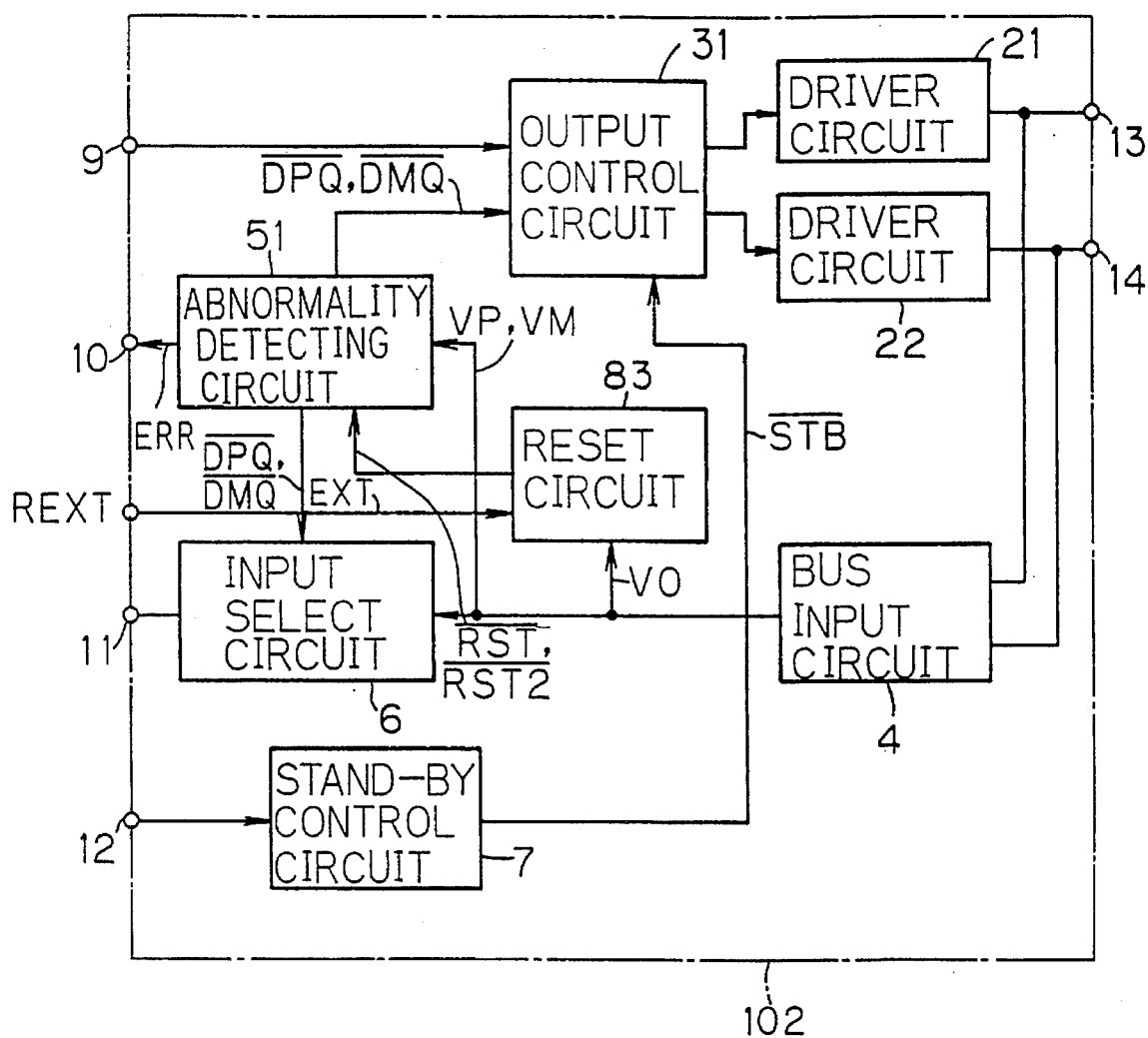
FIG. 9 is a block diagram for describing the third specific structure of the second preferred embodiment of the present invention.

Also, the reset signal $\overline{RST2}$ can be produced by receiving a signal for reset from outside. FIG. 8 is a circuit diagram showing specific configuration of a reset circuit 83. An external reset signal EXT is received in place of a stand-by signal $\overline{STB}$ inputted in the reset circuit 81 in this structure. FIG. 9 is a block diagram showing structure of a transceiver device 102. As compared to the transceiver device 101, a terminal REXT for receiving the external reset signal EXT from outside is newly provided and the reset circuit 83 shown in FIG. 8 is used as a reset circuit. Accordingly, the effect of preventing influence of malfunction of the signal VO can also be accomplished in the transceiver device 102.

(C) Third Preferred Embodiment:

In the structures of the first through second preferred embodiments, the error signal ERR is canceled when a bus recovers to normal conditions. This has no problems in ordinary use. However, there is a necessity of quick inspection and repair when an abnormality occurs if this is used in the LAN to be provided in a car, for example, which especially requires reliability. Accordingly, in such structure in which the error signal ERR is canceled with recovery of buses from abnormality as in the above-described embodiments, it may not be desirable because an error can be overlooked in some systems.

Therefore, it is preferred to make a structure in which if an abnormality once occurs and an error signal ERR is generated, its history is held by another output.

Figure 10:
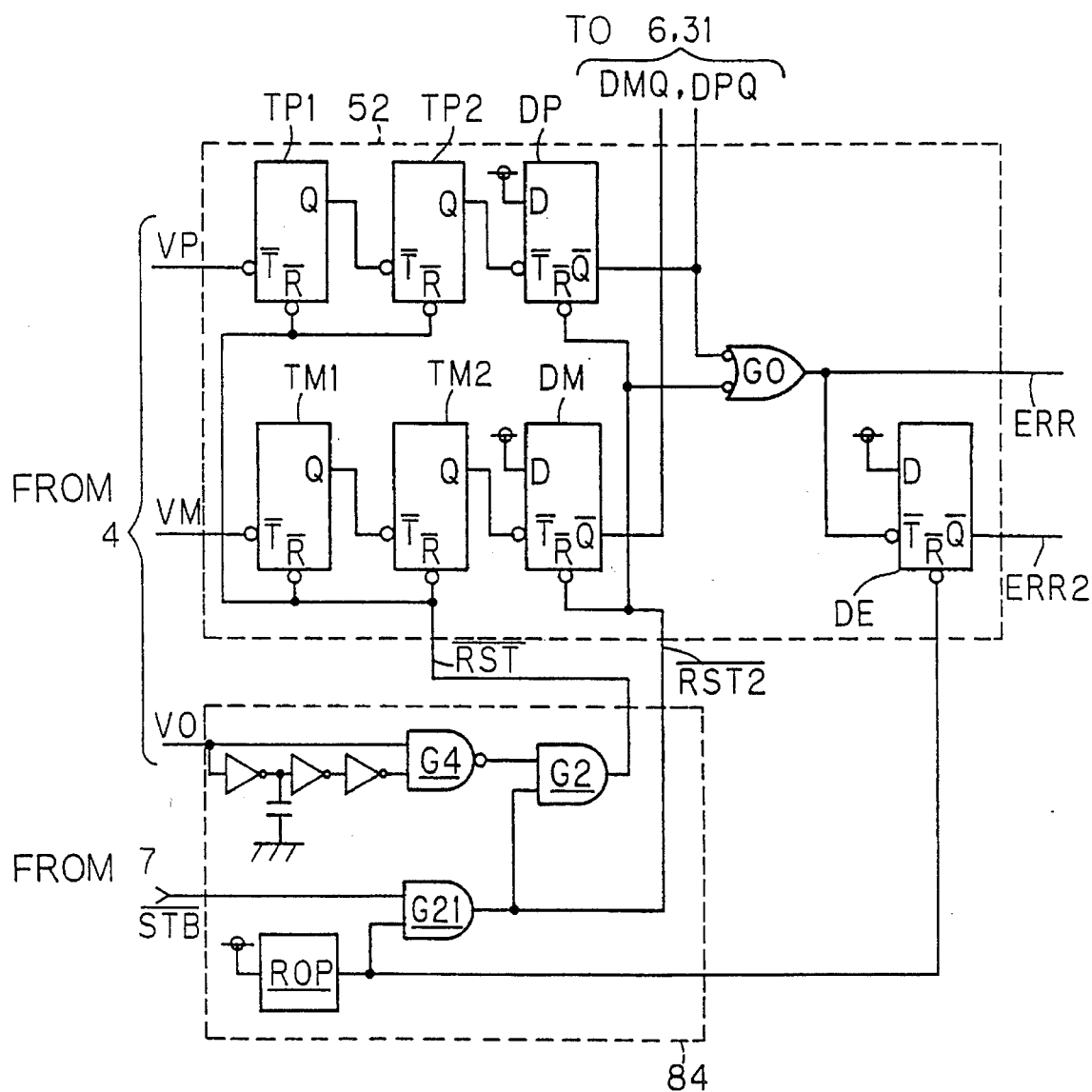
FIG. 10 is a circuit diagram for describing the third preferred embodiment of the present invention.

FIG. 10 is a circuit diagram showing specific structure of an abnormality detecting circuit 52 and a reset circuit 84 which are applied in the third preferred embodiment. As compared with the abnormality detecting circuit 51 shown in FIG. 6, the abnormality detecting circuit 52 now has a D flip-flop DE. The D flip-flop DE outputs a signal ERR2 at a fall of the error signal ERR. This is held until the flip-flop DE is reset.

The reset circuit 84 directly pulls out an output of the power-supply reset circuit ROP to outside in the reset circuit 81 shown in FIG. 6. The flip-flop DE is reset with the output of the power-supply reset circuit ROP, so that the history of presence/absence of fall of the error signal ERR is held until the power-supply is turned off.

(D) Fourth Preferred Embodiment:

Conventionally, power-supply must be turned on again to recover the driver circuit 2 even if the transmission line 300 recovered from an abnormality because no unit provides data to the transmission line 300. In the fourth preferred embodiment, regardless of absence/presence of recovery of the transmission line 300, at least one of driver circuits of units connected to the transmission line 300 is forced to be driven to supply data to the transmission line 300.

By doing so, if the transmission line 300 has recovered, the reset circuit activates the reset signal $\overline{RST}$ to cancel stop of driving of driver circuit, and the communications among units can be enabled.

Figure 11:
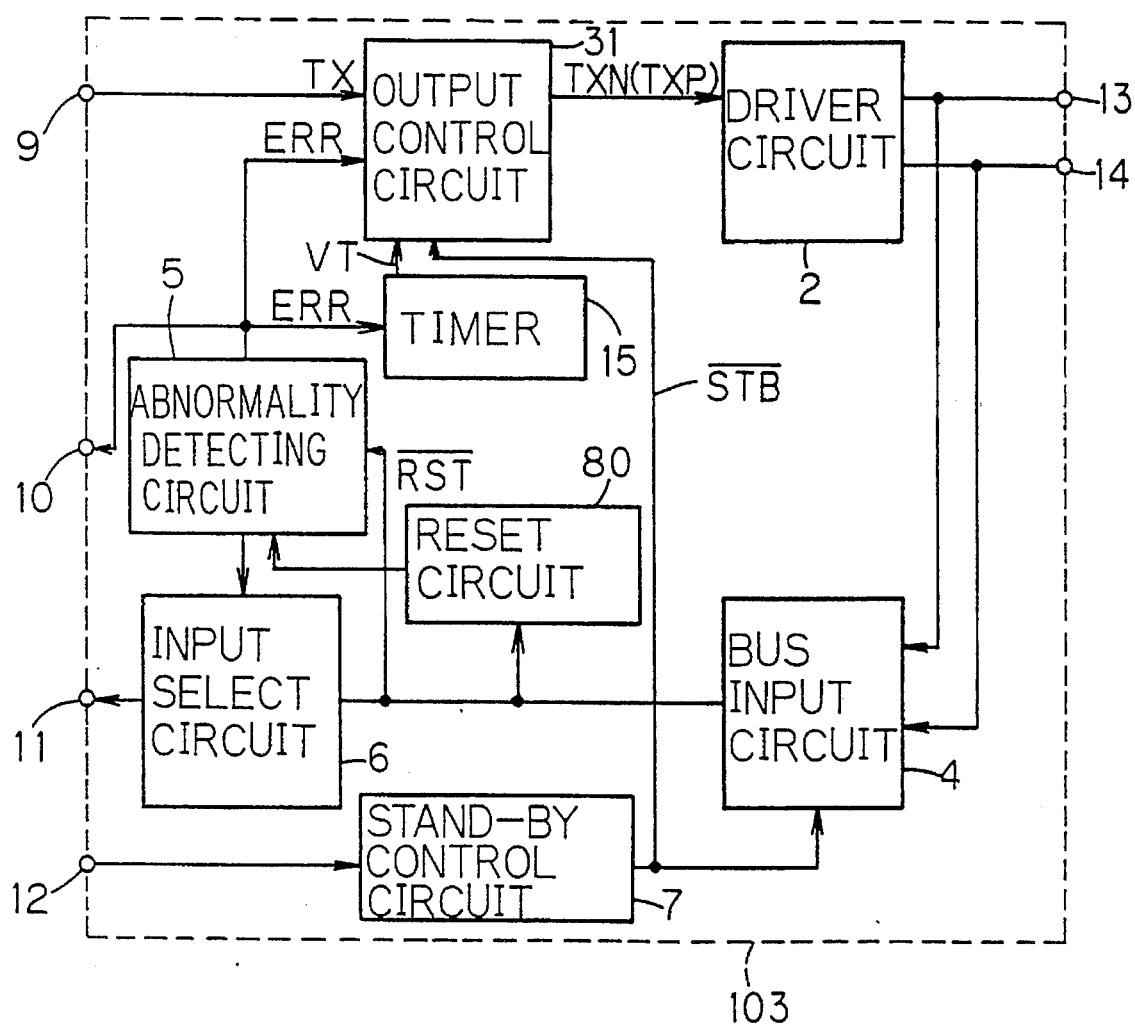
FIG. 11 is a block diagram for describing the first specific structure of the fourth preferred embodiment of the present invention.
Figure 40:
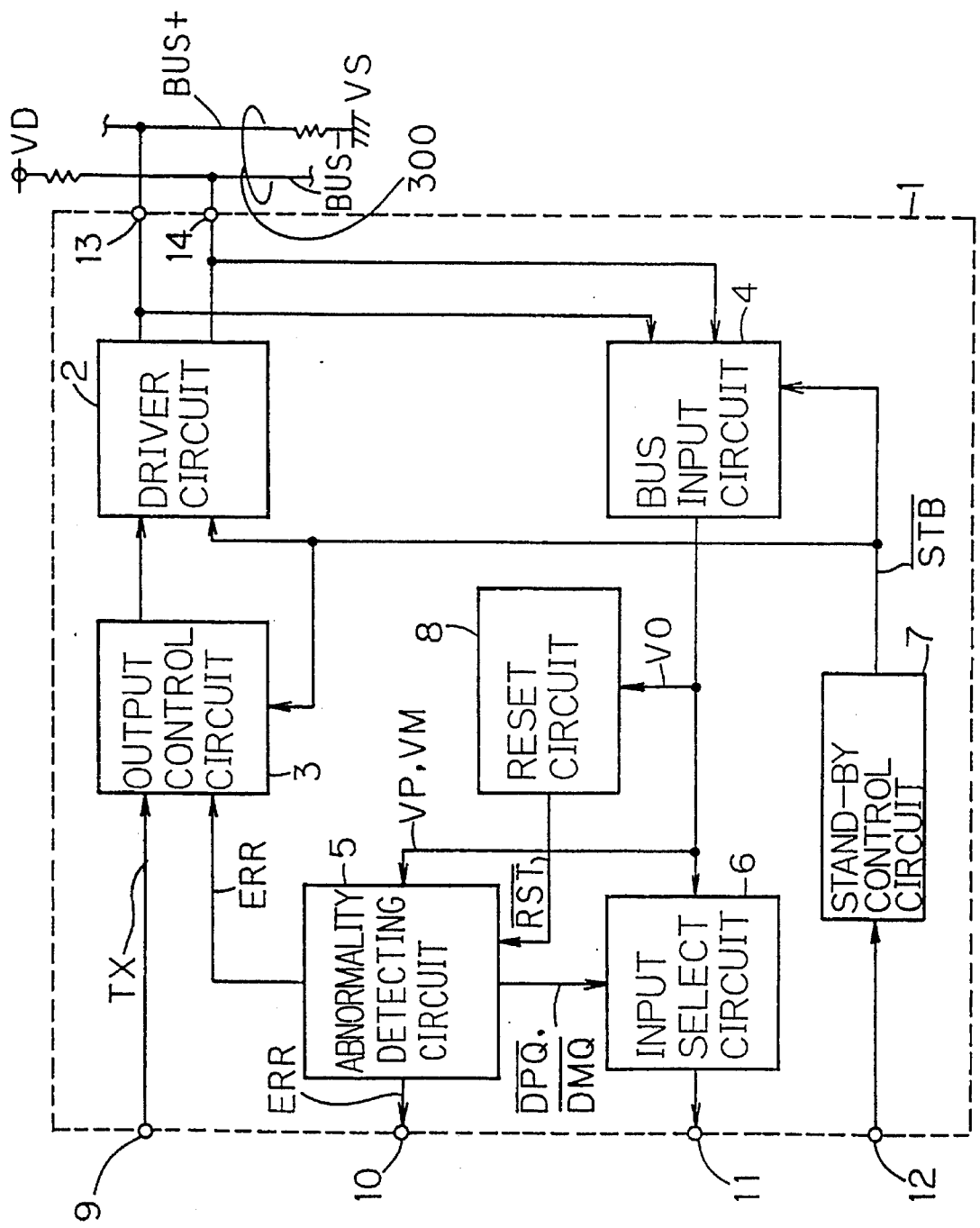
FIG. 40 is a block diagram for describing the conventional art.
Figure 41:
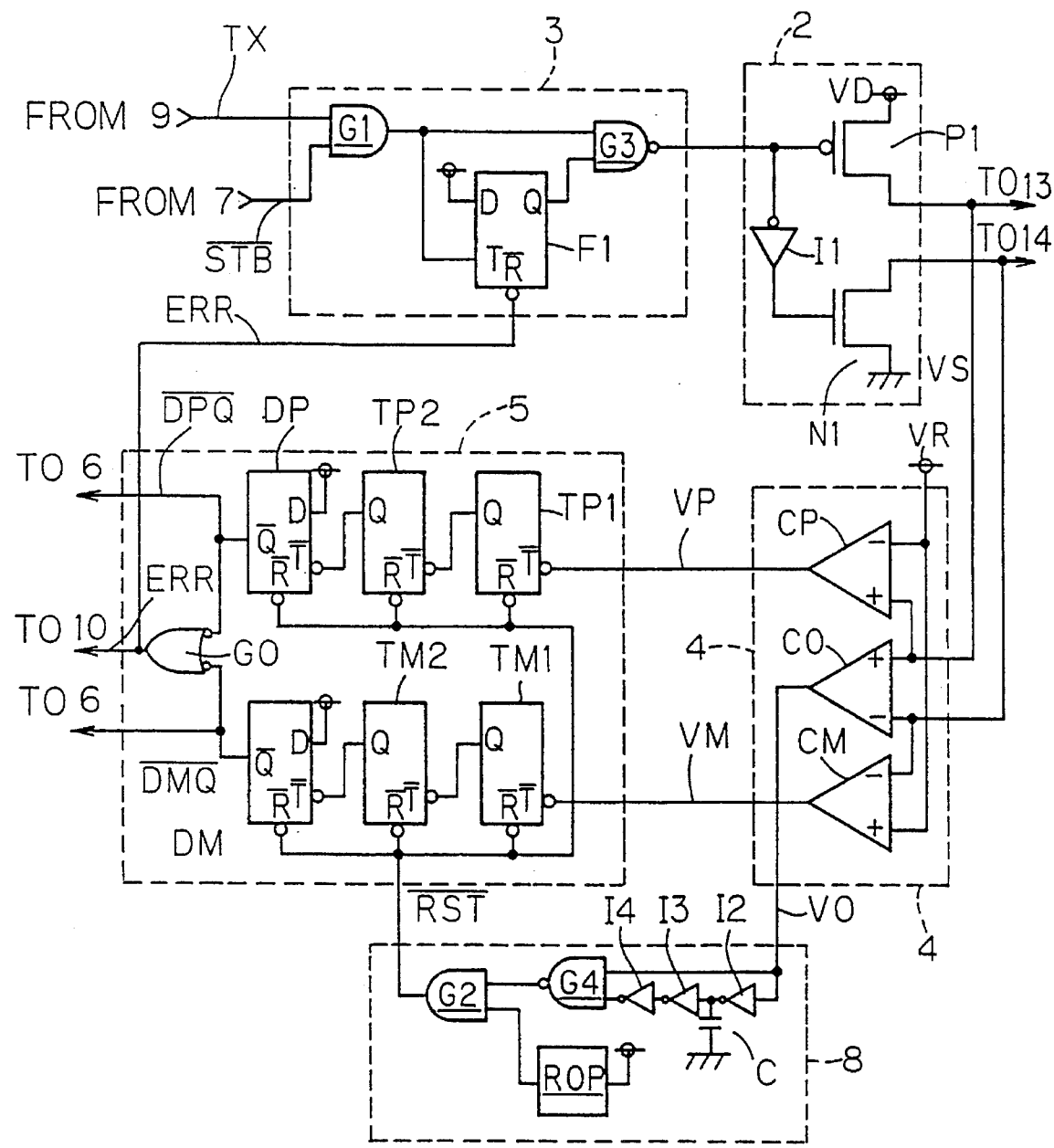
FIG. 41 is a circuit diagram for describing the conventional art.

(D-1) First Specific Structure:

FIG. 11 is a block diagram showing structure of a transceiver device 103 according to the fourth preferred embodiment. As compared to the conventional transceiver device 1 shown is FIG. 40, a timer 15 is added, and the output control circuit 3 is replaced by an output control circuit 31 and the reset circuit 8 is replaced by a reset circuit 80, respectively. The timer 15 is connected to the abnormality detecting circuit 5, and the output control circuit 31. The driver circuit 2 receives signals TXN, TXP to drive the buses BUS+, BUS− through the terminals 13 and 14. The signals TXN, TXP, however, are the same signals here.

Operations in the case of occurrence of an abnormality on a bus are the same as the conventional ones. That is say, the driver circuit 2 controlled by the output control circuit 31 stops drivings of both of the two buses BUS+, BUS−.

An error signal ERR outputted from the abnormal detecting circuit 5 is then applied to the timer 15. The output control circuit 31 then temporarily releases stop of drivings of the two buses BUS+, BUS− by the driver circuit 2 after a predetermined period controlled by the timer 15 with trigger of the error signal ERR. With the release period being set relatively short, even if the bus has not recovered from the abnormality, the damage due to flow of large current to the driver circuit 2 can be suppressed.

When the bus line has recovered to the normal condition, the reset circuit 80 outputs a reset signal $\overline{RST}$ to reset the abnormality detecting circuit 5. This makes the error signal ERR inactive and the driver circuit 2 drives the two-wire system again. AT this time, the timer 15 is simultaneously reset.

However, if the bus is still in the abnormal condition, the reset circuit 80 does not operate, so that the driver circuit 2 continuously stops drivings of the buses BUS+, BUS−. Then, after a predetermined period, the stop of driving of the driver circuit 2 is temporarily canceled again. With this repeat, when the bus is recovered from the abnormality, the communication according to the two-wire system can be made without turning on the power-supply again.

Figure 12:
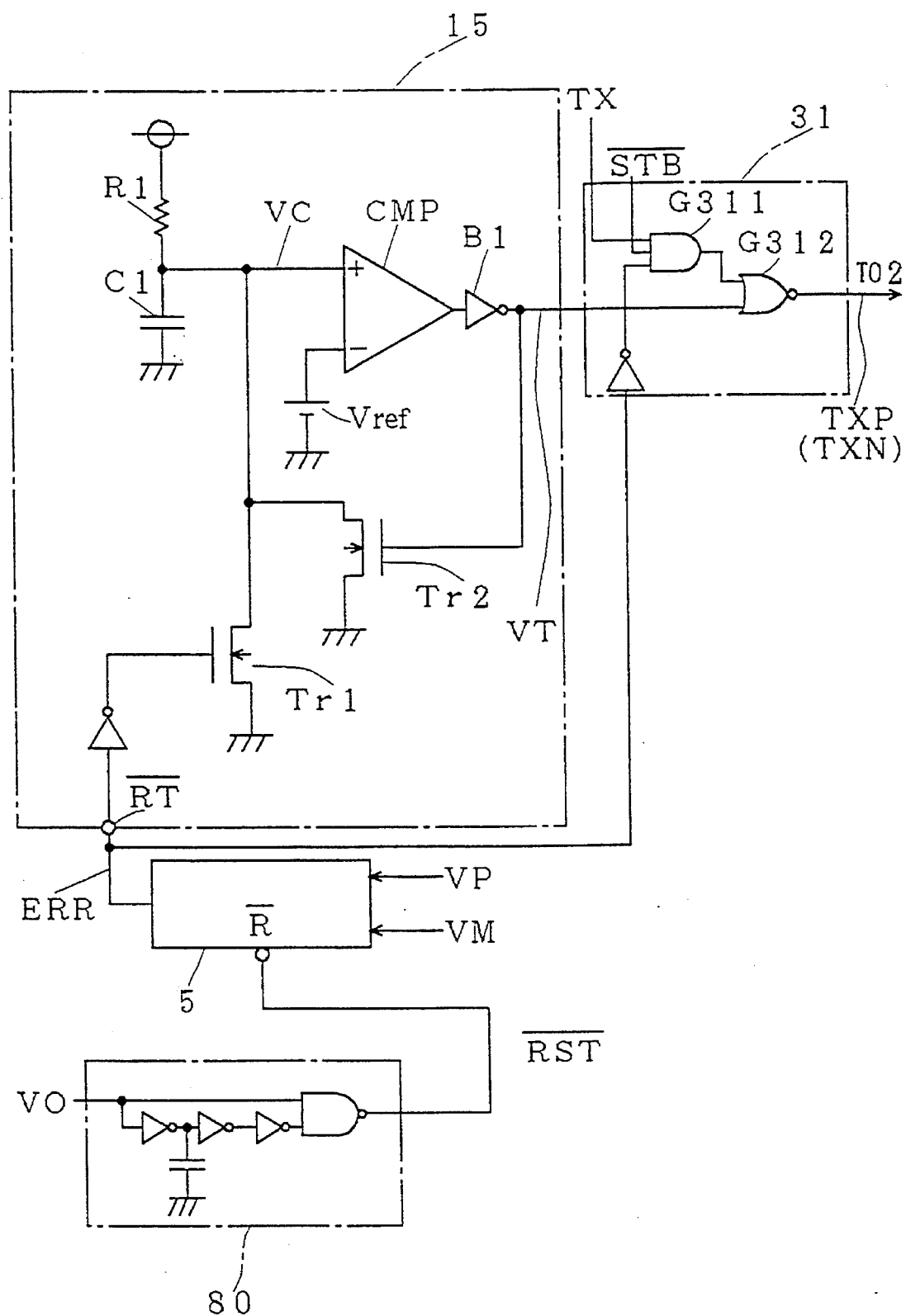
FIG. 12 is a circuit diagram for describing the first specific structure of the fourth preferred embodiment of the present invention.

FIG. 12 is a circuit diagram showing internal structures of and relation of connections among the timer 15, the output control circuit 31, the abnormality detecting circuit 5 and the reset circuit 80. The error circuit 80 has structure similar to the error circuit 8, which receives a signal VO and supplies a reset signal $\overline{RST}$ to a reset terminal $\overline{R}$ of the abnormality detecting circuit 5. The abnormality detecting circuit 5 further receives the signals VP and VM and outputs an error signal ERR as described above.

The timer 15 has a comparator CMP, a buffer B1, NMOS transistors Tr1, Tr2 and a CR circuit. An input end of the buffer B1 is connected to an output end of the comparator CMP, from which a signal VT is supplied to the output control circuit 31.

Drains of the transistors Tr1 and Tr2 are connected in common to a positive input end of the comparator CMP. Sources of the transistors Tr1 and Tr2 are grounded in common. A logical inversion of the error signal ERR applied to the error signal input end $\overline{RT}$ is applied to a gate of the transistor Tr1, and an output end of the buffer B1 is connected to a gate of the transistor Tr2. A resistor R1 is connected between the positive input end of the comparator CMP and high potential power-supply, and capacitance C1 is connected between the positive input end of the comparator CMP and ground, respectively. Reference potential Vref is provided to the negative input end of the comparator CMP.

The output control circuit 31 has an AND gate G311 and a NOR gate G312. To the gate G311, input data TX, a stand-by signal $\overline{STB}$ and logical inversion of the error signal ERR are applied. The gate G312 takes inversion of logical sum of output of the gate G311 and the signal VT, which is given to the drive circuit 2 as a signal TXP(TXN).

Figure 13:
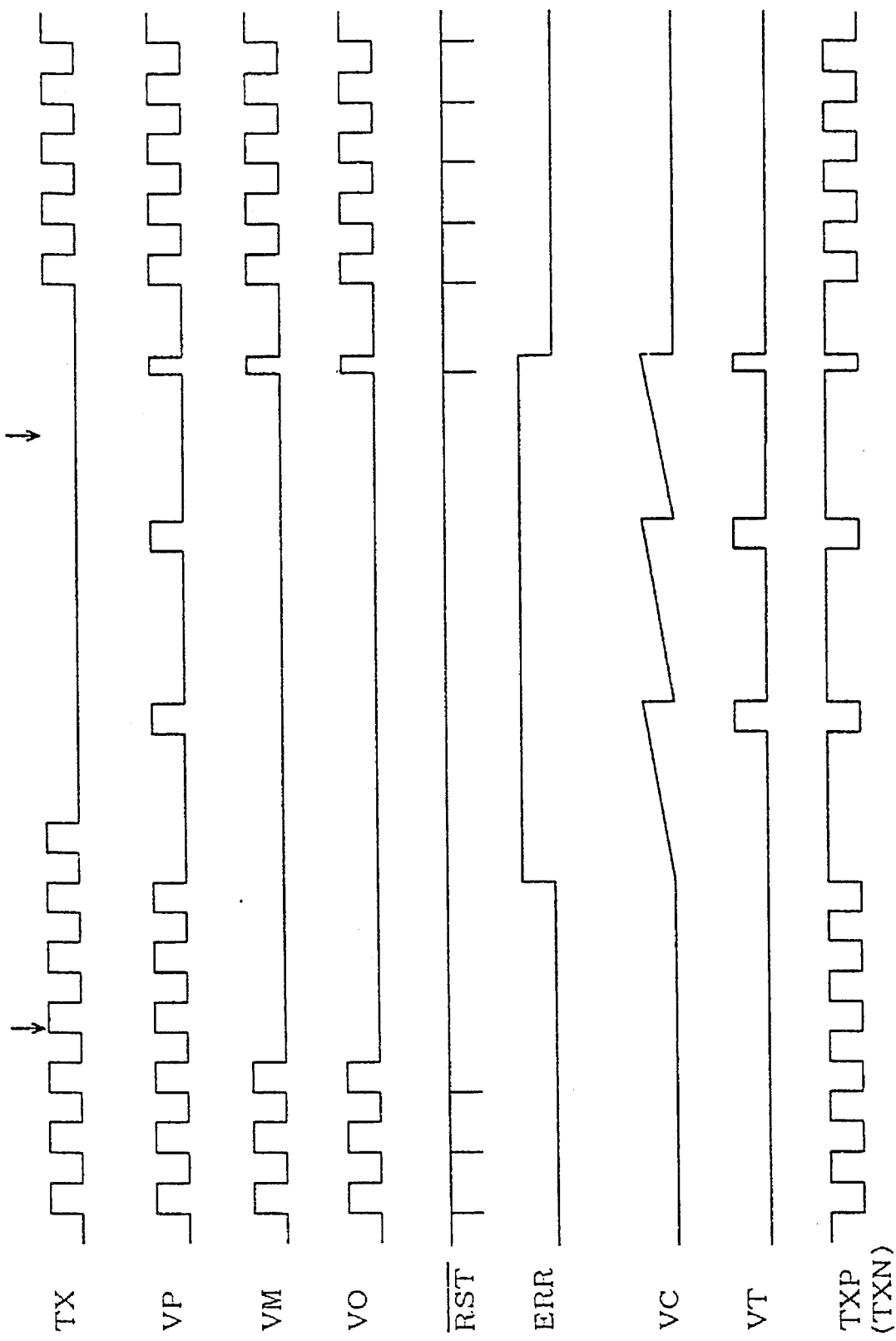
FIGS. 13 and 14 are timing charts for describing operation of the first specific structure of the fourth preferred embodiment of the present invention.

FIG. 13 is a timing chart showing operation in the case where the BUS– is shorted to potential VD. When such a failure occurs both signals VM and VO go to "L". Accordingly, the reset signal $\overline{RST}$ becomes inactive, a predetermined number of signals VP are counted in the abnormality detecting circuit 5, and the error signal ERR is activated. Thus the gate G311 is closed and the signal TXP(TXN) attains "L", where data is not outputted to the LAN transmission line 300.

On the other hand, because the error signal ERR is activated, the transistor Tr1 turns off and the capacitance C1 is charged through the resistance R1, so that the potential VC at the positive input end of the comparator CMP rises. When the potential VC exceeds the reference potential Vref, the potential at the output end of the comparator CM rises, the transistor Tr2 turns on, and the capacitance C1 is discharged, so that the potential VC at the positive input end of the comparator CMP falls. From when the potential at the output end of the comparator CMP rises and until when the potential VC falls, the signal VT which is logical inversion at the output end of the comparator CMP is at "H". The gate G312 inverts pulse ill the signal VT and outputs as a signal TXP(TXN), therefore data in the form of pulse is provided to the LAN transmission line 300.

Even if the BUS– has not recovered from the failure yet, a signal reflecting the signal VT is on the BUS+ and the signal VP attains "H" in the form of pulse. However, since the signals VM and VO are still at "L", the operation of the timer 15 is repeated.

If the BUS– is recovered from the failure after that, not only the signal VP but also the signals VM and VO also attain "H" on the basis of the signal VT. Accordingly, the signals VP, VM, VO are in phase, and the reset signal $\overline{RST}$ is activated. As a result, the error signal ERR attains "L", with the result that the timer 15 stops and the driver circuit 2 operates normally again.

Figure 14:

FIG. 14 is a timing chart showing operation in which the BUS– is shorted to the potential VS. When such a failure occurs, both of the signals VM and VO attain "H". Accordingly, the reset signal $\overline{RST}$ becomes inactive, a predetermined number of signals VP are counted in the abnormality detecting circuit 5 and the error signal ERR is activated. Thus the gate G311 is closed and the signal TXP(TXN) becomes "L", where no data is outputted to the LAN transmission line 300.

The timer 15 operates similarly to that shown in FIG. 13, and a signal VT is obtained. When the failure is repaired, the signals VM and VO attain "L", the signals VP, VM and VO get into the same phase on the basis of the signal VT, the reset signal $\overline{RST}$ is activated, and the error signal ERR attains "L", the driver circuit 2 therefore operates normally.

Also when a failure takes place on the BUS+ and is repaired, communication according to the two-wire system automatically recovers in the same way.

Note that although a signal TX is not inputted during the period of occurrence of failure in FIGS. 13 and 14, if the signal TX is inputted during the period of failure, it is inhibited from passing through at the gate G311, therefore there is no difference in operation of the output control circuit 31.

Figure 15:
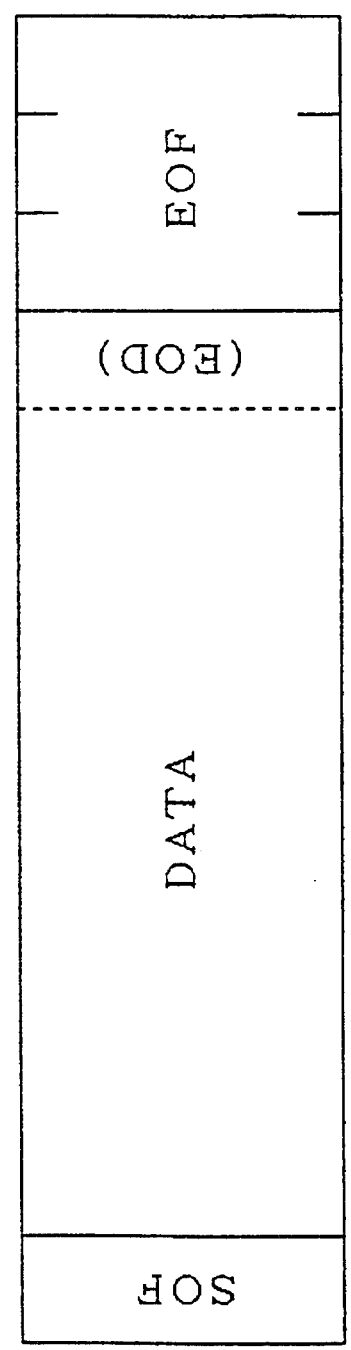
FIG. 15 is a schematic diagram for describing operation of the first specific structure of the fourth preferred embodiment of the present invention.

Now, the cycle of the timer is limited due to a control method for the LAN transmission line, communication protocol and the like. FIG. 15 is a schematic diagram showing data for one frame in detail. The frame includes its head SOF, information to be transmitted DATA and frame end EOF. The frame end EOF is located behind the end EOD of the information DATA, where the length of the frame end EOF is three bits, for example, which value is always held at "L".

The timer never outputs a signal VT because it is continuously reset when data is on the LAN transmission line 300 normally. If it is not so, however, since an attempt is made to provide pulse on the LAN transmission line 300 after a predetermined period from occurrence of failure, next frame may overlap in a period to be the frame end EOF of a certain frame if the cycle of the timer is shorter than the length of the frame end EOF. It causes trouble in the communication protocol, so that the minimum value of the cycle of timer must be longer than the frame end EOF.

On the other hand, various processings for errors are performed in the communication system, and the maximum value of the periodic time of the timer may be determined according to the same. A value on the order of several ms through several tens of ms is introduced, as the maximum value, but it can not be absolute because the value differs depending on format of data, communication protocol and the like.

Representatively, the cycle of timer is selected to be a value not more than 100 µs, which may be 48 µs, for example, and the pulse width of signal VT is selected to be 12 µs.

(D-2) Second Specific structure:

As shown in the first preferred embodiment, this embodiment can also be applied to a transceiver device in which communication is enabled by turning off only a bus having an abnormality and using the other normal bus.

Figure 16:
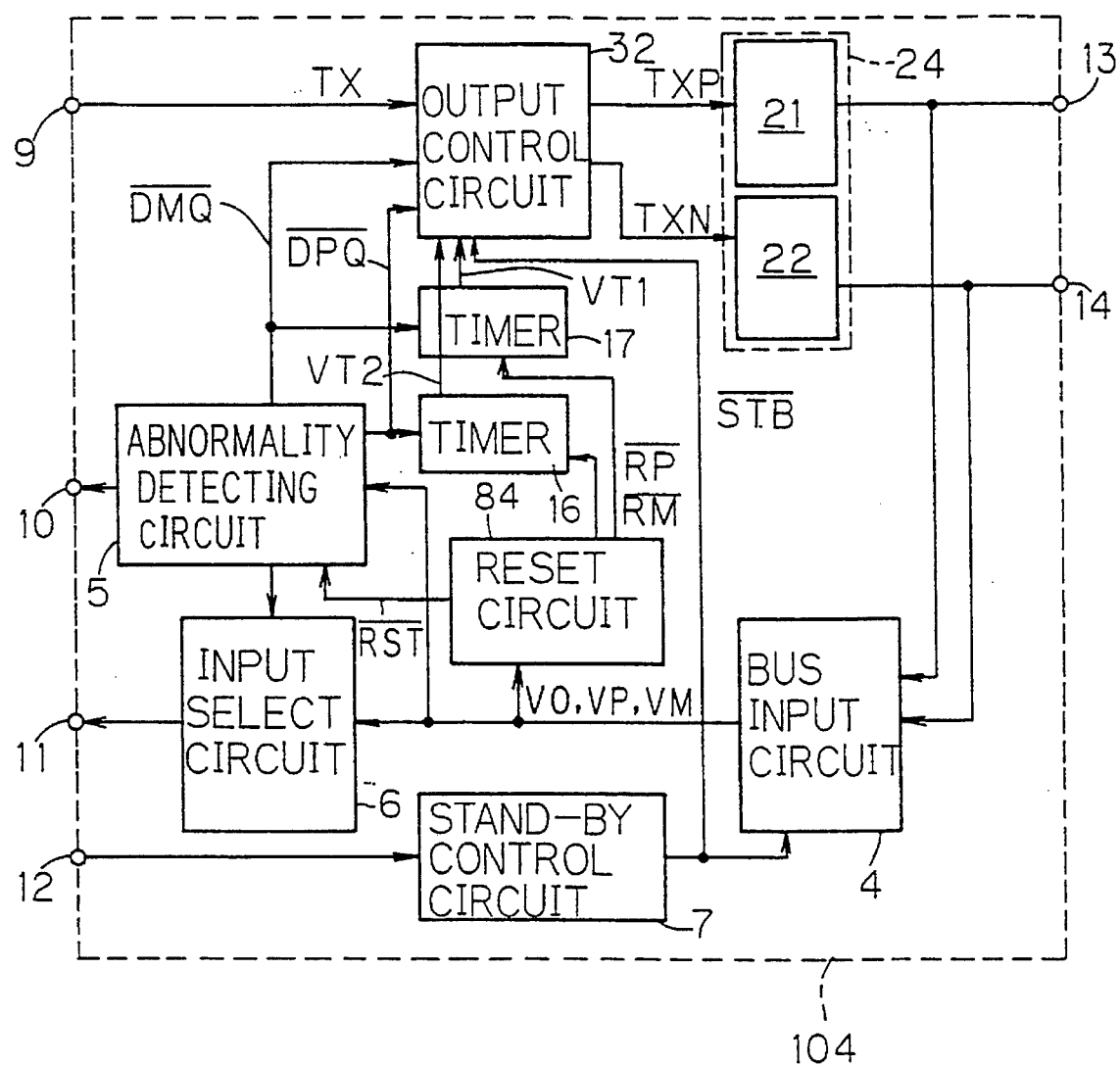
FIG. 16 is a block diagram for describing the second specific structure of the fourth preferred embodiment of the present invention.

FIG. 16 is a block diagram showing structure of a transceiver device 104 in which this embodiment is applied to a transceiver device which enables communication by turning off only a driver circuit driving a bus having an abnormality and using the other normal bus. A driver circuit 24 includes driver circuits 21 and 22 for driving buses BUS+ and BUS– through terminals 13 and 14, respectively. A pair of timers 16 and 17 are provided in place of the timer 15 in the transceiver device 103 shown in FIG. 11. Also in place of the output control circuit 31 and the reset circuit 80, an output control circuit 32 and a reset circuit 84 are provided, respectively.

A signal $\overline{DMQ}$ indicating an abnormality on the bus BUS+ from the abnormality detecting circuit 5 and a signal $\overline{RP}$ from the reset circuit 84 are supplied to the timer 16, respectively. To the timer 17, a signal $\overline{DPQ}$ indicating an abnormality on the bus BUS– is supplied from the abnormality detecting circuit 5, and a signal $\overline{RM}$ is supplied from the reset circuit 84, respectively. Both the signals $\overline{DMQ}$ and $\overline{DPQ}$ are supplied to the output control circuit 32 in addition to the input data TX.

When an abnormality occurs on the bus BUS–, the output control circuit 32 stops driving of the driver circuit 22 with the signal $\overline{DPQ}$ from the abnormality detecting circuit 5. The timer 16 operates with trigger of the signal $\overline{DPQ}$. Similarly to the timer 15 described in the second specific configuration, it temporarily drives the driver circuit 22 after a predetermined period has passed. In this way, if output data provided to the bus input circuit is normal, the signal $\overline{DPQ}$ of the abnormality detecting circuit 5 is made inactive with the reset signal $\overline{RM}$ outputted by the reset circuit 84, and driving of the driver circuit 22 is recovered through the output control circuit 32.

If the output data provided to the bus input circuit 4 is not normal, the timer 16 operates again to repeat the above-described control.

Figure 17:
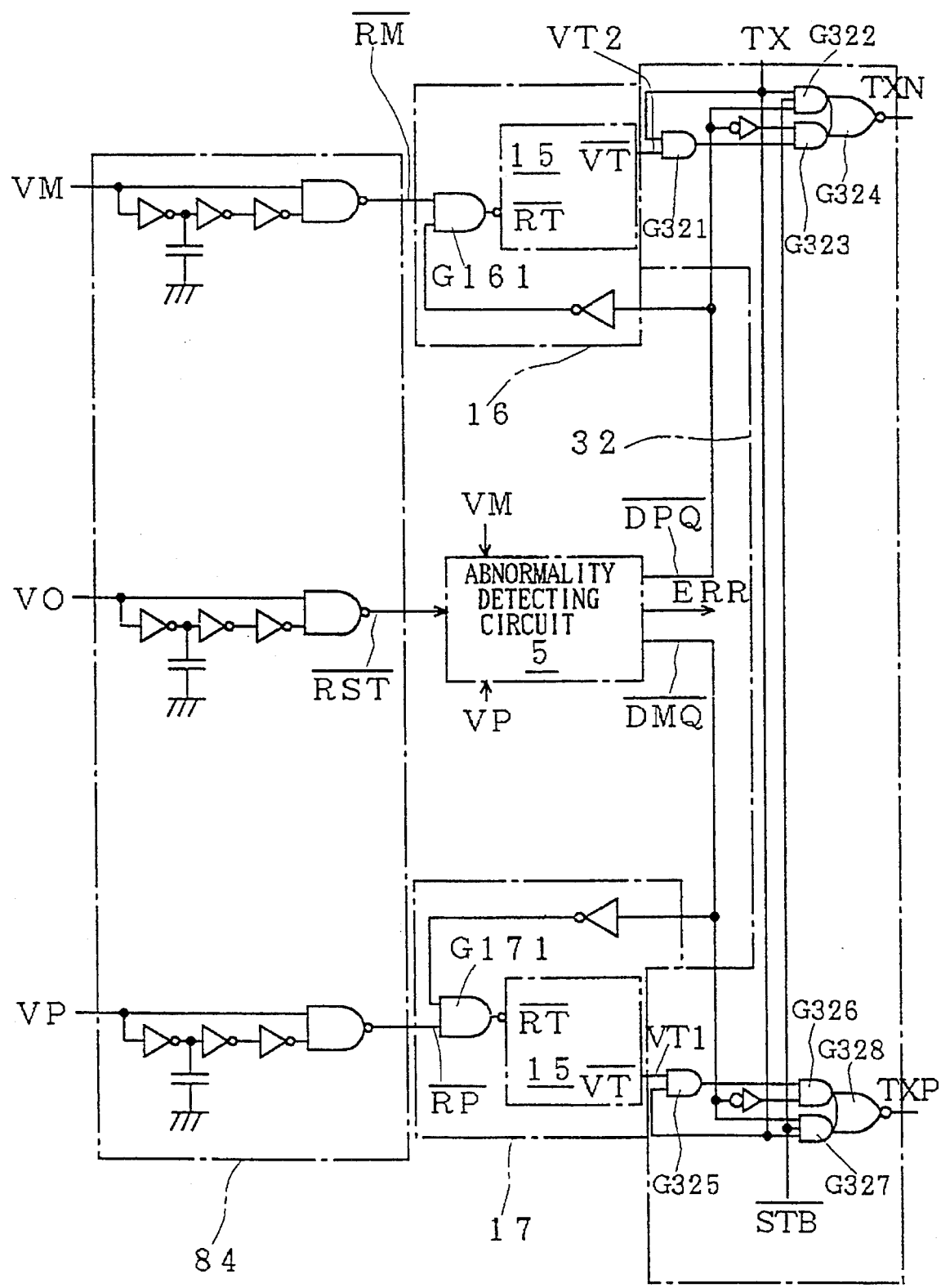
FIG. 17 is a circuit diagram for describing the second specific structure of the fourth preferred embodiment of the present invention.

FIG. 17 is a circuit diagram showing internal structure of the timers 16,17, the output control circuit 32 and the reset circuit 84 and relation of connections among them, or connections between them and the abnormality detecting circuit 5. The error circuit 84 has three sets of structures corresponding to the error circuit 80. It receives a signal VO and outputs a reset signal $\overline{RST}$ similarly to the error circuit 80. In addition, it receives the signals VP, VM and correspondingly outputs reset signals $\overline{RP}$ and $\overline{RM}$, respectively. The abnormality detecting circuit 5 receives the reset signal $\overline{RST}$ at its reset terminal, and outputs signals $\overline{DPQ}$ and $\overline{DMQ}$ as shown in the second preferred embodiment.

The timer 16 has the timer 15 shown in FIG. 12 and an AND gate G161 having an output end connected to its error signal input end RT. The gate G161 takes a logical product of the reset signal $\overline{RM}$ and inversion of the signal $\overline{DPQ}$ (signal DPQ). Accordingly, while the reset signal $\overline{RM}$ is active, the timer 16 is continuously reset and not affected by the signal $\overline{DPQ}$.

The timer 17 has a structure similar to the timer 16, in which an AND gate G171 takes logical product of the reset signal $\overline{RP}$ and inversion of the signal $\overline{DMQ}$ (signal DMQ). Thus while the reset signal $\overline{RP}$ is active, the timer 16 is continuously reset and not affected by the signal $\overline{DMQ}$.

On the other hand, the output control circuit 32 has AND gates G321–G323, G325–G327, and NOR gates G324, G328. The gate G321 takes logical product of the signal VT2 which is output of the timer 16 and the input data TX, and the Gate G325 takes logical product of the signal VT1 which is output of the timer 17 and the input data TX. The gate G322 takes logical product of a stand-by signal $\overline{STB}$, the input data TX and the signal $\overline{DPQ}$, and the gate G327 takes logical product of the stand-by signal $\overline{STB}$, the input data TX and the signal $\overline{DMQ}$. The gate G323 takes logical product of output of the gate G321 and inversion of the signal $\overline{DPQ}$ (signal DPQ), and the gate G326 takes logical product of output of the gate G325 and inversion of the signal $\overline{DMQ}$ (signal DMQ). The gate G324 outputs as a signal TXN inversion of logical sum of output of the gate G322 and output of the gate G323. The gate G328 outputs as a signal TXP inversion of logical sum of output of the gate G326 and output of the gate G327.

Figure 18:
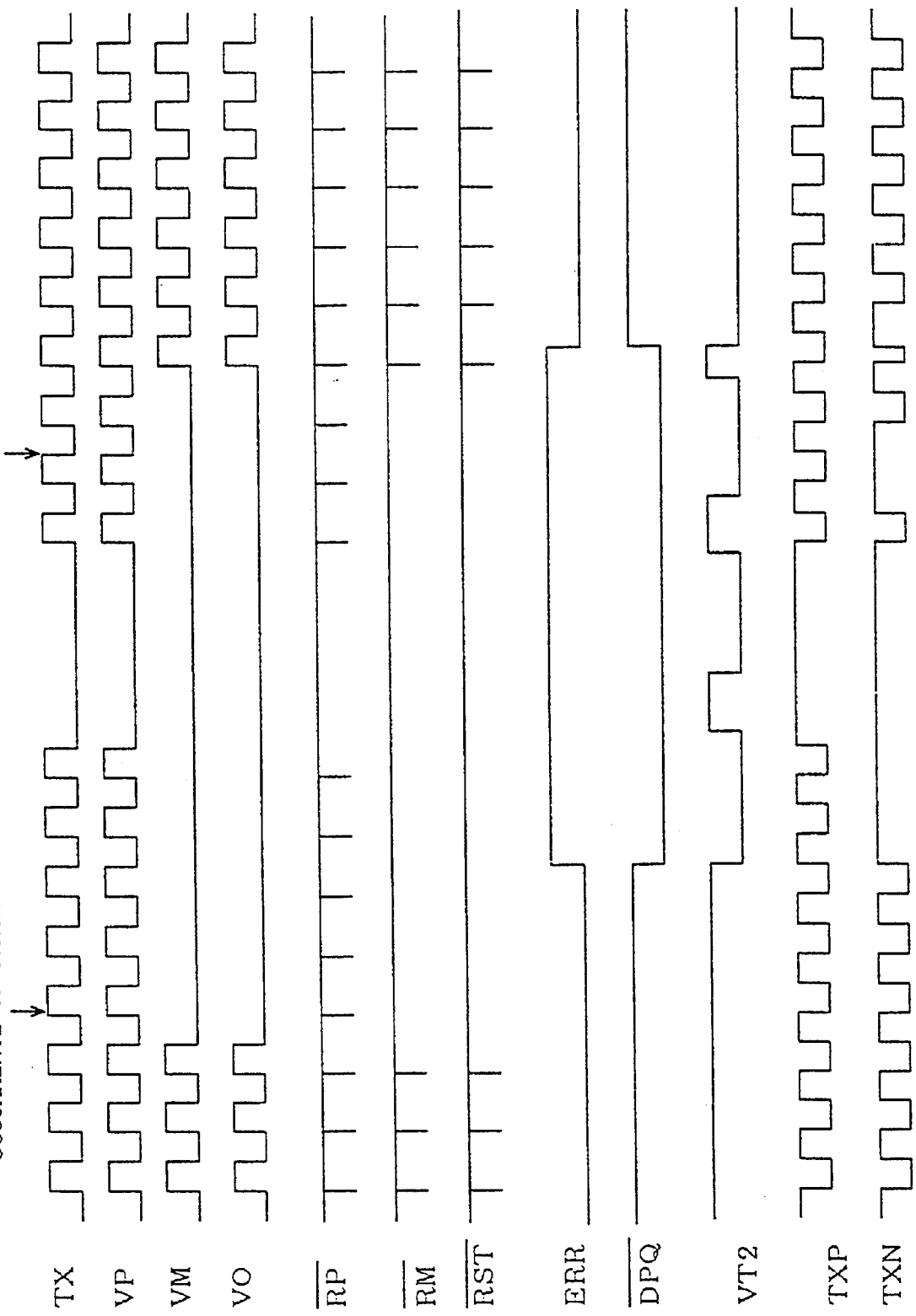
FIGS. 18 and 19 are timing charts for describing operation of the second specific structure of the fourth preferred embodiment of the present invention.

FIG. 18 is a timing chart showing operation in the case in which the BUS– is shorted to the potential VD. When such a failure takes place, both the signals VM and VO attain "L". Accordingly the reset signal $\overline{RST}$ is made inactive, a predetermined number of signals VP are counted in the abnormality detecting circuit 5 and the signal $\overline{DPQ}$ is activated (goes to "L"). The output of the gate G322 becomes "L" accordingly.

On the other hand, since the signal VM attains "L", the reset signal $\overline{RM}$ outputted by the reset circuit 84 is made inactive (stays at "H"). Accordingly, the gate G161 is opened and the timer 15 starts with a fall of the signal $\overline{DPQ}$. Thus the signal VT2 which is an output of the timer 16 outputs in a certain cycle positive pulses until the failure is repaired.

Now, the gate G321 opens for the width of the positive pulse (the period of "H") of this signal VT2. Therefore, in this period, the output of the gate 323 and the signal TXN reflects the value of the input data TX. Accordingly, the driver 22 is driven if the input data TX is activated in this period. However, since the BUS– stays still at "L" in the period of failure, the data is not provided, and the operation of the timer 16 is repeated.

After recovery of the BUS– from the failure , if the input data TX is activated in a period in which the signal VT2 attains "L", the drive 22 is driven and data is provided on the BUS–. Thus the signals VM, VP and VO become in-phase and the signal $\overline{DPQ}$ becomes inactive. This resets the timer 16 and the operation returns to the communication of the two-wire system.

Figure 19:
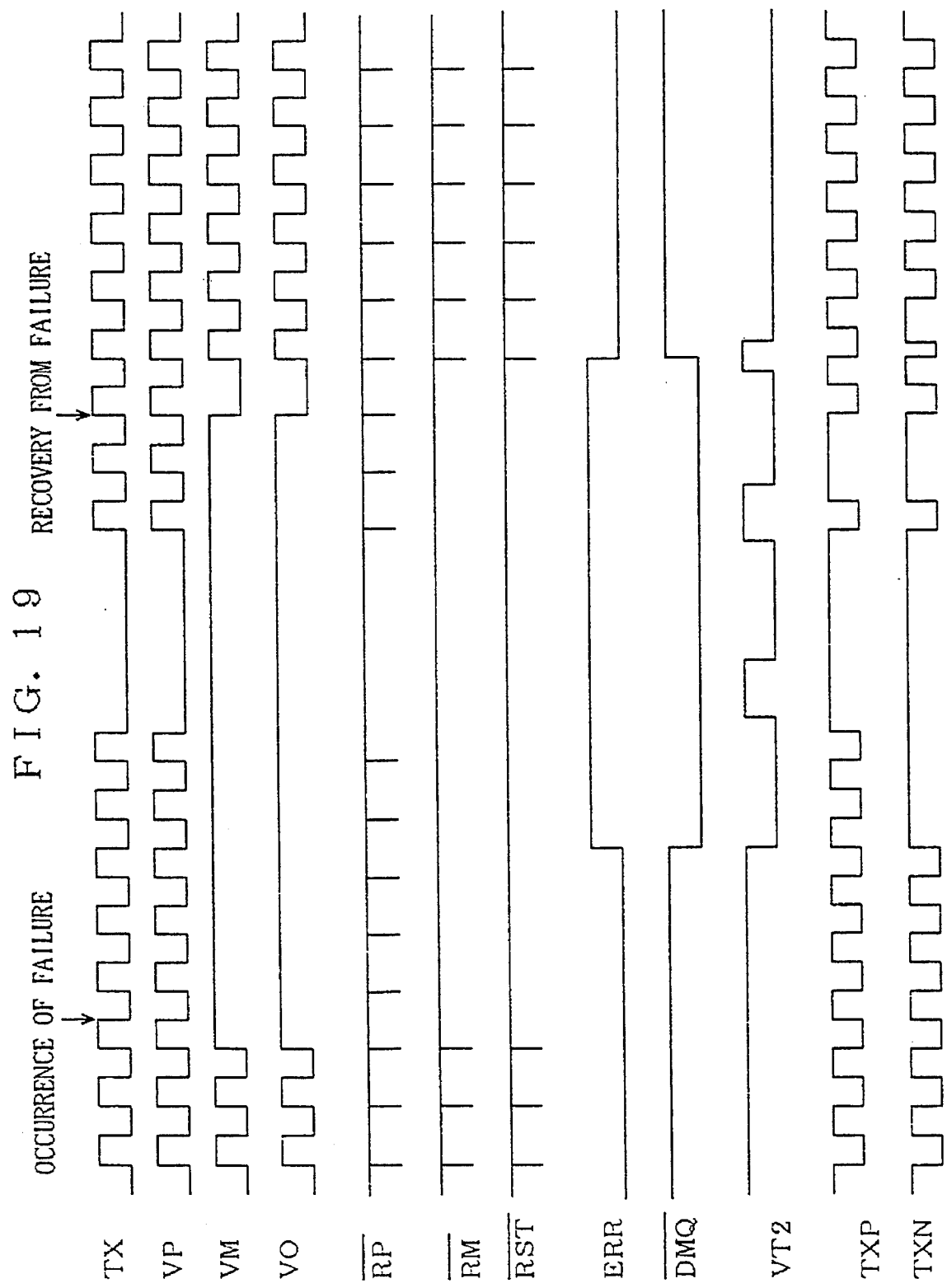

FIG. 19 is a timing chart showing operation in the case under which the BUS– is shorted to the potential VS. When such a failure takes place, signals VM, BO attain "H". Other operations are the same as those shown in FIG. 18.

If a failure occurs on the BUS+, the timer 17 operates to return to the communicating condition of the two-wire system after recovery from the failure in the similar way to the above-described operations.

Accordingly, in the transceiver device enabling communication with one transmission line, it can also automatically return to the communicating condition of the two-wire system without turning on power-supply again since the recovery of transmission line is checked after a predetermined period has passed.

The same effects can be obtained using a one-shot multivibrator in place of the timers 16 and 17.

Figure 20:
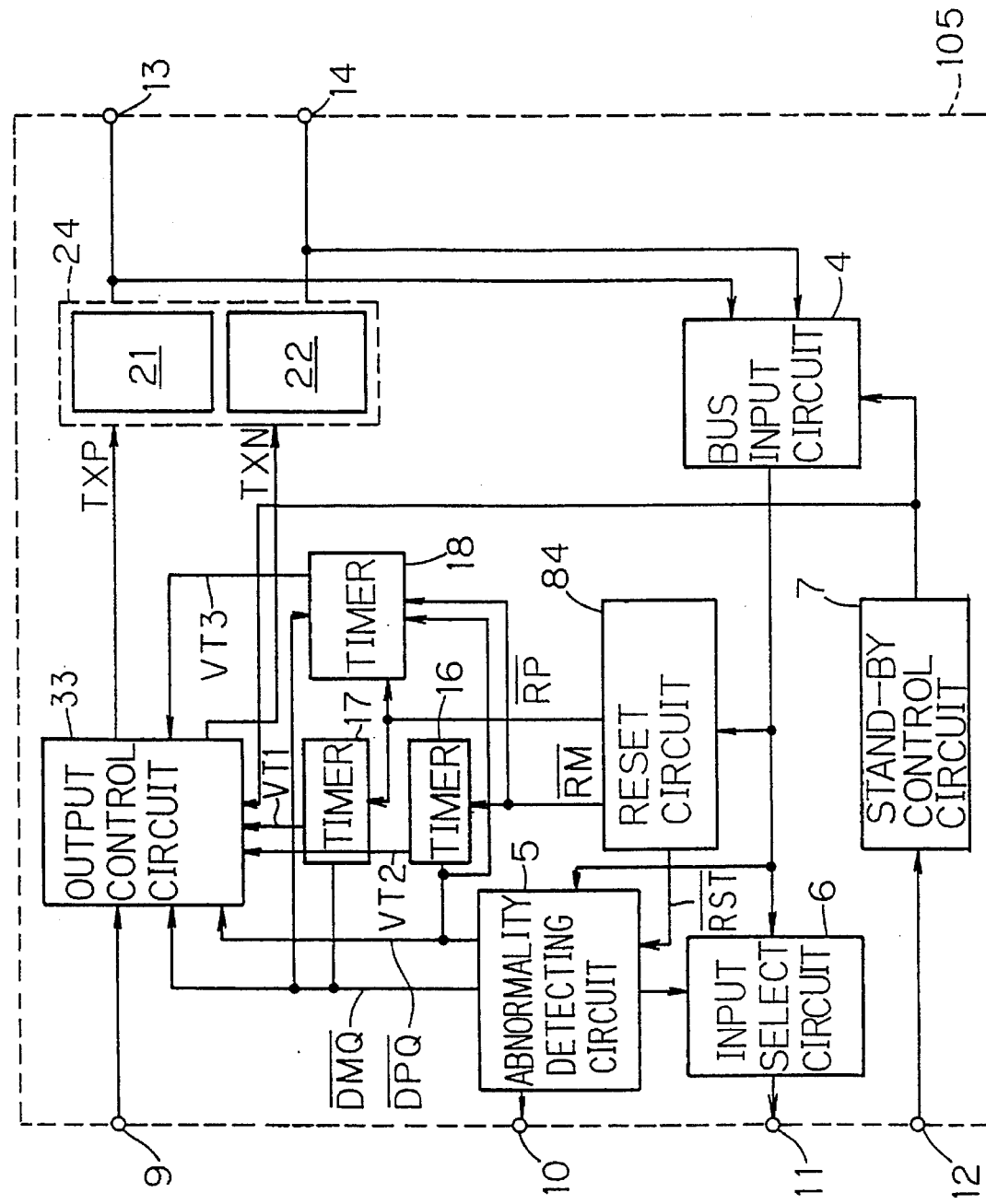
FIG. 20 is a block diagram for describing the third specific structure of the fourth preferred embodiment of the present invention.

(D-3) Third Specific Structure:

Furthermore, if abnormalities occur simultaneously on both of the transmission lines, the driver circuit 24 can be controlled so that communication according to single-wire system is done with recovery of one of the transmission lines. Structure of a transceiver device 105 is shown in FIG. 20 as a block diagram. In the structure, a timer 18 is further added to the transceiver device 104 shown in FIG. 16. Also, the output control circuit 30 is replaced by an output control circuit 33.

Both the signals $\overline{DMQ}$, $\overline{DPQ}$ are supplied to the timer 18, which operates when abnormalities occur on both of the buses BUS+, BUS– to output a signal VT3. Then, it temporarily operates both of the driver circuits 21 and 22 after a predetermined time has passed. By doing so, if either one of the buses BUS+, BUS– recovers, control can be performed to establish communication according to the single-wire system.

When temporarily driving a driver circuit which is stopping, if operation is introduced in which it is turned on and off twice or more in a predetermined period, and the error signal ERR and signals $\overline{DMQ}$, $\overline{DPQ}$ are made inactive when a determination is made that normal signals are outputted twice or more, the reliability of the recovery detection can be enhanced.

Also, it is possible to make the timers 15, 16 and 17 programmable to enable time setting from outside and changing times of timers for each unit.

(E) Fifth Preferred Embodiment:

The driver circuit can be automatically recovered without specially providing timers which are provided in the fourth preferred embodiment. Signals placed on a bus having no failure are counted, and when a predetermined number is counted, signals are placed on the BUS+ or BUS– having a failure by force.

Figure 21:
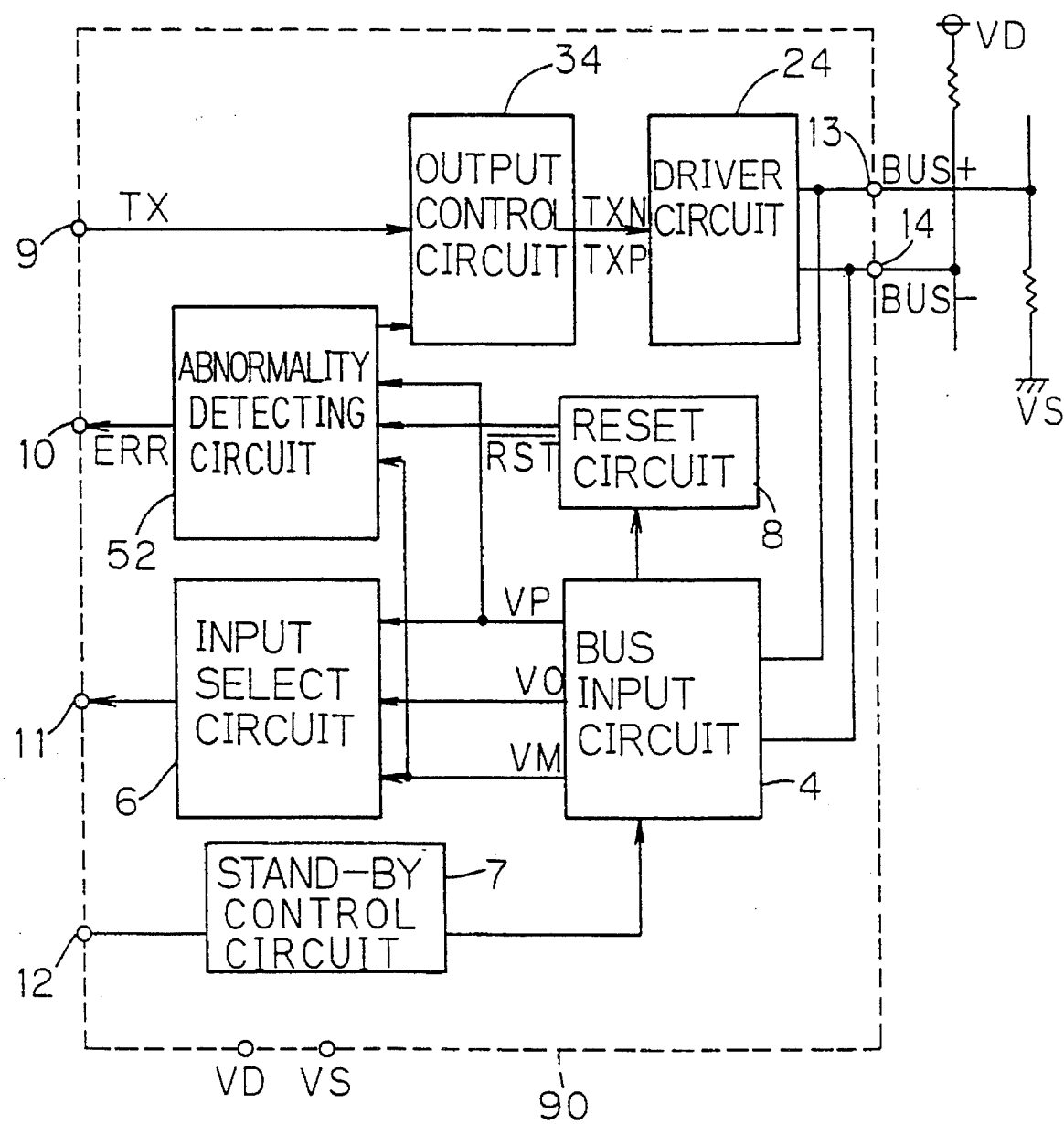
FIG. 21 is a block diagram for describing the first specific structure of the fifth preferred embodiment of the present invention.

(E-1) First Specific Structure:

FIG. 21 is a block diagram showing structure of a transceiver device 90 including an output control circuit 34 and an abnormality detecting circuit 52 and having an automatic recovering function.

Even when an abnormality takes place on one of buses, the output control circuit 34 counts signals provided to a bus operating normally on the basis of the input data TX, decodes its output, and drives part of the driver circuit 24 corresponding to the bus having the abnormality (driver circuit 21 or 22) at certain intervals.

When the bus recovers to normal condition, the counter is reset and processing for the abnormal condition is canceled. Now, when the bus has an abnormality, excessively large current flows to output, but it can be prevented from breakdown by making the intervals of driving the driver circuit 24 longer enough.

Figure 22:
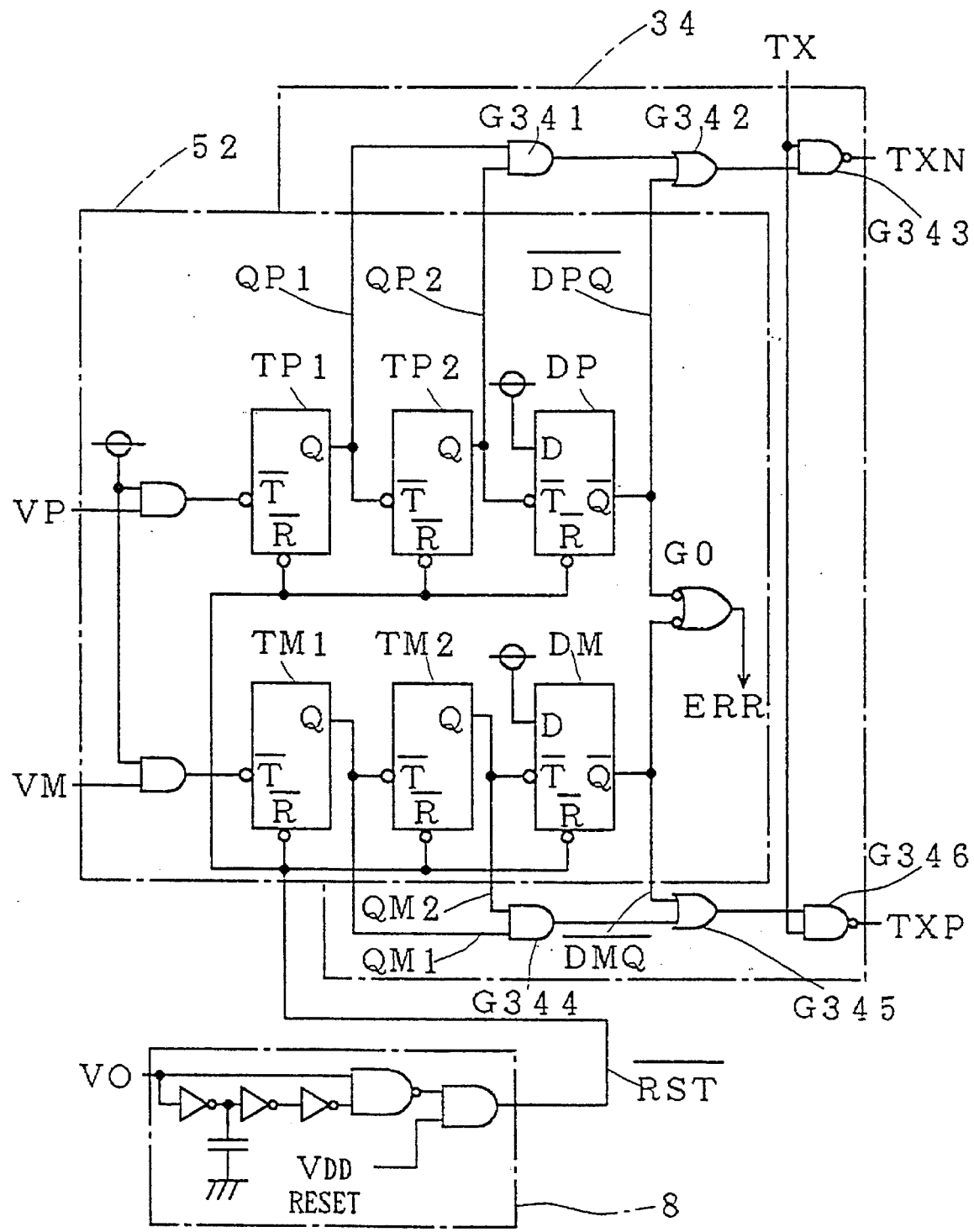
FIG. 22 is a circuit diagram for describing the first specific structure of the fifth preferred embodiment of the present invention.

In FIG. 22, the internal structures of the abnormality detecting circuit 52 and the output control circuit 34 and relations of connections thereof are shown. Similarly to the abnormality detecting circuit 5, the abnormality detecting circuit 52 has T flip-flops TP1, TP2 for counting the signal VP, a D flip-flop DP for latching output of the flip-flop TP2, T flip-flops TM1, TM2 for counting the signal VM, a D flip-flop DM for latching output of the flip-flop TM2, and a NAND gate G0 for taking logical sum of outputs of the D flip-flops DP, DM, and outputs an error signal ERR. The abnormality detecting circuit 52 is different from the abnormality detecting circuit 5 in that it outputs signals QP1, QP2, $\overline{DPQ}$, QM1, QM2, $\overline{DMQ}$ outputted from the flip-flops TP1, TP2, DP, TM1, TM2 and DM, respectively. Theses six signals are supplied to the output control circuit 34.

The output control circuit 34 has AND gates G341, G344, OR gates G342, G345, and NAND gates G343, G346. Two signals QP1 and QP2 are inputted to the gate G341, output of the gate G341 and a signal $\overline{DPQ}$ are inputted to the gate G342, and output of the gate G342 and input data TX are inputted to the gate G343, respectively. A signal TXN is outputted from the gate G343, which is transmitted to the driver circuit 24 (more specifically, to the driver 22 therein). Similarly, two signals QM1, QM2 are inputted to the gate G344, output of the gate G344 and a signal $\overline{DMQ}$ are inputted to the gate G345, and output of the gate G345 and the input data TX are inputted to the gate G346, respectively. A signal TXP is outputted from the gate G346, which is transmitted to the driver circuit 24 (more specifically, to the driver 21 therein).

Figure 23:
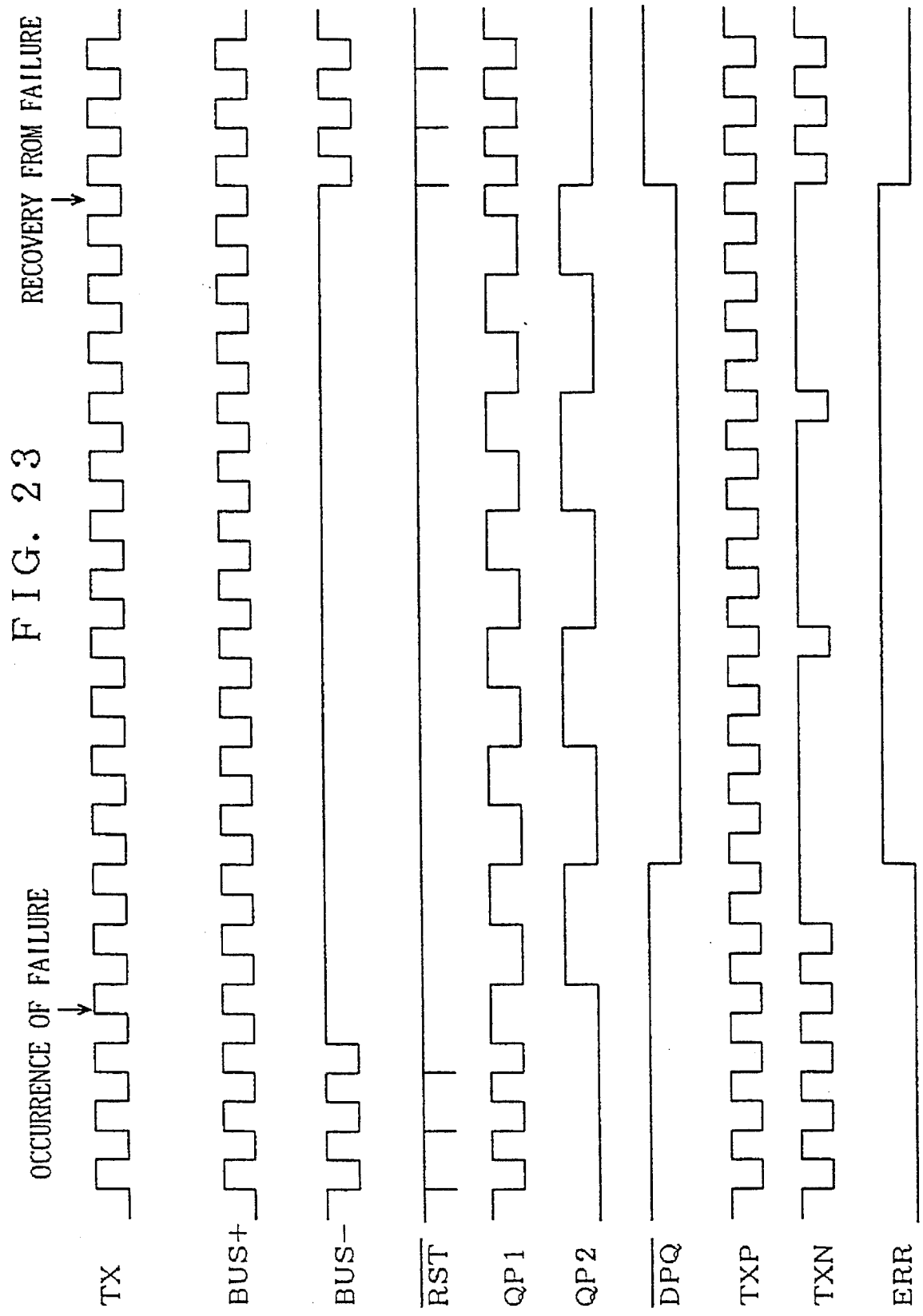
FIG. 23 and 24 are timing charts for describing operation of the first specific structure of the fifth preferred embodiment of the present invention.

FIG. 23 is a timing chart showing operation in the case in which the BUS– is shorted to potential VD. When such a failure takes place, the reset signal $\overline{RST}$ is not activated and the signal VP is counted, so that waveforms of signals QP1, QP2, $\overline{DPQ}$ are those shown in FIG. 23. The output control circuit 34 decodes the signals QP1 and QP2 and activates the signal TXN in a cycle four times the input data TX.

While the BUS– is not recovered, the signal TXN is periodically activated (corresponding to change of the input data TX), but when the BUS– is recovered, the reset signal $\overline{RST}$ is activated, and counting of the signal VP and decoding of the signals QP1, QP2 and $\overline{DPQ}$ have no meanings. Accordingly, the signal TXN has a value reflecting the input data TX, and the communication of the two-wire system is recovered.

Figure 24:
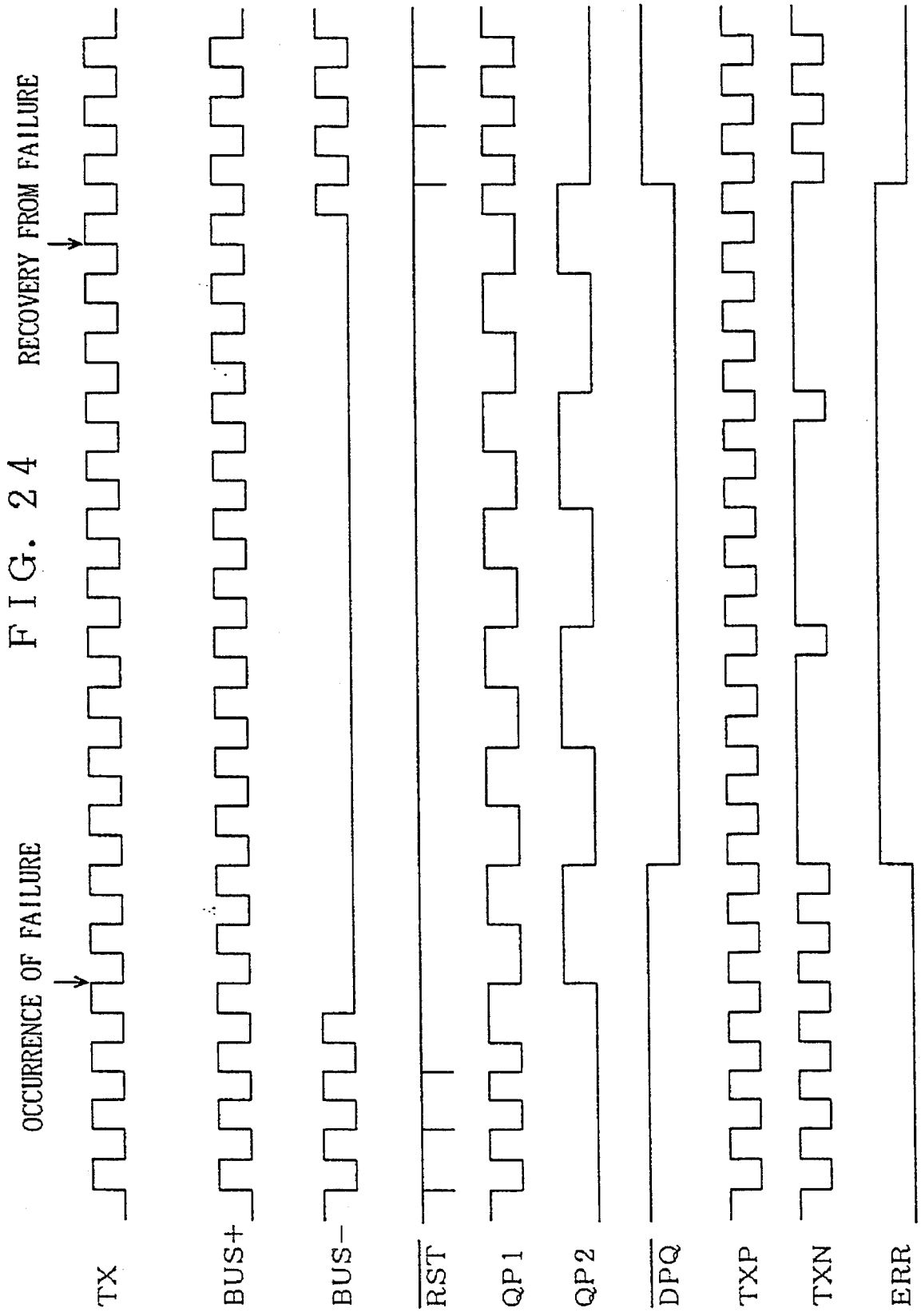

FIG. 24 is a timing chart showing operation in the case of short of the BUS– to the potential VS. Similarly to the FIG. 23, the signal TXN is periodically activated (corresponding to change of the input data TX) before recovery, and the communication according to the two-wire system is automatically recovered after the recovery.

The output control circuit 34 can include a one-shot multivibrator, for example. When an abnormality occurs on a bus, the error output is distributed so that a driver only on the side having the error is turned off (communication is possible because the other one is operating normally). Then, if the input data TX is active, the one-shot multivibrator is triggered with a signal on the bus operating normally. After a predetermined number is counted, the driver on the side having the error is turned on in synchronization with the data input. If it dose not recover to the normal condition, the one-shot multivibrator is triggered again, and if the bus is recovered to the normal condition, the counter is reset and the error output is released. Although excessively large current flows when an abnormality occurs, it dose not cause breakdown if the on-interval (how many numbers are to be counted) is set sufficiently large.

(E-2) Second Specific Structure:

Furthermore, by setting the intervals of driving the driver circuit when an abnormality occurs larger by increasing the number of stages of counters by one, it is enabled to prevent the excessively large current flowing into the driver circuit.

Figure 25:
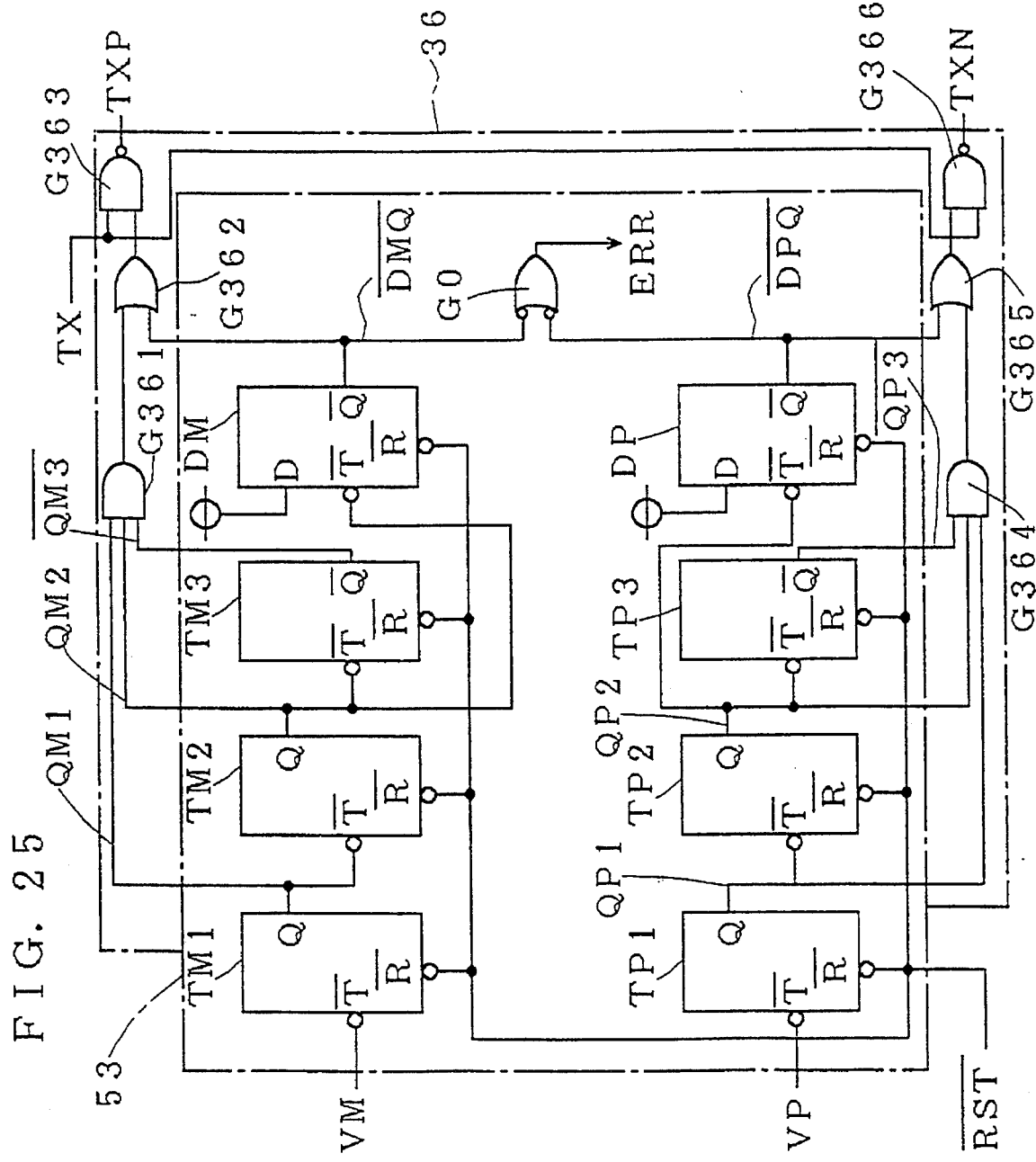
FIG. 25 is a circuit diagram for describing the second specific structure of the fifth preferred embodiment of the present invention.

In FIG. 25, the internal structure of an abnormality detecting circuit 53 and an output control circuit 36 and relation of connections therebetween are shown. The abnormality detecting circuit 53 and the output control circuit 36 are provided in place of the abnormality detecting circuit 52 and the output control circuit 34 in the transceiver device 90 with the first specific configuration shown in FIG. 21, respectively.

The abnormality detecting circuit 53 has structure in which flip-flops TP3, TM3 for counting the signals VM, VP are added to the abnormality detecting circuit 52. The flip-flop TP3 receives a signal QP2 which is a non-inversion output of the flip-flop TP2 as trigger, and outputs a signal $\overline{QP3}$ as an inversion output. Similarly, the flip-flop TM3 receives a signal QM2 which is a non-inversion output of the flip-flop TM2 as trigger, and outputs a signal $\overline{QM3}$ as an inversion output. The flip-flops DM, DP respectively receives signals QM2, QP2 as trigger similarly to the abnormality detecting circuit 52.

The output control circuit 36 has AND gates G361, G364, OR gates G362, G365, and NAND gates G363, G366. Signals QM1, QM2, $\overline{QM3}$ are inputted to the gate G361, output of the gate G361 and the signal $\overline{DMQ}$ are inputted to the gate G362, and input data TX and output of the gate G362 are inputted to the gate G363, respectively. The gate G363 outputs a signal TXP. Similarly, signals QP1, QP2, $\overline{QP3}$ are inputted to the gate G364, output of the gate G364 and a signal $\overline{DPQ}$ are inputted to the gate G365, and input data TX and output of the gate G365 are inputted to the gate G366, respectively. The gate G366 outputs a signal TXN.

Figure 26:
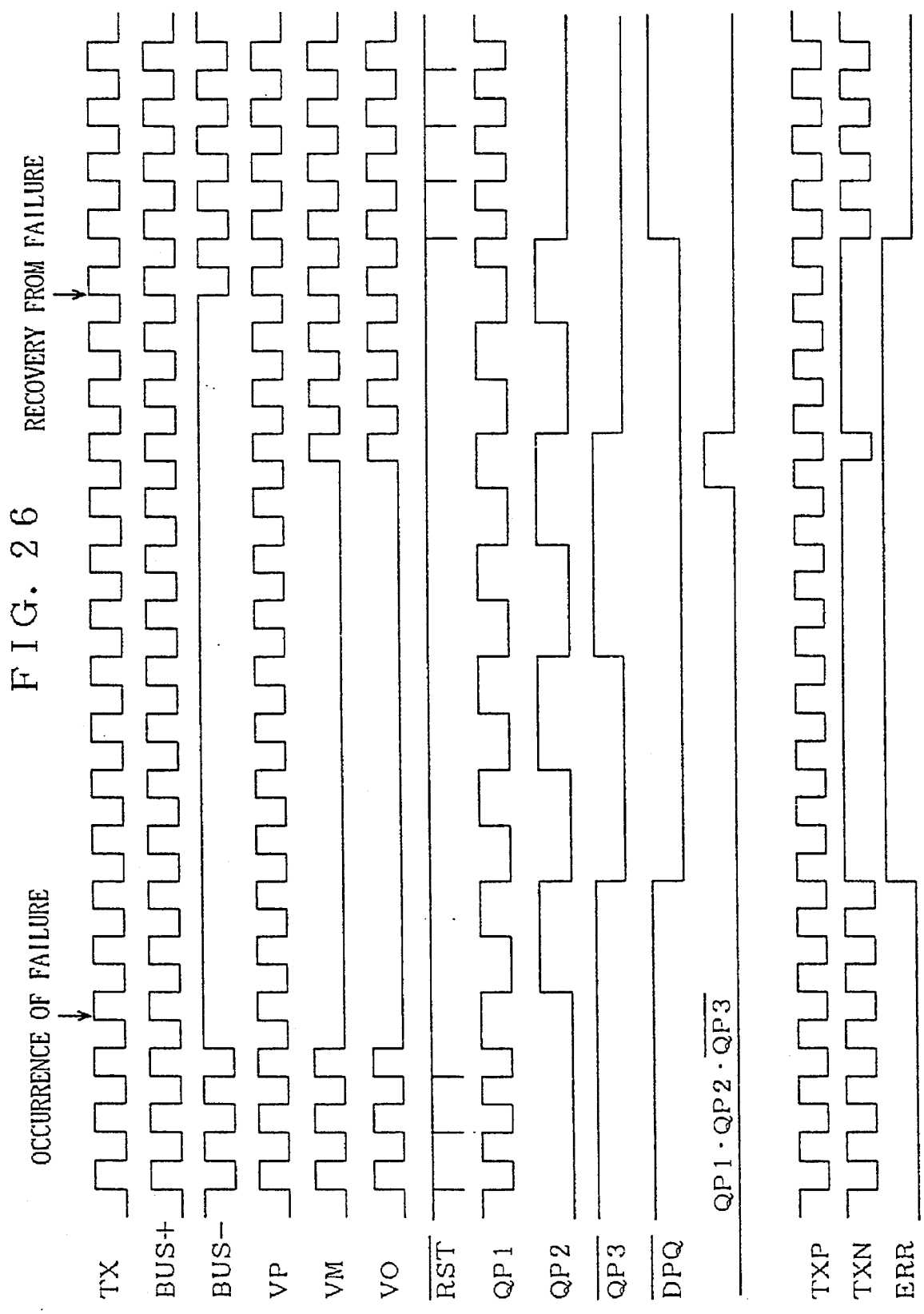
FIGS. 26 and 27 are timing charts for describing operation of the second specific structure of the fifth preferred embodiment of the present invention.

FIG. 26 is a timing chart showing operation in the case in which the BUS– is shorted to the potential VD. When such a failure takes place, the signal VP is counted and waveforms of the signals QP1, QP2, $\overline{QP3}$, $\overline{DPQ}$ and output of the gate G364 (QP1·QP2·$\overline{QP3}$ ) are those shown in FIG. 26, respectively. That is, the output control circuit 36 activates the signal TXN in the cycle eight times the input data TX. Accordingly, it can be prevented that excessively large current flows when the driver circuit is forced to be driven when there is a failure on the BUS–.

Figure 27:
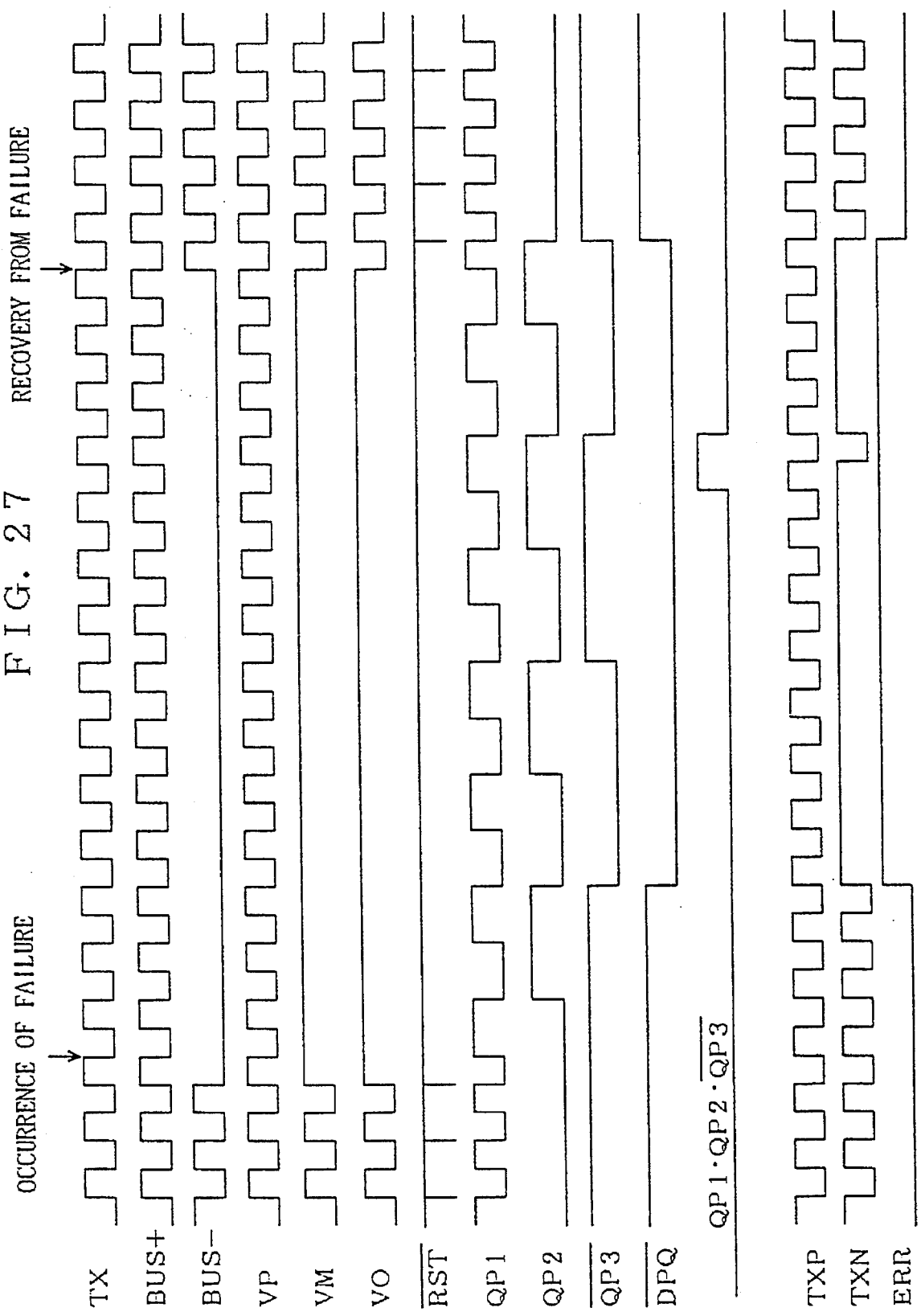

FIG. 27 is a timing chart showing operation in the case under which the BUS– is shorted to the potential VS. Similarly to FIG. 26, the signal TXN is activated cyclically (corresponding to change of the input data TX) before recovery and the communication according to the two-wire system is automatically recovered after the recovery.

(E-3) Third Specific Structure:

Furthermore, more reliable confirmation about recovery of buses can be made by driving the driver circuit corresponding to the bus having the abnormality N times or more and canceling the processing for the error if the bus having the abnormality has recovered to the normal condition M times (N≧M) continuously.

Figure 28:
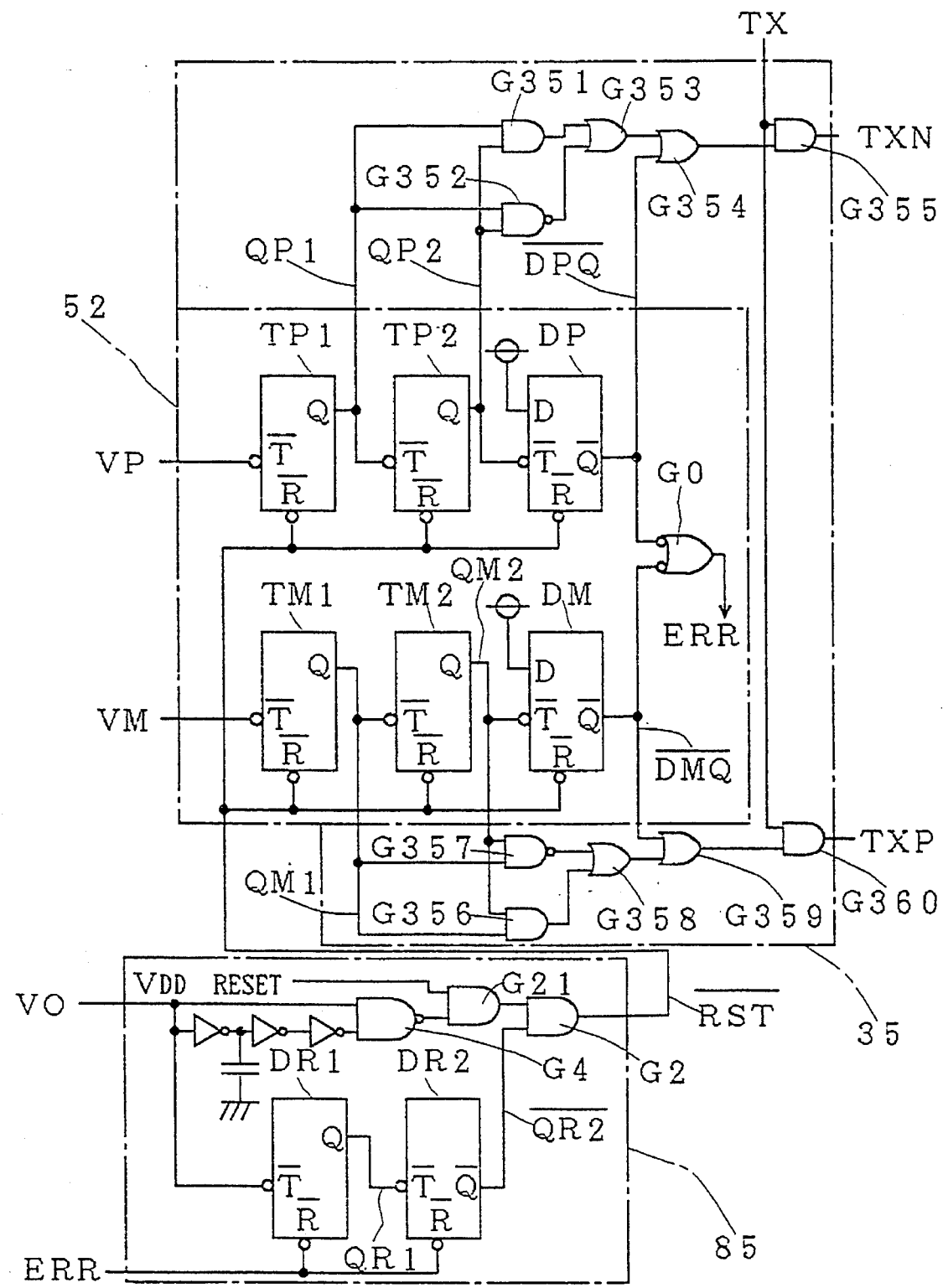
FIG. 28 is a circuit diagram for describing the third specific structure of the fifth preferred embodiment of the present invention.

Shown in FIG. 28 are the internal structures of an abnormality detecting circuit 52 and an output control circuit 35, and a reset circuit 85 and relation of connections among them. The output control circuit 35 and the reset circuit 85 replace the output control circuit 34 and the reset circuit 8 in the transceiver device 90 with the first specific structure shown in FIG. 21, respectively.

The output control circuit 35 has AND gates G351, G355, G356, G360, OR gates G353, G354, G358, G359, and NAND gates G352, G357. Signals QP1, QP2 are inputted to the gates G351, G352, outputs of the gates G351, G352 are inputted to the gate G353, output of the gate G353 and a signal $\overline{DPQ}$ are inputted to the gate G354, and input data TX and output of the gate G354 are inputted to the gate G355, respectively. A signal TXN is outputted from the gate G355. Similarly, signals QM1, QM2 are inputted to the gates G356, G357, outputs of the gates G356, G357 are inputted to the gate G358, output of the gate G358 and a signal $\overline{DMQ}$ are inputted to the gate G359, and input data TX and output of the gate G359 are inputted to the gate G360, respectively. A signal TXP is outputted from the gate G360.

Figure 29:
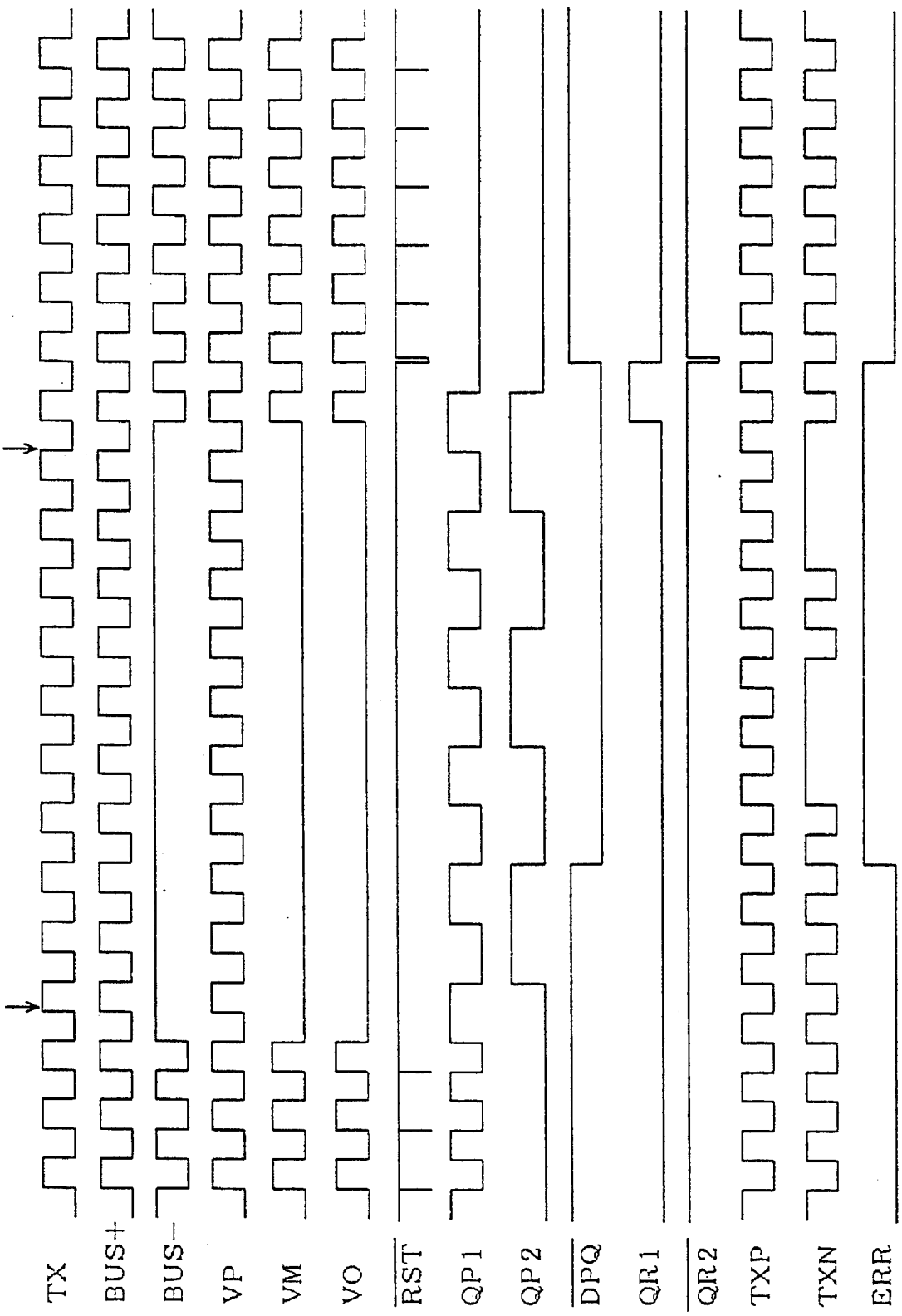
FIGS. 29 and 30 are timing charts for describing operation of the third specific structure of the fifth preferred embodiment of the present invention.

FIG. 29 is a timing chart showing operation in the case in which the BUS− is shorted to the potential VD. When such an abnormality takes place, the signals VM, VO go to "L", the reset signal $\overline{RST}$ is not activated and counting of the signal VP is started. In the output control circuit 35, which is different from the output control circuit 34, the signal VM is counted predetermined times (here, four times), and after that, activates the signal TXN twice corresponding to the input data TX.

Returning to FIG. 28, The reset circuit 85 has T flip-flops DR1 and DR2. The flip-flop DR1 outputs a signal QR1 with trigger of the signal VO. The flip-flop DR2 outputs a signal $\overline{QR2}$ with the signal QR1 as trigger. The flip-flops DR1, DR2 are reset by the error signal ERR, and the flip-flop DR1 and DR2 start counting the signal VO when a failure occurs. When the failure is repaired and the signal VO is counted twice, the signal $\overline{QR2}$ is activated and the reset signal $\overline{RST}$ becomes active. This brings the error signal ERR to "L", and the flip-flops DR1, DR2 are reset.

That is, in the second specific structure, the driver circuit corresponding to the bus having an abnormality is driven twice, and if it is confirmed that it has recovered twice, the error processing is canceled. Accordingly, recovery of buses can be confirmed more reliably.

Figure 30:
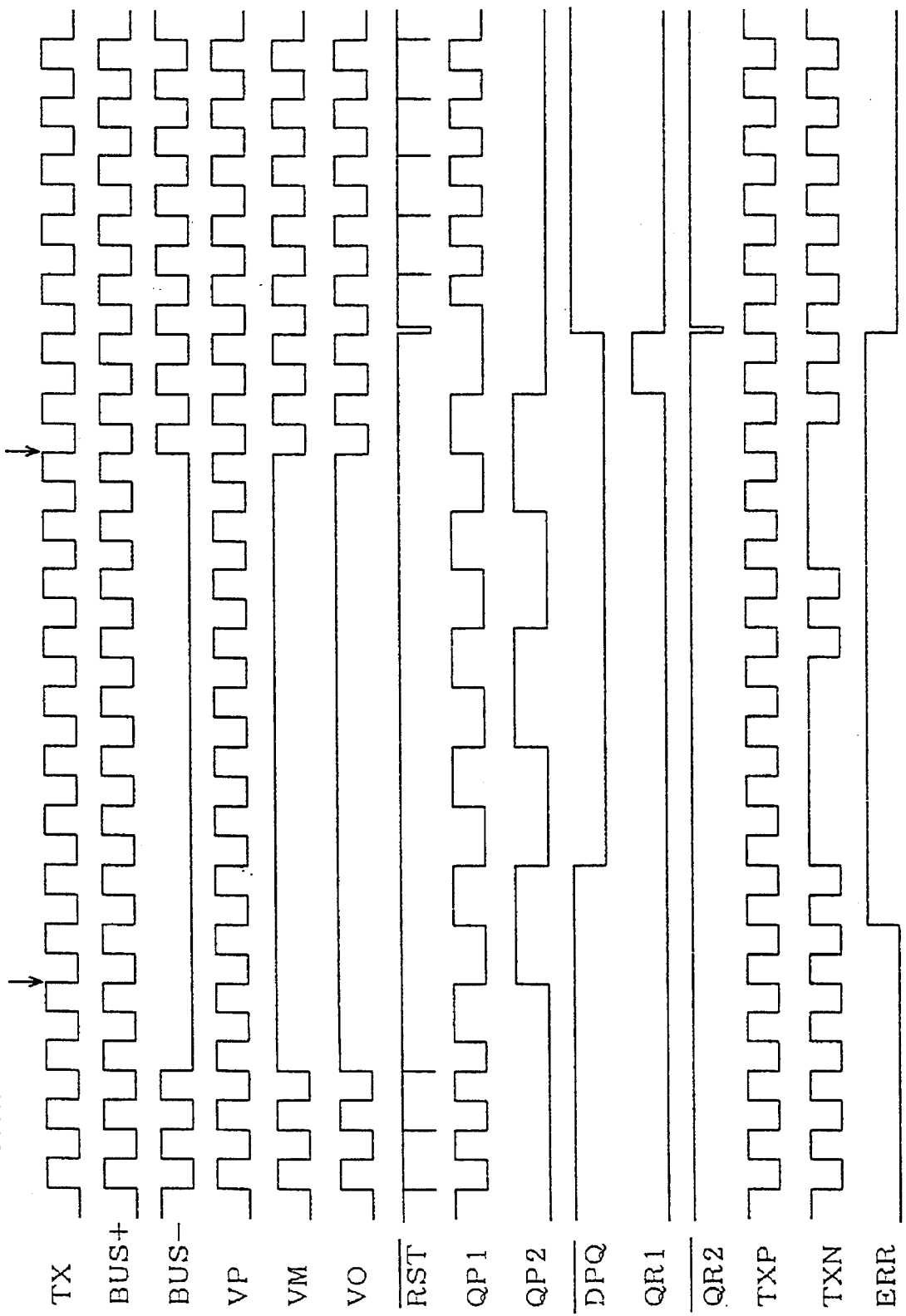

FIG. 30 is a timing chart showing operation in the case under which the BUS− is shorted to the potential VS. Similarly to FIG. 26, recovery of buses can be confirmed with higher reliability.

Figure 31:
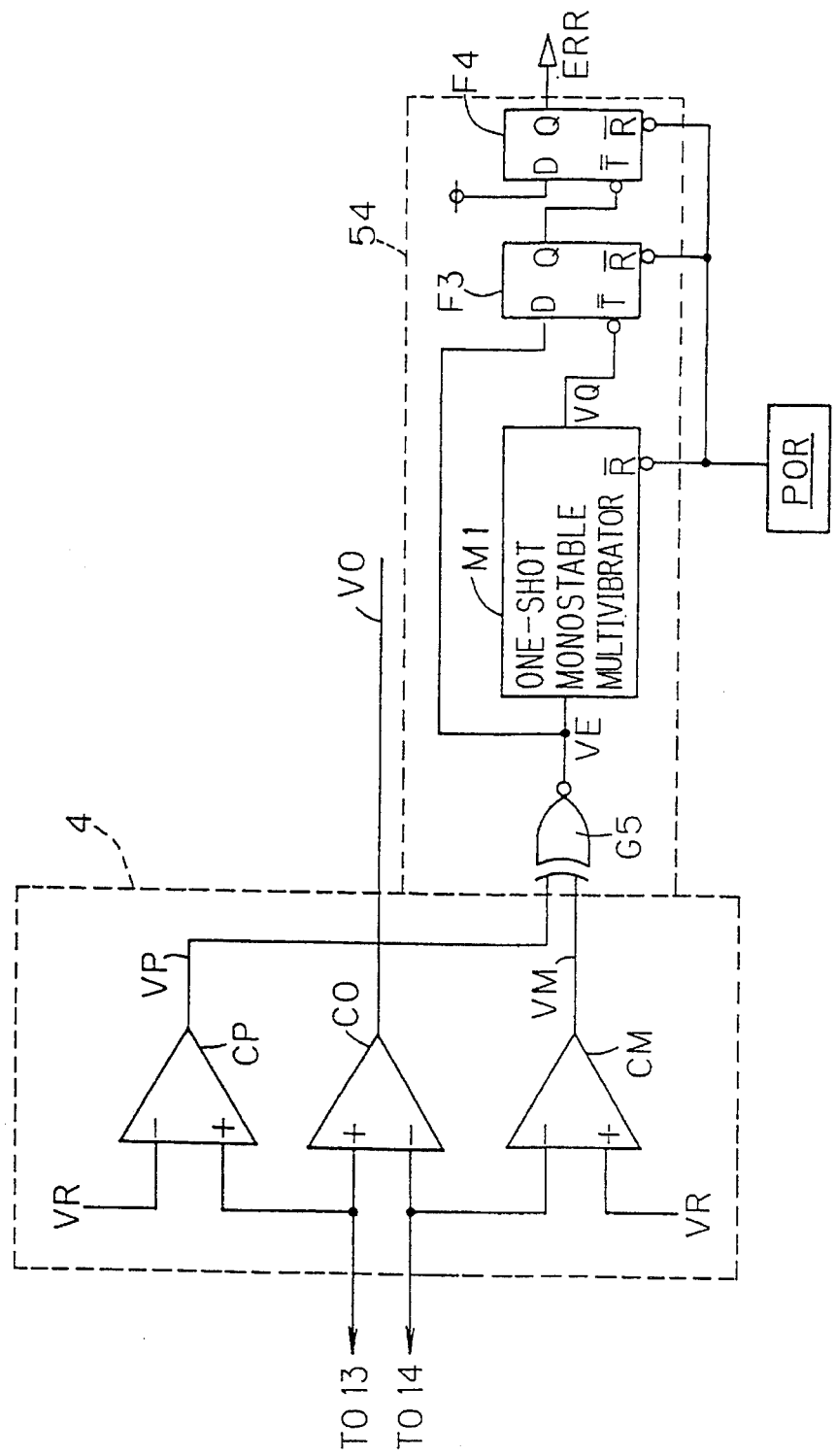
FIG. 31 is a circuit diagram for describing the first specific structure of the sixth preferred embodiment of the present invention.
Figure 32:
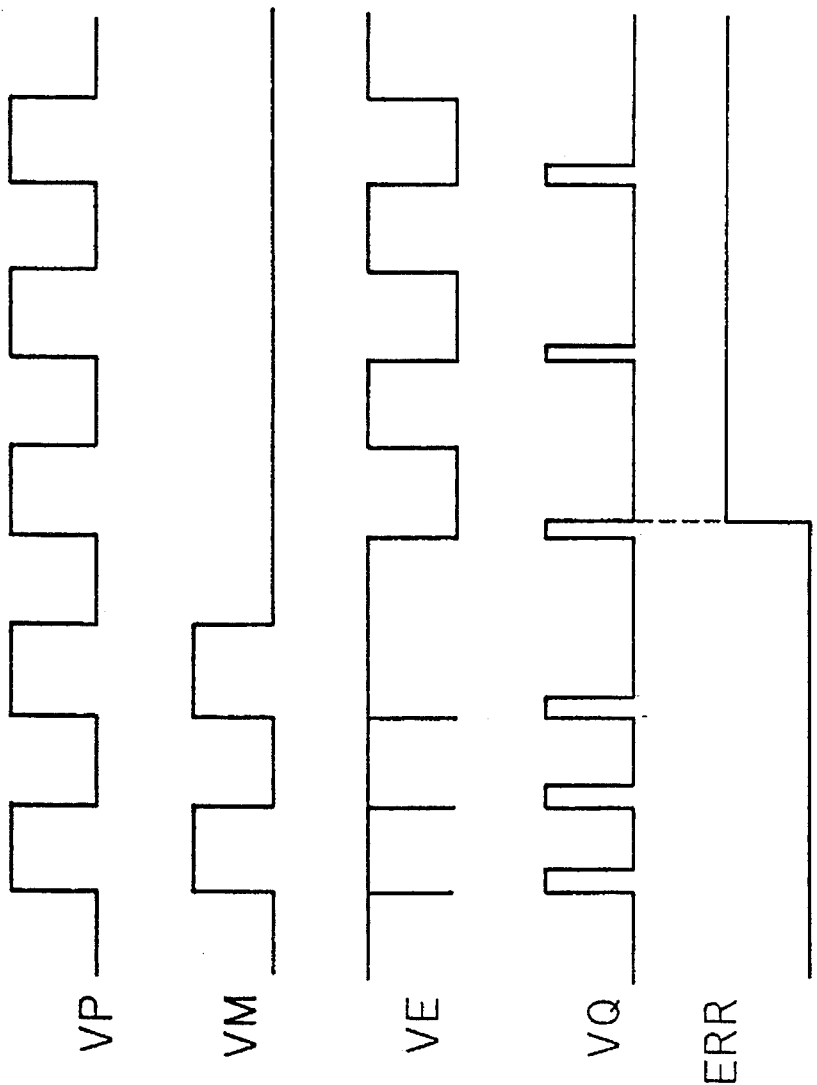
FIG. 32 is a timing chart for describing operation of the first specific structure of the sixth preferred embodiment of the present invention.

(F) Sixth Preferred Embodiment:

(F-1) First Specific Structure:

The sixth preferred embodiment is made to solve the third problem. FIG. 31 is a circuit diagram showing structure of an abnormality detecting circuit 54 and a bus input circuit 4 according to the present invention. FIG. 32 is a timing chart showing waveforms of respective signals.

The abnormality detecting circuit 54 has an EXNOR gate G5, a one-shot monostable multivibrator M1, and D flip-flops F3 and F4. The gate G5 receives signals VP and VM from the bus input circuit 4 and outputs a signal VE. The one-shot monostable multivibrator M1 receives a signal VE and generates a signal VQ having pulse with a predetermined width at its falling edge. The flip-flop F3 captures the signal VE at a fall of the signal VQ as trigger, and the flip-flop F4 latches output of the flip-flop F3.

When the buses BUS+ and BUS− are normal, signals with phases which are different by 180° from each other are sent on the buses BUS+, BUS−, so that the signals VP, VM are in-phase. The signal VE is generated by taking inversion of exclusive OR of these signals at the gate G5. Therefore, output of the gate G5 is at "H" in principle in normal conditions.

If the bus BUS− is shorted to the potential VD, however, the signal VM is always at "H". Accordingly, the signal VE becomes a signal with phase opposite to the signal VP, and the one-shot monostable multivibrator M1 is operated every time it falls. Now pulse width of the signal VQ which is output of the one-shot monostable multivibrator M1 is set shorter than the pulse cycle of the signals VP, VM. In this way, when the falling edge of signal VQ comes in an input end T of the flip-flop F3, the signal VE coming in an input end D of the flip-flop F3 is at the "L" state, so that the error signal ERR attains "H". Thus occurrence of abnormality is detected.

In practice, however, spike is made in the signal VE due to timing delay of the signals VP and VM. The one-shot monostable multivibrator M1 operates at a falling edge of the spike, so that the signal VQ has pulses even when no abnormality occurs on buses. If the pulse width of the signal VQ is set longer than the width of the spike, however, the signal VE coming in the input end D of the flip-flop F3 is at "H" when the falling edge of the signal VQ comes in the input end T of the flip-flop F3. Accordingly, malfunction in error detection can be avoided.

With the abnormality detecting circuit 54 having such structure, if an abnormality occurs on one of the buses, there is no need of waiting for transitions of signals from the other bus many times, resulting in an effect of detecting the abnormality quickly.

Reset of the one-shot monostable multivibrator M1 and the flip-flop F3 included in the abnormality circuit 54 can be made with the power-supply reset circuit POR.

Figure 33:
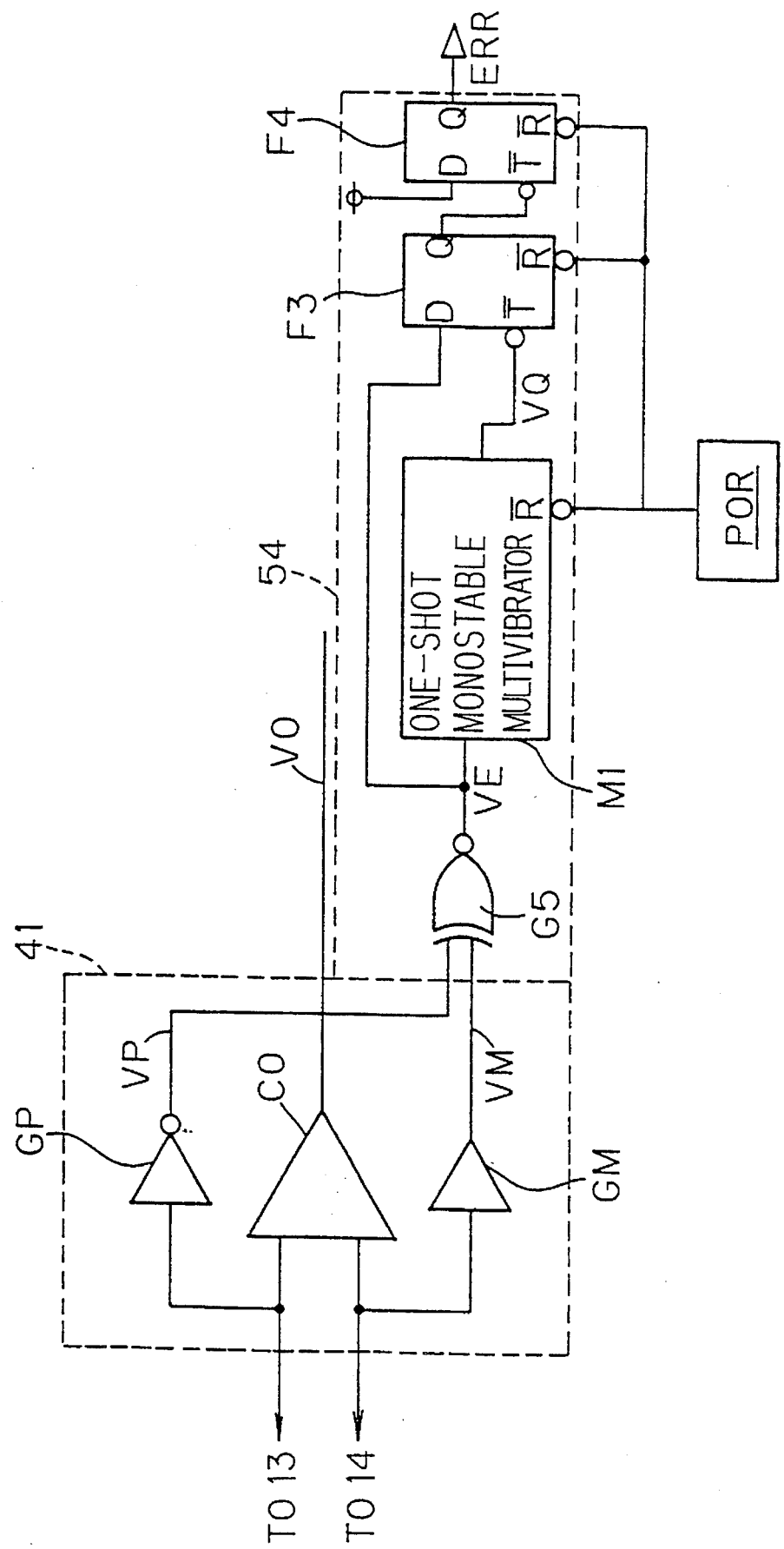
FIG. 33 is a circuit diagram for describing the second specific structure of the sixth preferred embodiment of the present invention.

(F-2) Second Specific structure:

FIG. 33 is a circuit diagram showing the specific structure of a bus input circuit 41 with the abnormality detecting circuit 54. In the structure of the bus input circuit 41, the comparators CP, CM in the bus input circuit 4 are replaced by a CMOS inverter GP and a CMOS buffer GM, respectively. Threshold values of the CMOS inverter and the CMOS buffer can be set about (VD+VS)/2, which is equal to the reference potential VR. Therefore, outputs of them also function as signals VP, VM.

Figure 34:
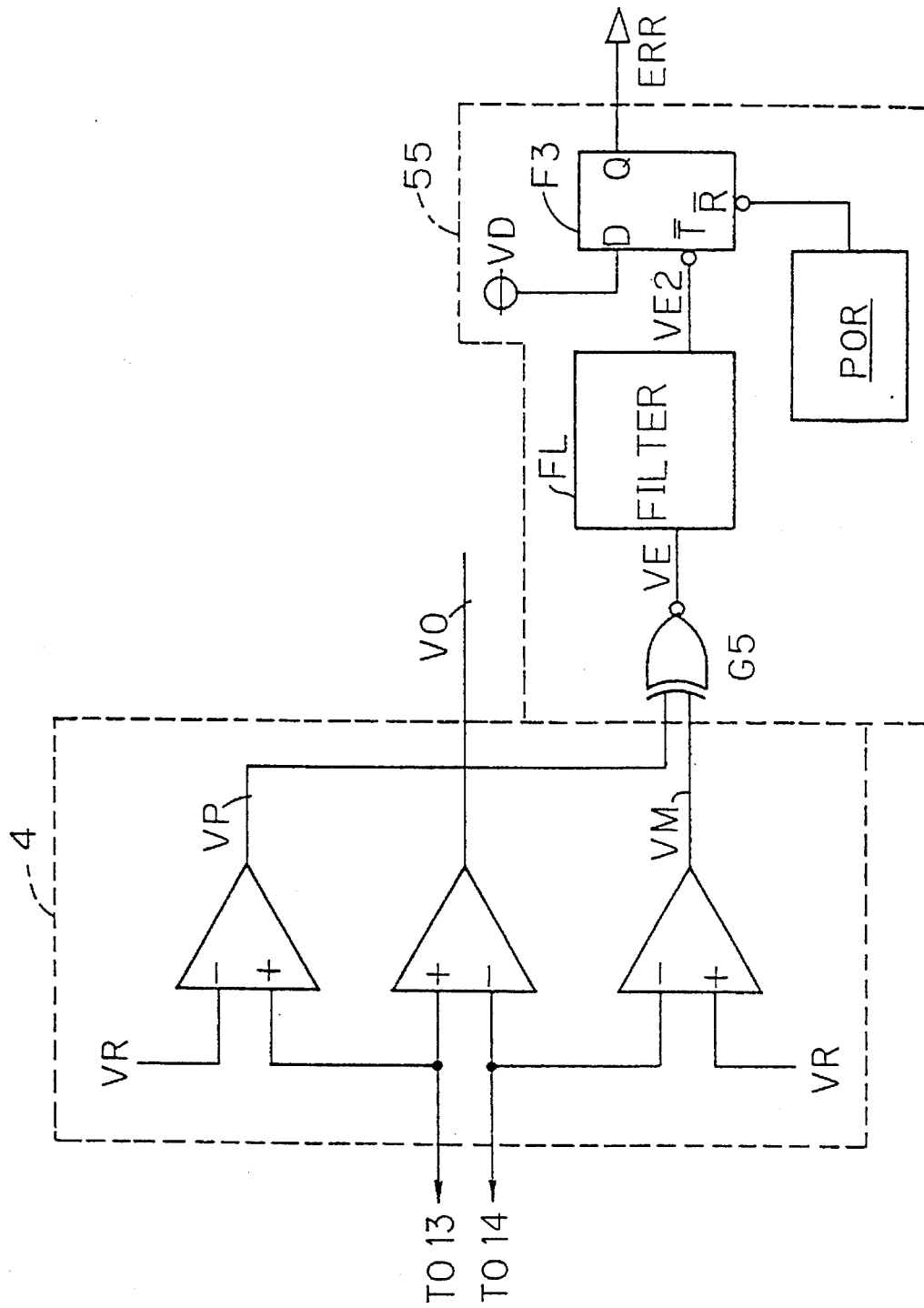
FIG. 34 is a circuit diagram for describing the third specific structure of the sixth preferred embodiment of the present invention.
Figure 35:
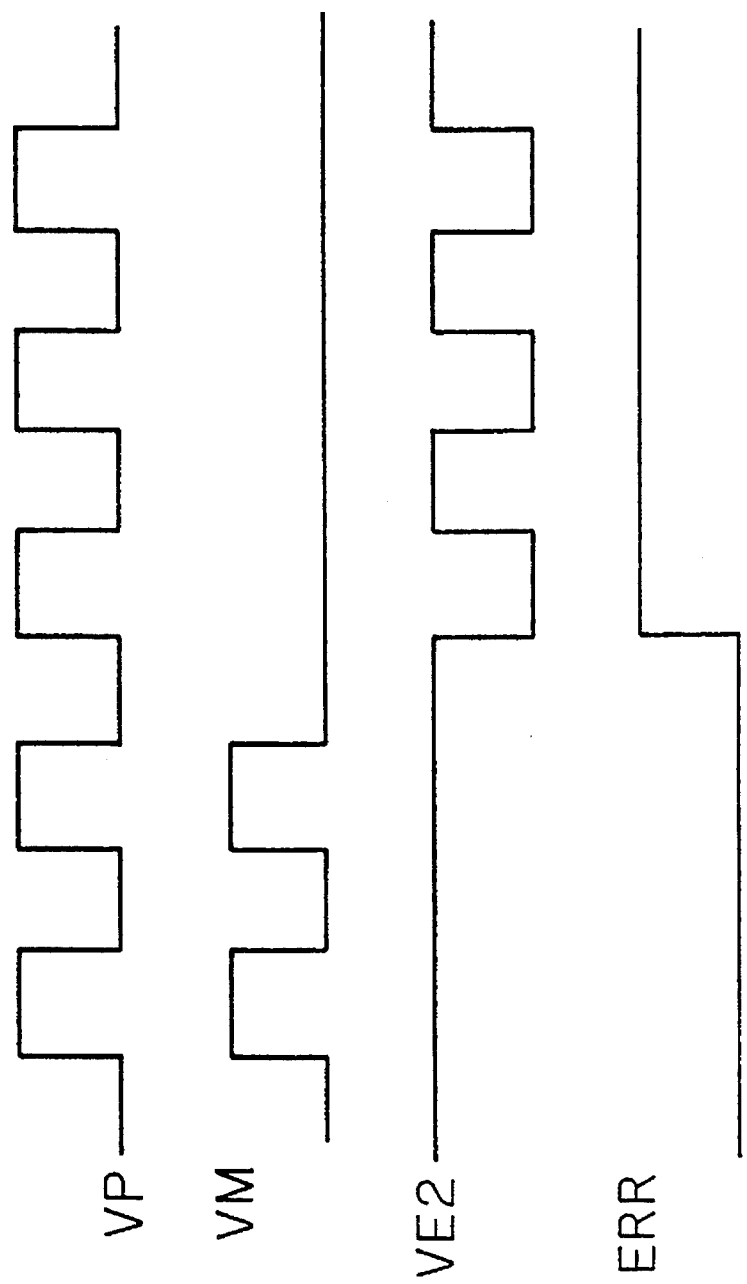
FIG. 35 is a timing chart for describing operation of the third specific structure of the sixth preferred embodiment of the present invention.

(F-3) Third Specific Structure:

It is also possible to use a filter to remove spike of signal VE. FIG. 34 is a circuit diagram showing structure of an abnormality detecting circuit 55. FIG. 35 is a timing chart showing waveforms of signals in respective parts.

In the abnormality detecting circuit 55, different from the abnormality detecting circuit 54 shown in FIG. 31, the potential VD is applied to the input end of the flip-flop F3, and a filter FL is provided in place of the one-shot monostable multivibrator MI, and flip-flop F4 is not used.

The filter FL is provided between the gate G5 and the input end T of the flip-flop F3. It removes spike from the signal VE which is output of the gate G5 to generate a signal VE2, which is transmitted to the input end T of the flip-flop F3.

When there is no abnormality on transmission lines, the signal VE2 is fixed at "H". The D flip-flop F3 is reset in advance by the power-supply reset circuit ROP. Therefore, the error signal ERR is at "L".

When an abnormality occurs on one of the buses, pulses come out in synchronization with output data provided to the bus. The signal VE2 falls from "H" to "L", and the flip-flop F3 inverts the logic provided to the input end D and supplies it to the output end Q. The signal supplied from the output end Q is an error signal ERR, and potential VD corresponding to "H" is applied to the input end D, so that the error signal ERR is at "H", i.e., the error signal is activated.

Figure 36:
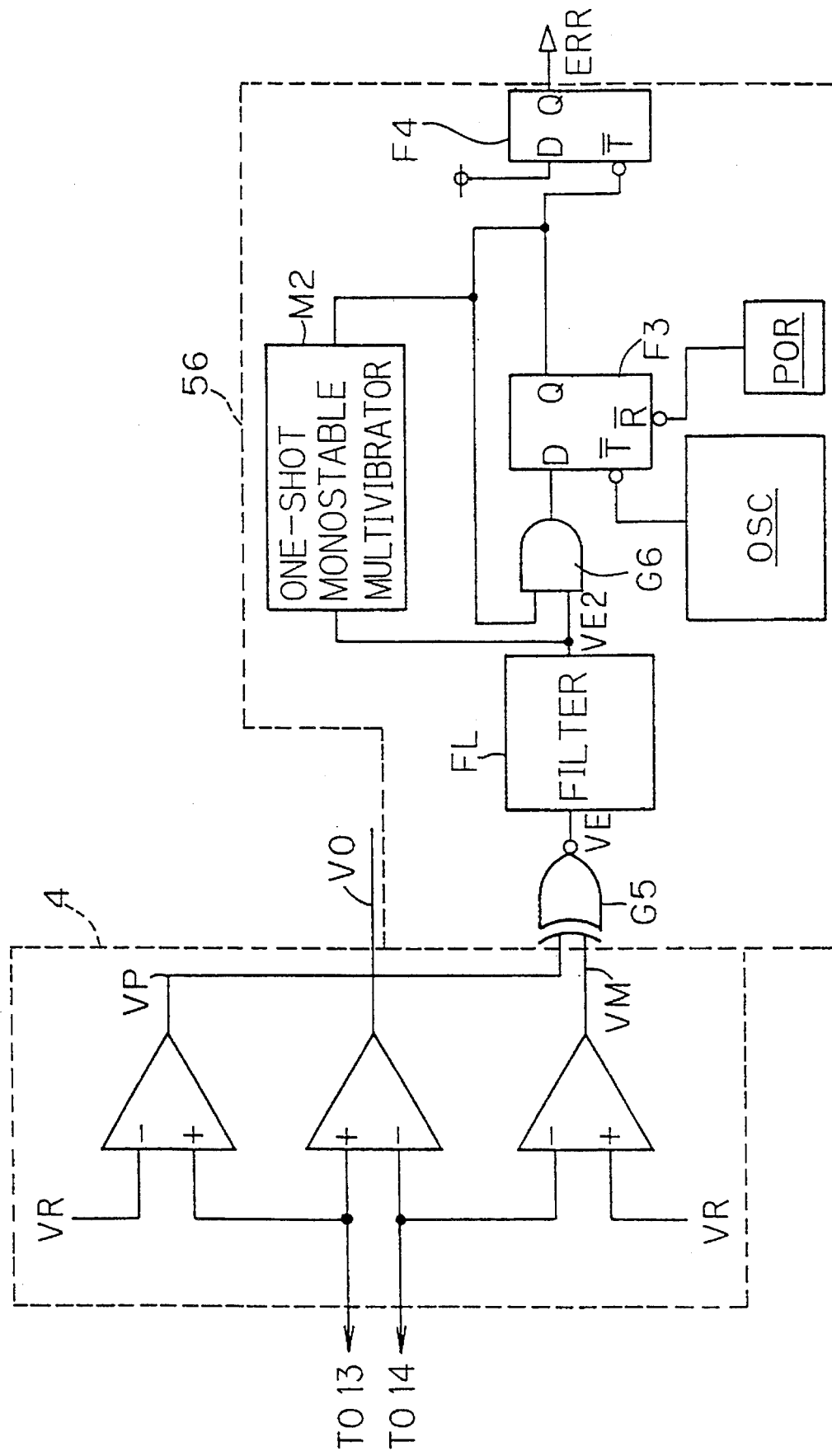
FIG. 36 is a circuit diagram for describing the fourth specific structure of the sixth preferred embodiment of the present invention.
Figure 37:
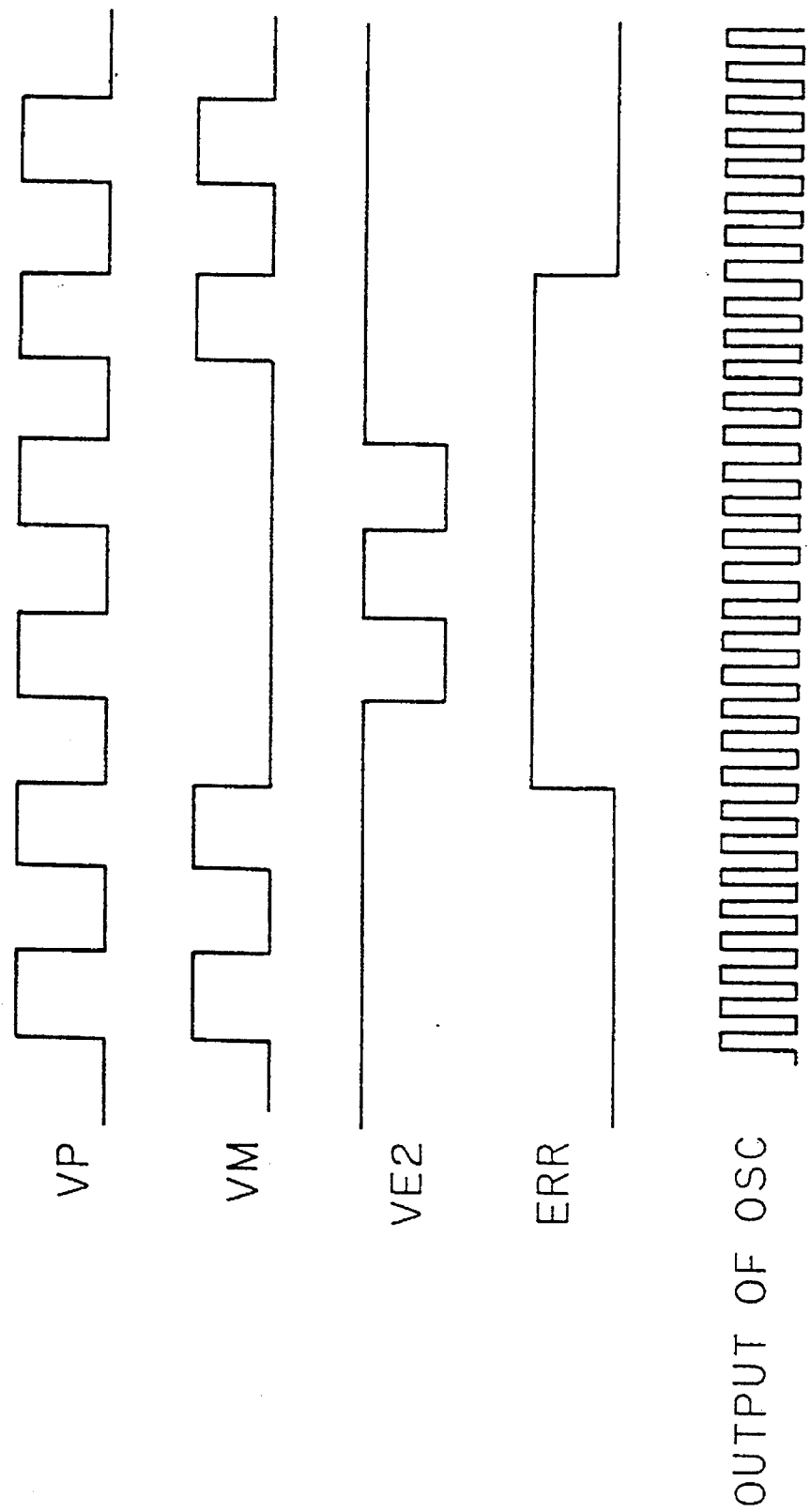
FIG. 37 is a timing chart for describing the fourth specific structure of the sixth preferred embodiment of the present invention.

(F-4) Fourth Specific Structure: FIG. 36 is a circuit diagram showing specific structure of an abnormality detecting circuit 56 together with the bus input circuit 4. FIG. 37 is a timing chart showing wave forms of signals in respective parts.

The spike of the signal VE which is an output of an EXNOR gate G5 receiving the signals VP, VM from the bus input circuit 4 is removed by a filter FL and shaped into a signal VE2. The signal VE2 is inputted into a one-shot monostable multivibrator M2. The one-shot monostable multivibrator M2 outputs "H" when a signal inputted therein stays at "H" for a predetermined period of time or longer.

The gate G6 supplies logical product of output of the one-shot monostable multivibrator M2 and the signal VE2 without spike to the input end D of the flip-flop F3.

An oscillator OSC is connected to the input end T of the flip-flop F3. The output frequency of the oscillator OSC is sufficiently higher than the frequency of the signals VP, VM, that is, the frequency of signals transmitted on the buses BUS+, BUS−. The gate G6, the one-shot monostable multivibrator M2 and the flip-flop F3 constitute a latch circuit.

When an abnormality occurs on the bus BUS−, the signal VE2 falls to "L". Accordingly, the output of the gate G6 also becomes "L", and "L" is inputted to the input end D of the flip-flop F3. On the other hand, clock pulses with pulse width sufficiently shorter than the pulse width of transmitted signals are inputted to the input end T of the flip-flop F3 by the oscillator OSC. Accordingly, "L" is outputted to the output end Q of the flip-flop F3, which is also supplied to the input of the gate G6, and the "L" state is held at the output end Q of the flip-flop F3. Therefore, the error signal ERR is held at "H".

If the bus recovers from the abnormality thereafter, the signal VE2 attains "H". The one-shot monostable multivibrator M2, detecting the "H" state of the signal VE2 for a predetermined period, brings output of the flip-flop F3 to "H" temporarily. Thus, the flip-flop F4 continues to hold the error signal ERR at "L" (inactive).

Figure 38:
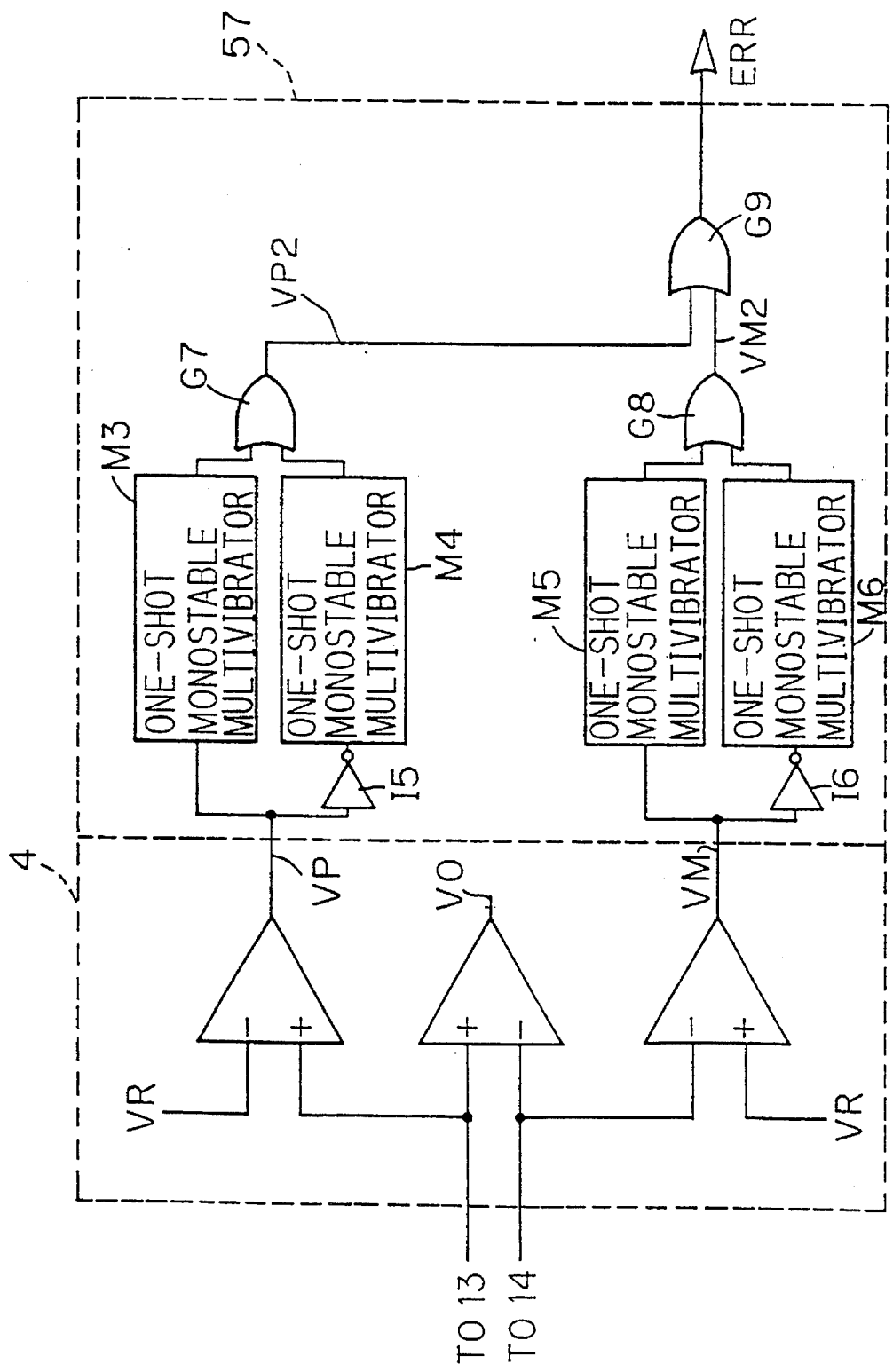
FIG. 38 is a circuit diagram for describing the fifth specific structure of the sixth preferred embodiment of the present invention.
Figure 39:
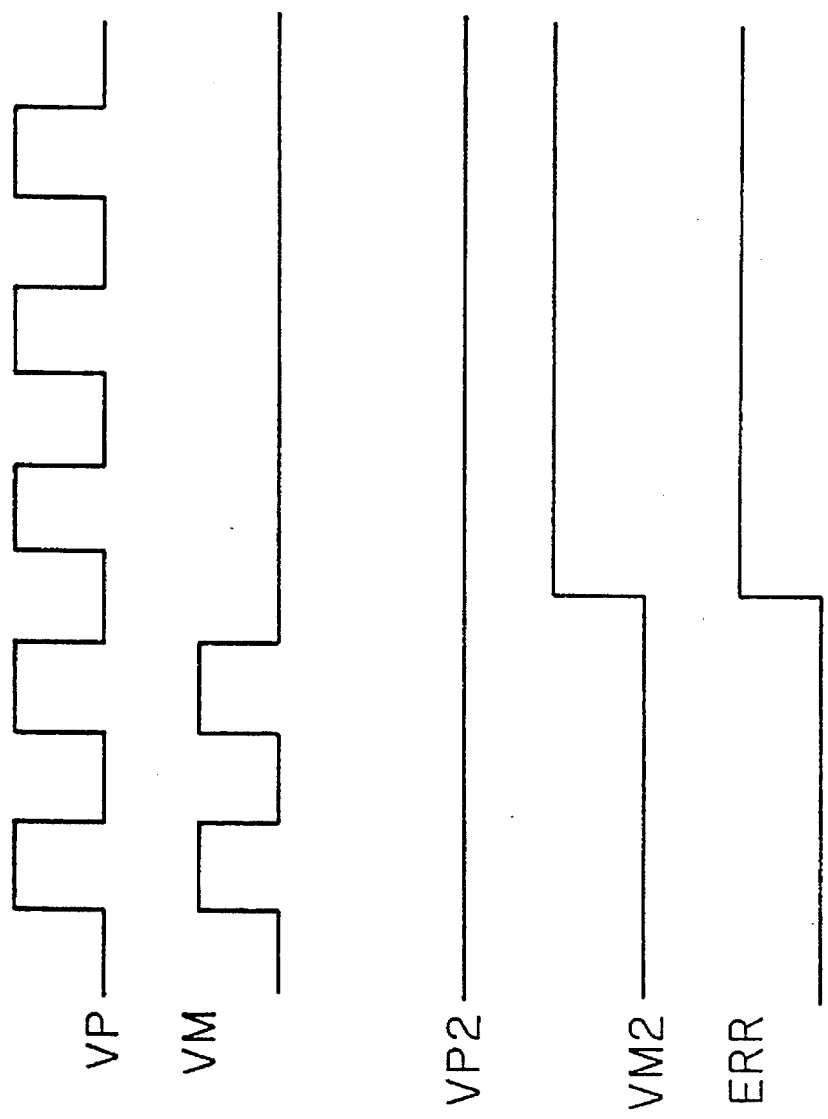
FIG. 39 is a timing chart for describing operation of the fifth specific structure of the sixth preferred embodiment of the present invention.

(F-5) Fifth Specific Structure:

FIG. 38 is a circuit diagram showing specific structure of an abnormality detecting circuit 57. FIG. 39 is a timing chart showing waveforms of signals at respective parts.

The abnormality detecting circuit 57 has inverters 15, 16, OR gates G7, G8, G9, and one-shot monostable multivibrators M3, M4, M5, M6.

A signal VP is supplied to the one-shot monostable multivibrator M3, and a signal obtained by inverting the signal VP by the invertor 15 is supplied to the one-shot monostable multivibrator M4, respectively. Also, supplied to the one-shot monostable multivibrator M5 is the signal VM and supplied to the one-shot monostable multivibrator M6 is a signal obtained by inverting the signal VM by the invertor 16, respectively. In the one-shot monostable multivibrators M3, M4, M5, M6, signals at "H" are outputted when inputs stay at "H" for a predetermined period or longer.

A signal VP2, which is an output of the gate G7, is a logical sum of outputs of the one-shot monostable multivibrators M3, M4, and the signal VP2 is applied to one input of the gate G9. Also, logical sum of the outputs of the one-shot monostable multivibrators M5, M6 is found by the gate G8, and a signal VM2 is applied to the other input of the gate G9.

Next, the operations are described. If there is no abnormality on buses and normal signals are transmitted, pulses in synchronization with the signals on the buses are outputted in the signals VP, VM obtained from the bus input circuit 4.

Now, if an abnormality occurs on the bus BUS−, for example, if it is shorted to the potential VD or the potential VS, input of one of the one-shot monostable multivibrators M5, M6 is fixed at "H". Accordingly, output of one of the one-shot monostable multivibrators M5, M6 attains "H", and the signal VM2 also attains "H". Thus, the error signal ERR which is output of the gate G9 attains "H", and the abnormality is detected. The same thing can be applied to occurrence of abnormality on the bus BUS+.

As the one-shot monostable multivibrators M3, M4, MS, M6, ones in which signals at "H" are outputted when input are at "H" for a predetermined period or longer can be used here. Also, ones output "L" when the input is at "H", ones output "H" when the input is at "L" and ones output "L" when the input is at "L" can be used. In these cases, however, logic circuits of each gate must be changed.

While the invention has been shown and described in detail, the foregoing description is in all aspects illustrative and not restrictive. It is therefore understood that numerous modifications and variations can be devised without departing from the scope of the invention.

What is claimed is:

1. A two-wire input/output device connected to a first and a second transmission lines on which a first and a second signals with phases opposite to each other are transmitted, respectively, comprises:

(a) a first and a second driver circuits for supplying said first and second signals to said first and second transmission lines, respectively;

(b) an input circuit receiving said first and second signals for generating a first comparison signal obtained by comparing said first signal and a predetermined potential, a second comparison signal obtained by comparing said second signal and said predetermined potential and a third comparison signal obtained by comparing said first signal and said second signal;

(c) a reset circuit receiving said third comparison signal for generating a reset signal which is activated when said first and second transmission lines are normal;

(d) an abnormality detecting circuit receiving said first and second comparison signals and said reset signal for generating a first and a second error signals which are activated when an abnormality occurs on one of said first and second transmission lines, respectively; and (e) an output control circuit receiving input data on which said first and second signals are based and said first and second error signals for stopping driving of said first and second driver circuits respectively when one of said first and second error signals is active and driving said first and second driver circuits according to said input data when said first and second error signals are inactive.

2. The two-wire input/output device according to claim 1, wherein said output control circuit comprises;

(e-1) a first T flip-flop receiving said first error signal to be reset and receiving said input data as a trigger signal, (e-2) a second T flip-flop receiving said second error signal to be reset and receiving said input data as a trigger signal, (e-3) a first gate for supplying to said first driver circuit a signal which is an inversion of a logical product of an output of said first T flip-flop and said input data, and (e-4) a second gate for supplying to said second driver circuit a signal which is an inversion of a logical product of an output of said second T flip-flop and said input data.

3. The two-wire input/output device according to claim 2, wherein said first driver circuit comprises;

(a-1) a first potential point, and (a-2) a first transistor having a first current electrode connected to said first potential point, a second current electrode connected to said first transmission line and a control electrode connected to said output control circuit, and said second driver circuit comprises;

(a-3) a second potential point, and (a-4) a second transistor having a first cur;rent electrode connected to said second potential point, a second current electrode connected to said first transmission line and a control electrode connected to said output control circuit.

4. The two-wire input/output device according to claim 1, wherein said reset circuit further produces an auxiliary reset signal which is not related to said third comparison signal, and said abnormality detecting circuit includes;

(d-1) a first counter which counts said first comparison signal and is reset by said reset signal, (d-2) a first D flip-flop which inputs an output of said first counter as trigger and is reset by said auxiliary reset signal, (d-3) a second counter which counts said second comparison signal and is reset by said reset signal, and (d-4) a second D flip-flop which inputs an output of said second counter as trigger and is reset by said auxiliary reset signal.

5. The two-wire input/output device according to claim 4, wherein said reset circuit includes (c-2) a power-supply reset circuit which operates with reset of a power-supply and produces said auxiliary reset signal.

6. The two-wire input/output device according to claim 5, wherein said reset circuit further includes;

(c-3) a gate for reset taking a logical product of an external reset signal supplied from outside of said reset circuit and an output of said power-supply reset circuit to produce said auxiliary reset signal.

7. The two wire input/output device according to claim 1, wherein said abnormality detecting circuit includes;

(d-5) a gate for error signal for taking a logical sum of said first and second error signals to produce a third error signal, and (d-6) a latch circuit for latching said third error signal and producing a fourth error signal.

8. The two-wire input/output device according to claim 7, wherein said latch circuit comprises a D flip-flop having a D input end fixed to a potential corresponding to predetermined logic, a T input end for inputting said third error signal and an inversion output end for outputting said fourth error signal.

9. A two-wire input/output device connected to a first and a second transmission lines on which a first and a second signals with phases opposite to each other are transmitted, respectively, comprises:

(a) a driver circuit for supplying said first and second signals to said first and second transmission lines, respectively, (b) an input circuit receiving said first and second signals for producing a first comparison signal obtained by comparing said first signal and a predetermined potential, a second comparison signal obtained by comparing said second signal and said predetermined potential and a third comparison signal obtained by comparing said first signal and said second signal;

(c) a reset circuit receiving said third comparison signal for producing a reset signal which is activated when said first and second transmission lines are normal;

(d) an abnormality detecting circuit receiving said first and second comparison signals and said reset signal for producing an error signal which is activated when an abnormality occurs on one of said first and second transmission lines, respectively;

(e) an output control circuit receiving input data on which said first and second signals are based and said error signal for stopping driving of said driver circuit in principle when said error signal is active and for driving said driver circuit according to said input data when said error signal is inactive; and (f) a timer receiving said error signal to be started with its activation for supplying a special driving signal after a certain period from said activation of said error signal to said output control circuit to make said output control circuit drive said driver circuit as an exception even if said error signal is active.

10. The two-wire input/output device according to claim 9 wherein said timer is a programmable timer.

11. The two-wire input/output device according to claim 9, wherein said error signal is single, said timer is single, and said special driving signal is single, 12. The two-wire input/output device according to claim 11, wherein said output control circuit comprises;

(e-1) a first output gate for taking logical product of an inversion signal of said error signal and said input data, and (e-2) a second output gate for taking inversion of a logical sum of an output of said first output gate and said special driving signal and supplying to said diver circuit, 13. The two-wire input/output device according to claim 9, wherein said error signal forms a pair, said timer forms a pair and supplies a pair of said special driving signals to said output control circuit, and said reset circuit further receives said first and said second comparison signals and, respectively, on the basis of each of the same, outputs a first and a second auxiliary reset signals for resetting said pair of timers together with said pair of error signals.

14. The two-wire input/output device according to claim 13, wherein one of said timers comprises;

(f-1) a first gate for timer for outputting logical product of one of said special driving signal and logical inversion of one of said error signals, and (f-2) a first timer element which is reset by output of said first gate for timer for outputting one of said special driving signal, and the other one of said timers comprises;

(f-3) a second gate for timer for outputting logical product of the other one of said special driving signals and logical inversion of the other one of said error signals, and (f-4) a second timer element which is reset by an output of said second gate for timer for outputting the other one of said special driving signal.

15. The two-wire input/output device according to claim 9, wherein
said error signal formes a pair,
said timer forms a trio and supplies a trio of said special driving signals to said output control circuit, and
said reset circuit further receives said first and second comparison signals and, respectively, on the basis of the same, outputs a first and a second auxiliary reset signals for resetting said trio of timers together with said pair of error signals.

16. A two-wire input/output device connected to a first and a second transmission lines on which a first and a second signals with phases opposite to each other are transmitted, respectively, comprises:
(a) a first and a second driver circuits for supplying said first and second signals to said first and second transmission lines, respectively;
(b) an input circuit receiving said first and second signals for producing a first comparison signal obtained by comparing said first signal and a predetermined potential, a second comparison signal obtained by comparing said second signal and said predetermined potential and a third comparison signal obtained by comparing said first signal and said second signal;
(c) a reset circuit receiving said third comparison signal for producing a reset signal which is activated when said first and second transmission lines are normal;
(d) an abnormality detecting circuit having,
(d-1) a first counter which is reset by said reset signal and counts said second comparison signal to output a first count output,
(d-2) a first D flip-flop which inputs said first count output as trigger and is reset by said reset signal for producing a first error signal which is activated when an abnormality occurs on said first transmission line,
(d-3) a second counter which is reset by said reset signal for counting said first comparison signal to output a second count output, and
(d-4) a second D flip-flop which inputs said second count output as trigger and is reset by said reset signal for producing a second error signal which is activated when an abnormality occurs on said second transmission line; and
(e) an output control circuit
(e-1) receiving input data on which said first and second signals are based and said first and second error signals,
(e-2) for driving said driver circuit according to said input data when said first and second error signals are inactive, and
(e-3) for stopping driving of said first and second driver circuits in principle, when one of said first and said second error signals is active, respectively, and driving said first and second driver circuits as an exception when said first count output and said second count output attain predetermined value, respectively.

17. The two-wire input/output device according to claim 16, wherein, in said abnormality detecting circuit, said first and second counters include two T flip-flops respectively connected in series.

18. The two-wire input/output device according to claim 16, wherein said first and second counters in said abnormality detecting circuit include three T flip-flops respectively connected in series.

19. The two-wire input/output device according to claim 16, wherein
said abnormality detecting circuit further comprises a gate for error signal for producing a third error signal by taking a logical sum of said first and second error signals, and
said reset circuit further receives said third error signal, and comprises (c-1) a counter for reset which counts said third comparison signal as trigger and is reset by said third error signal.

20. A two-wire input/output device connected to a first and a second transmission lines on which a first and a second signals with phases opposite to each other are transmitted, respectively, comprises:
(a) a driver circuit for supplying said first and second signals to said first and second transmission lines, respectively;
(b) an input circuit receiving said first and second signals for producing a first and a second reference signals respectively indicating whether said first and second signals are normal or not;
(c) an abnormality detecting circuit receiving said first and second reference signals for producing an error signal which is activated when an abnormality occurs on one of said first and second transmission lines;
(d) an output control circuit receiving input data on which said first and second signals are based and said error signal for stopping driving of said driver circuit when said error signal is active and driving said driver circuit according to said input data when said error signal is inactive; and
said abnormality detecting circuit having
(c-1) a coincidence detecting circuit for producing a coincidence detection signal which is activated when said first and second reference signals do not coincide with each other, and
(c-2) a coincidence detection holding circuit for holding said coincidence detection signal and producing said error signal.

21. The two-wire input/output device according to claim 20, wherein said input circuit comprises;
(b-1) a reference potential point for supplying a reference potential,
(b-2) a first comparator for comparing said first signal and said predetermined potential to obtain said first reference signal, and
(b-3) a second comparator for comparing said second signal and said predetermined potential to obtain said second reference signal.

22. The two-wire input/output device according to claim 21, wherein said coincidence detecting circuit includes (c-1-1) a gate for abnormality detection for outputting inversion of exclusive logical sum of said first and second reference signals.

23. The two-wire input/output device according to claim 22, wherein said coincidence detection holding circuit comprises;
(c-2-1) a one-shot monostable multivibrator provided with said coincidence detection signal as trigger for outputting a pulse signal,
(c-2-2) a first D flip-flop having a D input end supplied with said coincidence detection signal, a trigger input end supplied with said pulse signal and a non-inversion output end, and (c-2-3) a second D flip-flop having a D input end supplied with potential corresponding to predetermined logic, a trigger input end connected to said non-inversion output end of said first D flip-flop and a non-inversion output end for outputting said error signal.

24. The two-wire input/output device according to claim 21, wherein said coincidence detection holding circuit includes;

(c-2-4) a filter receiving said coincidence detection signal for outputting a corrected coincidence detection signal by removing frequency component higher than basic frequency of said first and second reference signals therefrom, and (c-2-5) a D flip-flop having a D input end supplied with potential corresponding to predetermined logic, a trigger input end supplied with said corrected coincidence detection signal and a non-inversion output end for outputting said error signal.

25. The two-wire input/output device according to claim 21 wherein said coincidence detection holding circuit comprises;

(c-2-6) a filter receiving said coincidence detection signal and outputting a corrected coincidence detection signal by removing frequency component higher than basic frequency of said first and second reference signals therefrom, (c-2-7) a one-shot monostable multivibrator supplied with said corrected coincidence detection signal as trigger and having an output end for outputting a pulse signal, (c-2-8) an abnormality detecting gate for outputting logical product of an output of said one-shot monostable multivibrator and said corrected coincidence detection signal, (c-2-9) an oscillator for outputting an oscillation signal having basic frequency higher than the basic frequency of said first and second reference signals, (c-2-10) a first D flip-flop having a D input end supplied with an output of said abnormality detecting gate, a trigger input end supplied with said oscillation signal and a non-inversion output end, and (c-2-11) a second D flip-flop having a D input end supplied with potential corresponding to predetermined logic, a trigger input end connected in common to said output end of said one-shot monostable multivibrator and said non-inversion output end of said first D flip-flop and a non-inversion output end for outputting said error signal.

26. The two-wire input/output device according to claim 20, wherein said input circuit comprises, (b-4) a first gate for inverting said first signal to obtain said first reference signal, and (b-5) a second gate for holding the logic of said second signal and obtaining said second reference signal.

27. The two-wire input/output device according to claim 26, wherein said coincidence detection holding circuit includes;

(c-2-12) a one-shot monostable multivibrator supplied with said coincidence detection signal as trigger for outputting a pulse signal, (c-2-13) a first D flip-flop having a D input end supplied with said coincidence detection signal and a trigger input end supplied with said pulse signal, and (c-2-14) a second D flip-flop having a D input end supplied with potential corresponding to predetermined logic and a trigger input end supplied with an output of said first D flip-flop for outputting said error signal.

28. A two-wire input/output device connected to a first and a second transmission lines on which a first and a second signals with phases opposite to each other are transmitted, respectively, comprising:

(a) a driver circuit for supplying said first and second signals to said first and second transmission lines, respectively;

(b) an input circuit receiving said first and second signals for producing a first and a second reference signals respectively indicating whether said first and second signals are normal or not;

(c) an abnormality detecting circuit receiving said first and second reference signals for producing an error signal which is activated when an abnormality occurs on one of said first and second transmission lines;

(d) an output control circuit receiving input data on which said first and second signals are based and said error signal for stopping driving of said driver circuit when said error signal is active and driving said driver circuit according to said input data when said error signal is inactive; and said abnormality detecting circuit having;

(c-1) a first one-shot multivibrator receiving said first reference signal as trigger and outputting a signal in the form of pulse, (c-2) a second one-shot multivibrator receiving a signal obtained by inverting said first reference signal as trigger and outputting a signal in the form of pulse, (c-3) a third one-shot multivibrator receiving said second reference signal as trigger and outputting a signal in the form of pulse, (c-4) a fourth one-shot multivibrator receiving a signal obtained by inverting sad second reference signal as trigger and outputting a signal in the form of pulse, and (c-5) a gate for abnormality detection for taking a logical sum of outputs of said first through fourth one-shot multivibrators to produce said error signal.

29. The two-wire input/output device according to claim 28, wherein said input circuit comprises;

(b-1) a reference potential point for supplying a reference potential, (b-2) a first comparator for comparing said first signal and said predetermined potential to obtain said first reference signal, and (b-3) a second comparator for comparing said second signal and said predetermined potential to obtain said second reference signal.

* * * * *